（12） United States Patent
Yun et al.

(10) Patent No.: US 11,056,308 B2
(45) Date of Patent: Jul. 6, 2021

(54) SYSTEM AND METHOD FOR DEPTH-SELECTABLE X-RAY ANALYSIS

(71) Applicant: Sigray, Inc., Concord, CA (US)

(72) Inventors: Wenbing Yun, Walnut Creek, CA (US); Janos Kirz, Berkeley, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 16/560,287

(22) Filed: Sep. 4, 2019

(65) Prior Publication Data

US 2020/0098537 A1 Mar. 26, 2020

Related U.S. Application Data

(60) Provisional application No. 62/728,574, filed on Sep. 7, 2018.

(51) Int. Cl.
*H01J 35/10* (2006.01)
*H01J 35/06* (2006.01)
(Continued)

(52) U.S. Cl.
CPC .......... *H01J 35/108* (2013.01); *G01N 23/083* (2013.01); *G01N 23/2273* (2013.01);
(Continued)

(58) Field of Classification Search
CPC .............. H01J 35/108; H01J 2235/081; H01J 2201/2896; H01J 2235/1225;
(Continued)

(56) References Cited

U.S. PATENT DOCUMENTS

| 1,203,495 A | 10/1916 | Coolidge |
| 1,211,092 A | 1/1917 | Coolidge |

(Continued)

FOREIGN PATENT DOCUMENTS

| CN | 101257851 | 9/2008 |
| CN | 101532969 | 9/2009 |

(Continued)

OTHER PUBLICATIONS

"Diamond," Section 10.4.2 of Zorman et al., "Material Aspects of Micro-Nanoelectromechanical Systems," Chapter 10 of Springer Handbook of Nanotechnology, 2nd ed., Barat Bushan, ed. (Springer Science + Business Media, Inc., New York, 2007), pp. 312-314.

(Continued)

*Primary Examiner* — Chih-Cheng Kao
(74) *Attorney, Agent, or Firm* — Knobbe, Martens, Olson & Bear, LLP

(57) ABSTRACT

A system for x-ray analysis includes at least one x-ray source configured to emit x-rays. The at least one x-ray source includes at least one silicon carbide sub-source on or embedded in at least one thermally conductive substrate and configured to generate the x-rays in response to electron bombardment of the at least one silicon carbide sub-source. At least some of the x-rays emitted from the at least one x-ray source includes Si x-ray emission line x-rays. The system further includes at least one x-ray optical train configured to receive the Si x-ray emission line x-rays and to irradiate a sample with at least some of the Si x-ray emission line x-rays.

34 Claims, 20 Drawing Sheets

(51) Int. Cl.
*H01J 35/14* (2006.01)
*G01N 23/083* (2018.01)
*H01J 35/18* (2006.01)
*G01N 23/2273* (2018.01)

(52) U.S. Cl.
CPC .......... *H01J 35/064* (2019.05); *H01J 35/065* (2013.01); *H01J 35/066* (2019.05); *H01J 35/14* (2013.01); *H01J 35/18* (2013.01); *H01J 2201/2896* (2013.01); *H01J 2235/081* (2013.01); *H01J 2235/1225* (2013.01); *H01J 2235/18* (2013.01)

(58) Field of Classification Search
CPC .... H01J 2235/18; H01J 35/064; H01J 35/065; H01J 35/066; H01J 35/14; H01J 35/18; H01J 2235/1291; H01J 35/112; H01J 35/24; G01N 23/2273; G01N 23/083; G21K 1/06
See application file for complete search history.

(56) References Cited

U.S. PATENT DOCUMENTS

| | | |
|---|---|---|
| 1,215,116 A | 2/1917 | Coolidge |
| 1,328,495 A | 1/1920 | Coolidge |
| 1,355,126 A | 10/1920 | Coolidge |
| 1,790,073 A | 1/1931 | Pohl |
| 1,917,099 A | 7/1933 | Coolidge |
| 1,946,312 A | 2/1934 | Coolidge |
| 2,926,270 A | 2/1960 | Zunick |
| 3,795,832 A | 3/1974 | Holland |
| 4,165,472 A | 8/1979 | Wittry |
| 4,192,994 A | 3/1980 | Kastner |
| 4,227,112 A | 10/1980 | Waugh et al. |
| 4,266,138 A | 5/1981 | Nelson et al. |
| 4,426,718 A | 1/1984 | Hayashi |
| 4,523,327 A | 6/1985 | Eversole |
| 4,573,186 A | 2/1986 | Reinhold |
| 4,642,811 A | 2/1987 | Georgopoulos |
| 4,727,000 A | 2/1988 | Ovshinsky |
| 4,798,446 A | 1/1989 | Hettrick |
| 4,807,268 A | 2/1989 | Wittry |
| 4,940,319 A | 7/1990 | Ueda et al. |
| 4,945,552 A | 7/1990 | Ueda |
| 4,951,304 A | 8/1990 | Piestrup et al. |
| 4,972,449 A | 11/1990 | Upadhya et al. |
| 5,001,737 A | 3/1991 | Lewis et al. |
| 5,008,918 A | 4/1991 | Lee et al. |
| 5,119,408 A | 6/1992 | Little |
| 5,132,997 A | 7/1992 | Kojima |
| 5,148,462 A | 9/1992 | Spitsyn et al. |
| 5,173,928 A | 12/1992 | Momose et al. |
| 5,204,887 A | 4/1993 | Hayashida et al. |
| 5,249,216 A | 9/1993 | Ohsugi et al. |
| 5,276,724 A | 1/1994 | Kumasaka et al. |
| 5,371,774 A | 12/1994 | Cerrina |
| 5,452,142 A | 9/1995 | Hall |
| 5,461,657 A | 10/1995 | Hayashida |
| 5,513,237 A | 4/1996 | Nobuta et al. |
| 5,602,899 A | 2/1997 | Larson |
| 5,604,782 A | 2/1997 | Cash, Jr. |
| 5,629,969 A | 5/1997 | Koshishiba |
| 5,657,365 A | 8/1997 | Yamamoto et al. |
| 5,682,415 A | 10/1997 | O'Hara |
| 5,715,291 A | 2/1998 | Momose |
| 5,729,583 A | 3/1998 | Tang et al. |
| 5,737,387 A | 4/1998 | Smither |
| 5,768,339 A | 6/1998 | O'Hara |
| 5,772,903 A | 6/1998 | Hirsch |
| 5,778,039 A | 7/1998 | Hossain |
| 5,799,056 A | 8/1998 | Gulman |
| 5,812,629 A | 9/1998 | Clauser |
| 5,825,848 A | 10/1998 | Virshup et al. |
| 5,832,052 A | 11/1998 | Hirose et al. |
| 5,857,008 A | 1/1999 | Reinhold |
| 5,878,110 A | 3/1999 | Yamamoto et al. |
| 5,881,126 A | 3/1999 | Momose |
| 5,912,940 A | 6/1999 | O'Hara |
| 5,930,325 A | 7/1999 | Momose |
| 6,108,397 A | 8/2000 | Cash, Jr. |
| 6,108,398 A | 8/2000 | Mazor et al. |
| 6,118,853 A | 9/2000 | Hansen et al. |
| 6,125,167 A | 9/2000 | Morgan |
| 6,181,773 B1 | 1/2001 | Lee et al. |
| 6,195,410 B1 | 2/2001 | Cash, Jr. |
| 6,226,347 B1 | 5/2001 | Golenhofen |
| 6,278,764 B1 | 8/2001 | Barbee, Jr. et al. |
| 6,307,916 B1 | 10/2001 | Rogers et al. |
| 6,359,964 B1 | 3/2002 | Kogan |
| 6,377,660 B1 | 4/2002 | Ukita et al. |
| 6,381,303 B1 | 4/2002 | Vu et al. |
| 6,389,100 B1 | 5/2002 | Verman et al. |
| 6,430,254 B2 | 8/2002 | Wilkins |
| 6,430,260 B1 | 8/2002 | Snyder |
| 6,442,231 B1 | 8/2002 | O'Hara |
| 6,456,688 B1 | 9/2002 | Taguchi et al. |
| 6,463,123 B1 | 10/2002 | Korenev |
| 6,487,272 B1 | 11/2002 | Kutsuzawa |
| 6,504,901 B1 | 1/2003 | Loxley et al. |
| 6,504,902 B2 | 1/2003 | Iwasaki et al. |
| 6,507,388 B2 | 1/2003 | Burghoorn |
| 6,553,096 B1 | 4/2003 | Zhou et al. |
| 6,560,313 B1 | 5/2003 | Harding et al. |
| 6,560,315 B1 | 5/2003 | Price et al. |
| 6,707,883 B1 | 3/2004 | Tiearney et al. |
| 6,711,234 B1 | 3/2004 | Loxley et al. |
| 6,763,086 B2 | 7/2004 | Platonov |
| 6,811,612 B2 | 11/2004 | Gruen et al. |
| 6,815,363 B2 | 11/2004 | Yun et al. |
| 6,829,327 B1 | 12/2004 | Chen |
| 6,847,699 B2 | 1/2005 | Rigali et al. |
| 6,850,598 B1 | 2/2005 | Fryda et al. |
| 6,870,172 B1 | 3/2005 | Mankos et al. |
| 6,885,503 B2 | 4/2005 | Yun et al. |
| 6,891,627 B1 | 5/2005 | Levy et al. |
| 6,914,723 B2 | 7/2005 | Yun et al. |
| 6,917,472 B1 | 7/2005 | Yun et al. |
| 6,934,359 B2 | 8/2005 | Chen |
| 6,947,522 B2 | 9/2005 | Wilson et al. |
| 6,975,703 B2 | 12/2005 | Wilson et al. |
| 7,003,077 B2 | 2/2006 | Jen et al. |
| 7,006,596 B1 | 2/2006 | Janik |
| 7,015,467 B2 | 3/2006 | Maldonado et al. |
| 7,023,950 B1 | 4/2006 | Annis |
| 7,023,955 B2 | 4/2006 | Chen et al. |
| 7,057,187 B1 | 6/2006 | Yun et al. |
| 7,076,026 B2 | 6/2006 | Verman et al. |
| 7,079,625 B2 | 7/2006 | Lenz |
| 7,095,822 B1 | 8/2006 | Yun |
| 7,103,138 B2 | 9/2006 | Pelc et al. |
| 7,110,503 B2 | 9/2006 | Kumakhov |
| 7,119,953 B2 | 10/2006 | Yun et al. |
| 7,120,228 B2 | 10/2006 | Yokhin et al. |
| 7,130,375 B1 | 10/2006 | Yun et al. |
| 7,149,283 B2 | 12/2006 | Hoheisel et al. |
| 7,170,969 B1 | 1/2007 | Yun et al. |
| 7,180,979 B2 | 2/2007 | Momose |
| 7,180,981 B2 | 2/2007 | Wang |
| 7,183,547 B2 | 2/2007 | Yun et al. |
| 7,187,751 B2 | 3/2007 | Kawahara et al. |
| 7,215,736 B1 | 5/2007 | Wang et al. |
| 7,215,741 B2 | 5/2007 | Ukita et al. |
| 7,218,700 B2 | 5/2007 | Huber et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,264,397 B2 | 9/2007 | Ritter |
| 7,268,945 B2 | 9/2007 | Yun et al. |
| 7,286,640 B2 | 10/2007 | Yun et al. |
| 7,297,959 B2 | 11/2007 | Yun et al. |
| 7,298,826 B2 | 11/2007 | Inazuru |
| 7,330,533 B2 | 2/2008 | Sampayon |
| 7,346,148 B2 | 3/2008 | Ukita |

(56) References Cited

U.S. PATENT DOCUMENTS

| | | |
|---|---|---|
| 7,346,204 B2 | 3/2008 | Ito |
| 7,349,525 B2 | 3/2008 | Morton |
| 7,359,487 B1 | 4/2008 | Newcome |
| 7,365,909 B2 | 4/2008 | Yun et al. |
| 7,365,918 B1 | 4/2008 | Yun et al. |
| 7,382,864 B2 | 6/2008 | Hebert et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,412,024 B1 | 8/2008 | Yun et al. |
| 7,412,030 B1 | 8/2008 | O'Hara |
| 7,412,131 B2 | 8/2008 | Lee et al. |
| 7,414,787 B2 | 8/2008 | Yun et al. |
| 7,433,444 B2 | 10/2008 | Baumann |
| 7,440,542 B2 | 10/2008 | Baumann |
| 7,443,953 B1 | 10/2008 | Yun et al. |
| 7,443,958 B2 | 10/2008 | Harding |
| 7,453,981 B2 | 11/2008 | Baumann |
| 7,463,712 B2 | 12/2008 | Zhu et al. |
| 7,474,735 B2 | 1/2009 | Spahn |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,522,698 B2 | 4/2009 | Popescu |
| 7,522,707 B2 | 4/2009 | Steinlage et al. |
| 7,522,708 B2 | 4/2009 | Heismann |
| 7,529,343 B2 | 5/2009 | Safai et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,583,789 B1 | 9/2009 | Macdonald et al. |
| 7,601,399 B2 | 10/2009 | Barnola et al. |
| 7,605,371 B2 | 10/2009 | Yasui et al. |
| 7,639,786 B2 | 12/2009 | Baumann |
| 7,646,843 B2 | 1/2010 | Popescu et al. |
| 7,653,177 B2 | 1/2010 | Baumann et al. |
| 7,672,433 B2 | 3/2010 | Zhong et al. |
| 7,680,243 B2 | 3/2010 | Yokhin et al. |
| 7,738,629 B2 | 6/2010 | Chen |
| 7,787,588 B1 | 8/2010 | Yun et al. |
| 7,796,725 B1 | 9/2010 | Yun et al. |
| 7,796,726 B1 | 9/2010 | Gendreau et al. |
| 7,800,072 B2 | 9/2010 | Yun et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,426 B2 | 1/2011 | Yun et al. |
| 7,864,922 B2 | 1/2011 | Kawabe |
| 7,873,146 B2 | 1/2011 | Okunuki et al. |
| 7,876,883 B2 | 1/2011 | O'Hara |
| 7,889,838 B2 | 2/2011 | David et al. |
| 7,889,844 B2 | 2/2011 | Okunuki et al. |
| 7,899,154 B2 | 3/2011 | Chen et al. |
| 7,902,528 B2 | 3/2011 | Hera et al. |
| 7,914,693 B2 | 3/2011 | Jeong et al. |
| 7,920,673 B2 | 4/2011 | Lanza et al. |
| 7,920,676 B2 | 4/2011 | Yun et al. |
| 7,924,973 B2 | 4/2011 | Kottler et al. |
| 7,929,667 B1 | 4/2011 | Zhuang et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 7,991,120 B2 | 8/2011 | Okunuki et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,036,341 B2 | 11/2011 | Lee |
| 8,058,621 B2 | 11/2011 | Kommareddy |
| 8,068,579 B1 | 11/2011 | Yun et al. |
| 8,073,099 B2 | 12/2011 | Niu et al. |
| 8,094,784 B2 | 1/2012 | Morton |
| 8,139,711 B2 | 3/2012 | Takahashi |
| 8,139,716 B2 | 3/2012 | Okunuki et al. |
| 8,165,270 B2 | 4/2012 | David et al. |
| 8,184,771 B2 | 5/2012 | Murakoshi |
| 8,208,602 B2 | 6/2012 | Lee |
| 8,208,603 B2 | 6/2012 | Sato |
| 8,233,587 B2 | 7/2012 | Sato |
| 8,243,879 B2 | 8/2012 | Itoh et al. |
| 8,243,884 B2 | 8/2012 | Rödhammer et al. |
| 8,249,220 B2 | 8/2012 | Verman et al. |
| 8,280,000 B2 | 10/2012 | Takahashi |
| 8,306,183 B2 | 11/2012 | Koehler |
| 8,306,184 B2 | 11/2012 | Chang et al. |
| 8,331,534 B2 | 12/2012 | Silver |
| 8,351,569 B2 | 1/2013 | Baker |
| 8,351,570 B2 | 1/2013 | Nakamura |
| 8,353,628 B1 | 1/2013 | Yun et al. |
| 8,357,894 B2 | 1/2013 | Toth et al. |
| 8,360,640 B2 | 1/2013 | Reinhold |
| 8,374,309 B2 | 2/2013 | Donath |
| 8,406,378 B2 | 3/2013 | Wang et al. |
| 8,416,920 B2 | 4/2013 | Okumura et al. |
| 8,422,633 B2 | 4/2013 | Lantz et al. |
| 8,423,127 B2 | 4/2013 | Mahmood et al. |
| 8,451,975 B2 | 5/2013 | Tada |
| 8,422,637 B2 | 6/2013 | Okunuki et al. |
| 8,488,743 B2 | 7/2013 | Verman |
| 8,509,386 B2 | 8/2013 | Lee et al. |
| 8,520,803 B2 | 8/2013 | Behling |
| 8,526,575 B1 | 9/2013 | Yun et al. |
| 8,532,257 B2 | 9/2013 | Mukaide et al. |
| 8,553,843 B2 | 10/2013 | Drory |
| 8,559,594 B2 | 10/2013 | Ouchi |
| 8,559,597 B2 | 10/2013 | Chen et al. |
| 8,565,371 B2 | 10/2013 | Bredno |
| 8,576,983 B2 | 11/2013 | Baeumer |
| 8,588,372 B2 | 11/2013 | Zou et al. |
| 8,591,108 B2 | 11/2013 | Tada |
| 8,602,648 B1 | 12/2013 | Jacobsen et al. |
| 8,632,247 B2 | 1/2014 | Ishii |
| 8,644,451 B2 | 2/2014 | Aoki et al. |
| 8,666,024 B2 | 3/2014 | Okunuki et al. |
| 8,666,025 B2 | 3/2014 | Klausz |
| 8,699,667 B2 | 4/2014 | Steinlage et al. |
| 8,735,844 B1 | 5/2014 | Khaykovich et al. |
| 8,737,565 B1 | 5/2014 | Lyon et al. |
| 8,744,048 B2 | 6/2014 | Lee et al. |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,831,174 B2 | 9/2014 | Kohara |
| 8,831,175 B2 | 9/2014 | Silver et al. |
| 8,831,179 B2 | 9/2014 | Adler et al. |
| 8,837,680 B2 | 9/2014 | Tsujii |
| 8,855,265 B2 | 10/2014 | Engel |
| 8,859,977 B2 | 10/2014 | Kondoh |
| 8,861,682 B2 | 10/2014 | Okunuki et al. |
| 8,903,042 B2 | 12/2014 | Ishii |
| 8,908,824 B2 | 12/2014 | Kondoh |
| 8,972,191 B2 | 3/2015 | Stampanoni et al. |
| 8,989,351 B2 | 3/2015 | Vogtmeier et al. |
| 8,989,474 B2 | 3/2015 | Kido et al. |
| 8,995,622 B2 | 3/2015 | Adler et al. |
| 9,001,967 B2 | 4/2015 | Baturin |
| 9,001,968 B2 | 4/2015 | Kugland et al. |
| 9,007,562 B2 | 4/2015 | Marconi et al. |
| 9,008,278 B2 | 4/2015 | Lee et al. |
| 9,016,943 B2 | 4/2015 | Jacobsen et al. |
| 9,020,101 B2 | 4/2015 | Omote et al. |
| 9,025,725 B2 | 5/2015 | Kiyohara et al. |
| 9,029,795 B2 | 5/2015 | Sando |
| 9,031,201 B2 | 5/2015 | Sato |
| 9,036,773 B2 | 5/2015 | David et al. |

(56) References Cited

U.S. PATENT DOCUMENTS

| | | |
|---|---|---|
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,251,995 B2 | 2/2016 | Ogura |
| 9,257,254 B2 | 2/2016 | Ogura et al. |
| 9,263,225 B2 | 2/2016 | Morton |
| 9,280,056 B2 | 3/2016 | Clube et al. |
| 9,281,158 B2 | 3/2016 | Ogura |
| 9,291,578 B2 | 3/2016 | Adler |
| 9,329,141 B2 | 5/2016 | Stutman |
| 9,336,917 B2 | 5/2016 | Ozawa et al. |
| 9,357,975 B2 | 6/2016 | Baturin |
| 9,362,081 B2 | 6/2016 | Bleuet |
| 9,370,084 B2 | 6/2016 | Sprong et al. |
| 9,390,881 B2 | 7/2016 | Yun et al. |
| 9,412,552 B2 | 8/2016 | Aoki et al. |
| 9,430,832 B2 | 8/2016 | Koehler et al. |
| 9,439,613 B2 | 9/2016 | Stutman |
| 9,445,775 B2 | 9/2016 | Das |
| 9,448,190 B2 | 9/2016 | Yun et al. |
| 9,449,780 B2 | 9/2016 | Chen |
| 9,449,781 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,502,204 B2 | 11/2016 | Ikarashi |
| 9,520,260 B2 | 12/2016 | Hesselink et al. |
| 9,524,846 B2 | 12/2016 | Sato et al. |
| 9,532,760 B2 | 1/2017 | Anton et al. |
| 9,543,109 B2 | 1/2017 | Yun et al. |
| 9,551,677 B2 | 1/2017 | Mazor et al. |
| 9,557,280 B2 | 1/2017 | Pfeiffer et al. |
| 9,564,284 B2 | 2/2017 | Gerzoskovitz |
| 9,570,264 B2 | 2/2017 | Ogura et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,595,415 B2 | 3/2017 | Ogura |
| 9,632,040 B2 | 4/2017 | Stutman |
| 9,658,174 B2 | 5/2017 | Omote |
| 9,700,267 B2 | 7/2017 | Baturin et al. |
| 9,715,989 B2 * | 7/2017 | Dalakos .................. H01J 35/12 |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,837,178 B2 | 12/2017 | Nagai |
| 9,842,414 B2 | 12/2017 | Koehler |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 9,934,930 B2 | 4/2018 | Parker et al. |
| 9,939,392 B2 | 4/2018 | Wen |
| 9,970,119 B2 | 5/2018 | Yokoyama |
| 10,014,148 B2 | 7/2018 | Tang et al. |
| 10,020,158 B2 | 7/2018 | Yamada |
| 10,028,716 B2 | 7/2018 | Rossl |
| 10,045,753 B2 | 8/2018 | Teshima |
| 10,068,740 B2 | 9/2018 | Gupta |
| 10,074,451 B2 | 9/2018 | Kottler et al. |
| 10,076,297 B2 | 9/2018 | Bauer |
| 10,085,701 B2 | 10/2018 | Hoshino |
| 10,105,112 B2 | 10/2018 | Utsumi |
| 10,115,557 B2 | 10/2018 | Ishii |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,182,194 B2 | 1/2019 | Karim et al. |
| 10,217,596 B2 | 2/2019 | Liang et al. |
| 10,231,687 B2 | 3/2019 | Kahn et al. |
| 10,247,683 B2 | 4/2019 | Yun et al. |
| 10,256,001 B2 | 4/2019 | Yokoyama |
| 10,264,659 B1 | 4/2019 | Miller et al. |
| 10,267,752 B2 | 4/2019 | Zhang et al. |
| 10,267,753 B2 | 4/2019 | Zhang et al. |
| 10,269,528 B2 | 4/2019 | Yun et al. |
| 10,295,485 B2 | 5/2019 | Yun et al. |
| 10,295,486 B2 | 5/2019 | Yun et al. |
| 10,297,359 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,393,683 B2 | 8/2019 | Hegeman et al. |
| 10,401,309 B2 | 9/2019 | Yun et al. |
| 10,416,099 B2 | 9/2019 | Yun et al. |
| 10,429,325 B2 | 10/2019 | Ito et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,743,396 B1 | 8/2020 | Kawase |
| 10,782,252 B2 | 9/2020 | Gateshki et al. |
| 10,794,845 B2 | 10/2020 | Filsinger |
| 10,841,515 B1 | 11/2020 | Tsujino |
| 2001/0006413 A1 | 7/2001 | Burghoorn |
| 2002/0080916 A1 | 6/2002 | Jiang |
| 2002/0085676 A1 | 7/2002 | Snyder |
| 2003/0142790 A1 | 1/2003 | Zhou et al. |
| 2003/0054133 A1 | 3/2003 | Wadley et al. |
| 2003/0112923 A1 | 6/2003 | Lange |
| 2003/0142781 A1 | 7/2003 | Kawahara |
| 2003/0223536 A1 | 12/2003 | Yun et al. |
| 2004/0047446 A1 | 3/2004 | Platonov |
| 2004/0076260 A1 | 4/2004 | Charles, Jr. |
| 2004/0120463 A1 | 6/2004 | Wilson et al. |
| 2004/0140432 A1 | 7/2004 | Maldonado et al. |
| 2005/0025281 A1 | 2/2005 | Verman et al. |
| 2005/0074094 A1 | 4/2005 | Jen et al. |
| 2005/0123097 A1 | 6/2005 | Wang |
| 2005/0163284 A1 | 7/2005 | Inazuru |
| 2005/0201520 A1 | 9/2005 | Smith et al. |
| 2005/0282300 A1 | 12/2005 | Yun et al. |
| 2006/0045234 A1 | 3/2006 | Pelc |
| 2006/0062350 A1 | 3/2006 | Yokhin |
| 2006/0182322 A1 | 8/2006 | Bernhardt et al. |
| 2006/0233309 A1 | 10/2006 | Kutzner et al. |
| 2006/0239405 A1 | 10/2006 | Verman |
| 2007/0030959 A1 | 2/2007 | Ritter |
| 2007/0071174 A1 | 3/2007 | Hebert et al. |
| 2007/0108387 A1 | 5/2007 | Yun et al. |
| 2007/0110217 A1 | 5/2007 | Ukita |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2008/0084966 A1 | 4/2008 | Aoki et al. |
| 2008/0089484 A1 | 4/2008 | Reinhold |
| 2008/0094694 A1 | 4/2008 | Yun et al. |
| 2008/0099935 A1 | 5/2008 | Egle |
| 2008/0116398 A1 | 5/2008 | Hara |
| 2008/0117511 A1 | 5/2008 | Chen |
| 2008/0159475 A1 | 7/2008 | Mazor et al. |
| 2008/0159707 A1 | 7/2008 | Lee et al. |
| 2008/0165355 A1 | 7/2008 | Yasui et al. |
| 2008/0170662 A1 | 7/2008 | Reinhold |
| 2008/0170668 A1 | 7/2008 | Kruit et al. |
| 2008/0181363 A1 | 7/2008 | Fenter et al. |

(56) References Cited

U.S. PATENT DOCUMENTS

| | | |
|---|---|---|
| 2008/0240344 A1 | 10/2008 | Reinhold |
| 2008/0273662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2009/0316860 A1 | 12/2009 | Okunuki et al. |
| 2010/0012845 A1 | 1/2010 | Baeumer et al. |
| 2010/0027739 A1 | 2/2010 | Lantz et al. |
| 2010/0040202 A1 | 2/2010 | Lee |
| 2010/0046702 A1 | 2/2010 | Chen et al. |
| 2010/0061508 A1 | 3/2010 | Takahashi |
| 2010/0091947 A1 | 4/2010 | Niu |
| 2010/0141151 A1 | 6/2010 | Reinhold |
| 2010/0246765 A1 | 9/2010 | Murakoshi |
| 2010/0260315 A1 | 10/2010 | Sato et al. |
| 2010/0272239 A1 | 10/2010 | Lantz et al. |
| 2010/0284513 A1 | 11/2010 | Kawabe |
| 2011/0026680 A1 | 2/2011 | Sato |
| 2011/0038455 A1 | 2/2011 | Silver et al. |
| 2011/0058655 A1 | 3/2011 | Okumura et al. |
| 2011/0064191 A1 | 3/2011 | Toth et al. |
| 2011/0064202 A1 | 3/2011 | Thran et al. |
| 2011/0085644 A1 | 4/2011 | Verman |
| 2011/0135066 A1 | 6/2011 | Behling |
| 2011/0142204 A1 | 6/2011 | Zou et al. |
| 2011/0235781 A1 | 9/2011 | Aoki et al. |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0057669 A1 | 3/2012 | Vogtmeier et al. |
| 2012/0163547 A1 | 6/2012 | Lee et al. |
| 2012/0163554 A1 | 6/2012 | Tada |
| 2012/0224670 A1 | 9/2012 | Kiyohara et al. |
| 2012/0228475 A1 | 9/2012 | Pang et al. |
| 2012/0269323 A1 | 10/2012 | Adler et al. |
| 2012/0269324 A1 | 10/2012 | Adler |
| 2012/0269325 A1 | 10/2012 | Adler et al. |
| 2012/0269326 A1 | 10/2012 | Adler et al. |
| 2012/0294420 A1 | 11/2012 | Nagai |
| 2013/0011040 A1 | 1/2013 | Kido et al. |
| 2013/0032727 A1 | 2/2013 | Kondoe |
| 2013/0039460 A1 | 2/2013 | Levy |
| 2013/0108012 A1 | 5/2013 | Sato |
| 2013/0108022 A1 | 5/2013 | Kugland et al. |
| 2013/0195246 A1 | 8/2013 | Tamura et al. |
| 2013/0223594 A1 | 8/2013 | Sprong et al. |
| 2013/0235976 A1 | 9/2013 | Jeong et al. |
| 2013/0251100 A1 | 9/2013 | Sasaki et al. |
| 2013/0259207 A1 | 10/2013 | Omote et al. |
| 2013/0279651 A1 | 10/2013 | Yokoyama |
| 2013/0308112 A1 | 11/2013 | Clube et al. |
| 2013/0308754 A1 | 11/2013 | Yamazaki et al. |
| 2014/0023973 A1 | 1/2014 | Marconi et al. |
| 2014/0029729 A1 | 1/2014 | Kucharczyk |
| 2014/0037052 A1 | 2/2014 | Adler |
| 2014/0064445 A1 | 3/2014 | Adler |
| 2014/0072104 A1 | 3/2014 | Jacobsen et al. |
| 2014/0079188 A1 | 3/2014 | Hesselink et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0177800 A1 | 6/2014 | Sato et al. |
| 2014/0185778 A1 | 7/2014 | Lee et al. |
| 2014/0205057 A1 | 7/2014 | Koehler et al. |
| 2014/0211919 A1 | 7/2014 | Ogura et al. |
| 2014/0226785 A1 | 8/2014 | Stutman et al. |
| 2014/0241493 A1 | 8/2014 | Yokoyama |
| 2014/0270060 A1 | 9/2014 | Date et al. |
| 2014/0369469 A1 | 12/2014 | Ogura et al. |
| 2014/0369471 A1 | 12/2014 | Ogura et al. |
| 2015/0030126 A1 | 1/2015 | Radicke |
| 2015/0030127 A1 | 1/2015 | Aoki et al. |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0092924 A1 | 4/2015 | Yun et al. |
| 2015/0110252 A1 | 4/2015 | Yun et al. |
| 2015/0117599 A1 | 4/2015 | Yun et al. |
| 2015/0194287 A1 | 7/2015 | Yun et al. |
| 2015/0243397 A1 | 8/2015 | Yun et al. |
| 2015/0247811 A1* | 9/2015 | Yun ........................ G01B 15/02 378/45 |
| 2015/0260663 A1 | 9/2015 | Yun et al. |
| 2015/0323478 A1 | 11/2015 | Stutman |
| 2015/0357069 A1 | 12/2015 | Yun et al. |
| 2016/0064175 A1 | 3/2016 | Yun et al. |
| 2016/0066870 A1 | 3/2016 | Yun et al. |
| 2016/0106387 A1 | 4/2016 | Kahn |
| 2016/0178540 A1 | 6/2016 | Yun et al. |
| 2016/0178541 A1 | 6/2016 | Hwang et al. |
| 2016/0206259 A1 | 7/2016 | Auclair et al. |
| 2016/0268094 A1 | 9/2016 | Yun et al. |
| 2016/0320320 A1 | 11/2016 | Yun et al. |
| 2016/0351370 A1 | 12/2016 | Yun et al. |
| 2017/0018392 A1 | 1/2017 | Cheng |
| 2017/0047191 A1* | 2/2017 | Yun ........................ G01N 23/223 |
| 2017/0052128 A1 | 2/2017 | Yun et al. |
| 2017/0074809 A1 | 3/2017 | Ito |
| 2017/0162288 A1 | 6/2017 | Yun et al. |
| 2017/0162359 A1 | 6/2017 | Tang et al. |
| 2017/0176356 A1* | 6/2017 | Hoffman ............... G01N 23/207 |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0144901 A1 | 5/2018 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0344276 A1 | 12/2018 | DeFreitas et al. |
| 2018/0348151 A1 | 12/2018 | Kasper et al. |
| 2018/0356355 A1 | 12/2018 | Momose et al. |
| 2019/0017942 A1 | 1/2019 | Filevich |
| 2019/0017946 A1 | 1/2019 | Wack et al. |
| 2019/0018824 A1 | 1/2019 | Zarkadas |
| 2019/0019647 A1 | 1/2019 | Lee et al. |
| 2019/0027265 A1 | 1/2019 | Dey et al. |
| 2019/0043689 A1 | 2/2019 | Camus |
| 2019/0057832 A1 | 2/2019 | Durst et al. |
| 2019/0064084 A1 | 2/2019 | Ullom et al. |
| 2019/0086342 A1 | 3/2019 | Pois et al. |
| 2019/0088439 A1 | 3/2019 | Honda |
| 2019/0113466 A1 | 4/2019 | Karim et al. |
| 2019/0115184 A1 | 4/2019 | Zalubovsky |
| 2019/0131103 A1 | 5/2019 | Tuohimaa |
| 2019/0132936 A1 | 5/2019 | Steck et al. |
| 2019/0154892 A1 | 5/2019 | Moldovan |
| 2019/0172681 A1 | 6/2019 | Owen et al. |
| 2019/0189385 A1 | 6/2019 | Liang et al. |
| 2019/0204246 A1 | 7/2019 | Hegeman et al. |
| 2019/0204757 A1 | 7/2019 | Brussard et al. |
| 2019/0206652 A1 | 7/2019 | Akinwande et al. |
| 2019/0212281 A1 | 7/2019 | Shchegrov |
| 2019/0214216 A1 | 7/2019 | Jeong et al. |
| 2019/0216416 A1 | 7/2019 | Koehler et al. |
| 2019/0219713 A1 | 7/2019 | Booker et al. |
| 2019/0261935 A1 | 8/2019 | Kitamura |
| 2019/0272929 A1 | 9/2019 | Omote et al. |
| 2019/0304735 A1 | 10/2019 | Safai et al. |
| 2019/0311874 A1 | 10/2019 | Tuohimma et al. |
| 2019/0317027 A1 | 10/2019 | Tsuboi et al. |
| 2019/0331616 A1 | 10/2019 | Schaff et al. |
| 2019/0341219 A1 | 11/2019 | Zhang et al. |
| 2019/0341220 A1 | 11/2019 | Parker et al. |
| 2019/0353802 A1 | 11/2019 | Steinhauser et al. |
| 2019/0374182 A1 | 12/2019 | Karim et al. |
| 2019/0380193 A1 | 12/2019 | Matsuhana et al. |
| 2019/0387602 A1 | 12/2019 | Woywode et al. |

(56) References Cited

U.S. PATENT DOCUMENTS

| | | |
|---|---|---|
| 2019/0391087 A1 | 12/2019 | Matejka et al. |
| 2020/0003708 A1 | 1/2020 | Kobayashi et al. |
| 2020/0003712 A1 | 1/2020 | Kataoka et al. |
| 2020/0041429 A1 | 2/2020 | Cho et al. |
| 2020/0058462 A1 | 2/2020 | Suzuki |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0105492 A1 | 4/2020 | Behling et al. |
| 2020/0154552 A1 | 5/2020 | Suzuki et al. |
| 2020/0155088 A1 | 5/2020 | Gruener et al. |
| 2020/0158662 A1 | 5/2020 | Horiba et al. |
| 2020/0163195 A1 | 5/2020 | Steck et al. |
| 2020/0168427 A1 | 5/2020 | Krokhmal et al. |
| 2020/0182806 A1 | 6/2020 | Kappler et al. |
| 2020/0187339 A1 | 6/2020 | Freudenberger et al. |
| 2020/0191732 A1 | 6/2020 | Taniguchi et al. |
| 2020/0194212 A1 | 6/2020 | Dalakos et al. |
| 2020/0203113 A1 | 6/2020 | Ponard |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0234908 A1 | 7/2020 | Fishman et al. |
| 2020/0279351 A1 | 9/2020 | Ratner et al. |
| 2020/0292475 A1 | 9/2020 | Cao et al. |
| 2020/0297297 A1 | 9/2020 | Kok et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0305809 A1 | 10/2020 | Schwoebel et al. |
| 2020/0319120 A1 | 10/2020 | Kitamura et al. |
| 2020/0321184 A1 | 10/2020 | Parker et al. |
| 2020/0330059 A1 | 10/2020 | Fredenberg et al. |
| 2020/0337659 A1 | 10/2020 | Sano et al. |
| 2020/0378904 A1 | 12/2020 | Albarqouni et al. |
| 2020/0378905 A1 | 12/2020 | Safai |
| 2020/0378907 A1 | 12/2020 | Morton |
| 2020/0378908 A1 | 12/2020 | Fujimura et al. |
| 2020/0388461 A1 | 12/2020 | Behling et al. |
| 2020/0398509 A1 | 12/2020 | Sanli et al. |

FOREIGN PATENT DOCUMENTS

| | | |
|---|---|---|
| CN | 102124537 A | 7/2011 |
| CN | 102325498 | 1/2012 |
| CN | 102551761 A | 7/2012 |
| EP | 0432568 | 6/1991 |
| EP | 0751533 | 1/1997 |
| EP | 1028451 | 8/2000 |
| EP | 1169713 | 1/2006 |
| EP | 3093867 A1 | 11/2016 |
| FR | 2548447 | 1/1985 |
| JP | H06-188092 | 7/1994 |
| JP | H07-056000 | 3/1995 |
| JP | H07-194592 | 8/1995 |
| JP | H08-128971 | 5/1996 |
| JP | H08-184572 | 7/1996 |
| JP | H11-304728 | 11/1999 |
| JP | H11-352079 | 12/1999 |
| JP | 2000-306533 | 11/2000 |
| JP | 2001-021507 | 1/2001 |
| JP | 2003-149392 | 5/2003 |
| JP | 2003-288853 | 10/2003 |
| JP | 2004-089445 | 3/2004 |
| JP | 2004-518262 | 6/2004 |
| JP | 2007-218683 | 8/2007 |
| JP | 2007-265981 | 10/2007 |
| JP | 2007-311185 | 11/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-212058 | 9/2009 |
| JP | 2010-236986 | 10/2010 |
| JP | 2011-029072 | 2/2011 |
| JP | 2011-033537 | 2/2011 |
| JP | 2011-218147 | 11/2011 |
| JP | 2012-032387 | 2/2012 |
| JP | 2012-187341 | 10/2012 |
| JP | 2012-254294 | 12/2012 |
| JP | 2013-508683 | 3/2013 |
| JP | 2015-529984 | 7/2013 |
| JP | 2013-157269 | 8/2013 |
| JP | 2013-160637 | 8/2013 |
| JP | 2013-181811 | 9/2013 |
| JP | 2013-239317 | 11/2013 |
| JP | 2015-002074 | 1/2015 |
| JP | 2015-047306 | 3/2015 |
| JP | 2015-072263 | 4/2015 |
| JP | 2015-077289 | 4/2015 |
| JP | 2017-040618 | 2/2017 |
| KR | 10-2012-0091591 A | 8/2012 |
| KR | 10-2014-0059688 | 5/2014 |
| WO | WO 1995/006952 | 3/1995 |
| WO | WO 1998/011592 | 3/1998 |
| WO | WO 2002/039792 | 5/2002 |
| WO | WO 2003/081631 | 10/2003 |
| WO | WO 2005/109969 | 11/2005 |
| WO | WO 2006/096052 | 9/2006 |
| WO | WO 2007/125833 | 11/2007 |
| WO | WO 2008/068044 | 6/2008 |
| WO | WO 2009/098027 | 8/2009 |
| WO | WO 2009/1104560 | 8/2009 |
| WO | WO 2010/109909 | 9/2010 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/118593 | 8/2013 |
| WO | WO 2013/160153 | 10/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/066333 | 5/2015 |
| WO | WO 2015/084466 | 6/2015 |
| WO | WO 2015/152490 | 10/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/204850 | 11/2017 |
| WO | WO 2017-204850 A1 | 11/2017 |
| WO | WO 2017/213996 | 12/2017 |
| WO | WO 2018/122213 | 7/2018 |
| WO | WO 2018/175570 | 9/2018 |

OTHER PUBLICATIONS

"Element Six CVD Diamond Handbook" (Element Six, Luxembourg, 2015).

"High performance benchtop EDXRF spectrometer with Windows® software," published by: Rigaku Corp., Tokyo, Japan; 2017.

"Monochromatic Doubly Curved Crystal Optics," published by: X-Ray Optical Systems, Inc. (XOS), East Greenbush, NY; 2017.

"Optics and Detectors," Section 4 of X-Ray Data Booklet, 3rd Ed., A.C. Thompson ed. (Lawrence Berkeley Nat'l Lab, Berkeley, CA, 2009).

"Properties of Solids," Ch. 12 of CRC Handbook of Chemistry and Physics, 90th ed., Devid R. Lide & W.M. "Mickey" Haynes, eds. (CRC Press, Boca Raton, FL, 2009), pp. 12-41-12-46; 12-203-12-212.

"Science and Technology of Future Light Sources", Arthur L. Robinson (LBNL) and Brad Plummer (SLAG), eds. Report Nos. ANL-08/39 / BNL-81895-2008 / LBNL-1090E-2009 / SLAC-R-917 (Lawrence Berkeley Nat'l Lab, Berkeley, CA, Dec. 2008).

"Series 5000 Packaged X-ray Tubes," Product Technical Data Sheet DS006 Rev. G, X-Ray Technologies Inc. (Oxford Instruments), Scotts Valley, CA (no date).

(56) References Cited

OTHER PUBLICATIONS

"Toward Control of Matter: Energy Science Needs for a New Class of X-Ray Light Sources" (Lawrence Berkeley Nat'l Lab, Berkeley, CA, Sep. 2008).
"X-ray Optics for BES Light Source Facilities," Report of the Basic Energy Sciences Workshop on X-ray Optics for BES Light Source Facilities, D. Mills & H. Padmore, Co-Chairs, (U.S. Dept. of Energy, Office of Science, Potomac, MD, Mar. 2013).
Abullian et al., "Quantitative determination of the lateral density and intermolecular correlation between proteins anchored on the membrane surfaces using grazing incidence small-angle X-ray scattering and grazing incidence X-ray fluorescence," Nov. 28, 2012, The Journal of Chemical Physics, vol. 137, pp. 204907-1 to 204907-8.
Adachi et al., "Development of the 17-inch Direct-Conversion Dynamic Flat-panel X-ray Detector (FPD)," Digital R/F (Shimadzu Corp., 2 pages (no date, published—2004 with product release).
Aharonovich et al., "Diamond Nanophotonics," Adv. Op. Mat'ls vol. 2, Issue 10 (2014).
Als-Nielsen et al., "Phase contrast imaging" Sect. 9.3 of Ch. 9 of "Elements of Modern X-ray Physics, Second Edition" , (John Wiley & Sons Ltd, Chichester, West Sussex, UK, 2011), pp. 318-329.
Als-Nielsen et al., "Photoelectric Absorption," Ch. 7 of "Elements of Modern X-ray Physics, Second Edition," (John Wiley & Sons Ltd, Chichester, West Sussex, UK, 2011).
Als-Nielsen et al., "Refraction and reflection from interfaces," Ch. 3 of "Elements of Modern X-ray Physics, Second Edition," (John Wiley & Sons Ltd., Chichester, West Sussex, UK, 2011), pp. 69-112.
Als-Nielsen et al., "X-rays and their interaction with matter", and "Sources", Ch. 1 & 2 of "Elements of Modern X-ray Physics, Second Edition" (John Wiley & Sons Ltd, Chichester, West Sussex, UK, 2011).
Altapova et al., "Phase contrast laminography based on Talbot interferometry," Opt. Express, vol. 20, No. 6, (2012) pp. 6496-6508.
Ando et al., "Smooth and high-rate reactive ion etching of diamond," Diamond and Related Materials, vol. 11, (2002) pp. 824-827.
Arfelli et al., "Mammography with Synchrotron Radiation: Phase-Detection Techniques," Radiology vol. 215, (2000), pp. 286-293.
Arndt et al., Focusing Mirrors for Use with Microfocus X-ray Tubes, 1998, Journal of Applied Crystallography, vol. 31, pp. 733-741.
Bachucki et al., "Laboratory-based double X-ray spectrometer for simultaneous X-ray emission and X-ray absorption studies," J. Anal. Atomic Spectr. DOI:10.1039/C9JA00159J (2019).
Balaic et al., "X-ray optics of tapered capillaries," Appl. Opt. vol. 34 (Nov. 1995) pp. 7263-7272.
Baltes et al., "Coherent and incoherent grating reconstruction," J. Opt. Soc. Am. A vol. 3(8), (1986), pp. 1268-1275.
Barbee Jr., "Multilayers for x-ray optics," Opt. Eng. vol. 25 (Aug. 1986) pp. 898-915.
Baron et al., "A compact optical design for Bragg reflections near backscattering," J. Synchrotron Rad., vol. 8 (2001), pp. 1127-1130.
Bech, "In-vivo dark-field and phase-contrast x-ray imaging," Scientific Reports 3, (2013), Article No. 03209.
Bech, "X-ray imaging with a grating interferometer," University of Copenhagen PhD. Thesis, (May 1, 2009).
Bergamin et al., "Measuring small lattice distortions in Si-crystals by phase-contrast x-ray topography," J. Phys. D: Appl. Phys. vol. 33 (Dec. 31, 2000) pp. 2678-2682.
Bernstorff, "Grazing Incidence Small Angle X-ray Scattering (GISAXS)," Presentation at Advanced School on Synchrotron and Free Electron Laser Sources and their Multidisciplinary Applications, Apr. 2008, Trieste, Italy.
Bilderback et al., "Single Capillaries," Ch. 29 of "Handbook of Optics vol. III, 2nd Ed." (McGraw Hill, New York, 2001).
Birkholz, "Chapter 4: Grazing Incidence Configurations," Thin Film Analysis by X-ray Scattering (Wiley-VCH Verlag GmbH & Co. KGaA, Weinheim, Germany, 2006).

Bjeoumikhov et al., "A modular system for XRF and XRD applications consisting of a microfocus X-ray source and different capillary optics," X-ray Spectrometry, vol. 33 (2004), pp. 312-316.
Bjeoumikhov et al., "Capillary Optics for X-Rays," Ch. 18 of "Modern Developments in X-Ray and Neutron Optics," A. Erko et al., eds. (Springer, Berlin, Germany, 2008), pp. 287-306.
Canberra Model S-5005 WinAxil X-Ray Analysis Software, published by: Canberra Eurisys Benelux N.V./S.A.,Zellik, Belgium; Jun. 2004.
Cerrina, "The Schwarzschild Objective," Ch. 27 of "Handbook of Optics vol. III, 2nd Ed." (McGraw Hill, New York, 2001).
Chen et al., "Advance in detection of low sulfur content by wavelength dispersive XRF," Proceedings of the Annual ISA Analysis Division Symposium (2002).
Chen et al., "Doubly curved crystal (DCC) X-ray optics and applications," Powder Diffraction, vol. 17(2) (2002), pp. 99-103.
Chen et al., "Guiding and focusing neutron beams using capillary optics," Nature vol. 357 (Jun. 4, 1992), pp. 391-393.
Chervenak et al., "Experimental thick-target bremsstrahlung spectra from electrons in the range 10 to 30 keV", Phys. Rev. A vol. 12 (1975), pp. 26-33.
Chon, "Measurement of Roundness for an X-Ray Mono-Capillary Optic by Using Computed Tomography," J. Korean Phys. Soc. vol. 74, No. 9, pp. 901-906 (May 2019).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cockcroft et al., "Chapter 2: Experimental Setups," Powder Diffraction: Theory and Practice, R.E. Dinnebier and S.J.L. Billinge, eds (Royal Society of Chemistry Publishing, London, UK, 2008).
Cohen et al., "Tunable laboratory extended x-ray absorption fine structure system," Rev. Sci. Instr. vol. 51, No. 3, Mar. 1980, pp. 273-277.
Cong et al., "Fourier transform-based iterative method for differential phase-contrast computed tomography", Opt. Lett. vol. 37 (2012), pp. 1784-1786.
Cornaby et al., "Advances in X-ray Microfocusing with Monocapillary Optics at CHESS," CHESS News Magazine (2009), pp. 63-66.
Cornaby et al., "Design of Single-Bounce Monocapillary X-ray Optics," Advances in X-ray Analysis: Proceedings of the 55th Annual Conference on Applications of X-ray Analysis, vol. 50, (International Centre for Diffraction Data (ICDD), 2007), pp. 194-200.
Cornaby, "The Handbook of X-ray Single Bounce Monocapillary Optics, Including Optical Design and Synchrotron Applications" (PhD Dissertation, Cornell University, Ithaca, NY, May 2008).
David et al., "Fabrication of diffraction gratings for hard x-ray phase contrast imaging," Microelectron. Eng. vol. 84, (2007), pp. 1172-1177.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages). Jun. 18, 2010.
Ding et al., "Reactive Ion Etching of CVD Diamond Films for MEMS Applications," Micromachining and Microfabrication, Proc. SPIE vol. 4230 (2000), pp. 224-230.
Dobrovinskaya et al., "Thermal Properties," Sect. 2.1.5 of "Sapphire: Material, Manufacturing,, Applications" (Springer Science + Business Media, New York, 2009).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.

(56) References Cited

OTHER PUBLICATIONS

Falcone et al., "New directions in X-ray microscopy," Contemporary Physics, vol. 52, No. 4, (Jul.-Aug. 2010), pp. 293-318.
Fernández-Ruiz, "TXRF Spectrometry as a Powerful Tool for the Study of Metallic Traces in Biological Systems," Development in Analytical Chemistry, vol. 1 (2014), pp. 1-14.
Freund, "Mirrors for Synchrotron Beamlines," Ch. 26 of "Handbook of Optics vol. III, 2nd Ed." (McGraw Hill, New York, 2001).
Ge et al., "Investigation of the partially coherent effects in a 2D Talbot interferometer," Anal. Bioanal. Chem. vol. 401, (2011), pp. 865-870. Apr. 29, 2011 pub Jun. 14, 2011.
Gibson et al., "Polycapillary Optics: An Enabling Technology for New Applications," Advances in X-ray Analysis, vol. 45 (2002), pp. 286-297.
Gonzales et al., "Angular Distribution of Bremsstrahlung Produced by 10-Kev and 20 Kev Electrons Incident on a Thick Au Target", in Application of Accelerators in Research and Industry, AIP Conf. Proc. 1221 (2013), pp. 114-117.
Gonzales et al., "Angular distribution of thick-target bremsstrahlung produced by electrons with initial energies ranging from 10 to 20 keV incident on Ag", Phys. Rev. A vol. 84 (2011): 052726.
Günther et al., "Full-field structured-illumination super-responution X-ray transmission microscopy," Nature Comm. 10:2494 (2019) and supplementary information.
Guttmann et al., "Ellipsoidal capillary as condenser for the BESSY full-field x-ray microscope," J. Phys. Conf. Ser. vol. 186 (2009): 012064.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Harasse et al., "X-ray Phase Laminography with Talbot Interferometer", in Developments in X-Ray Tomography VII, Proc. SPIE vol. 7804 (2010), 780411.
Hasse et al., "New developments in laboratory-based x-ray sources and optics," Adv. In Laboratory-based X-Ray Sources, Optics, and Applications VI, ed. A.M, Khounsary, Proc. SPIE vol. 10387, 103870B-1 (2017).
Hemraj-Benny et al., "Near-Edge X-ray Absorption Fine Structure Spectroscopy as a Tool for Investigating Nanomaterials," Small, vol. 2(1), (2006), pp. 26-35.
Henke et al., "X-ray interactions: photoabsorption, scattering, transmission, and reflection at E=50-30000 eV, Z=1-92," Atomic Data and Nuclear Data Tables, vol. 54 (No. 2) (Jul. 1993), pp. 181-342.
Hennekam et al., "Trace metal analysis of sediment cores using a novel X-ray fluorescence core scanning method," Quaternary Int'l, https://doi.org/10.1016/j.quaint.2018.10.018 (2018).
Honma et al., Full-automatic XAFS Measurement System of the Engineering Science Research II beamline BL14B2 at Spring-8, 2011, AIP Conference Proceedings 1234, pp. 13-16.
Howard et al., "High-Definition X-ray Fluorescence Elemental Mapping of Paintings," Anal. Chem., 2012, vol. 84(7), pp. 3278-3286.
Howells, "Gratings and Monochromators in the VUV and Soft X-RAY Spectral Region," Ch. 21 of Handbook of Optics vol. III, 2nd Ed. (McGraw Hill, New York, 2001).
Howells, "Mirrors for Synchrotron-Radiation Beamlines," Publication LBL-34750 (Lawrence Berkeley Laboratory, Berkeley, CA, Sep. 1993).
Hrdý et al, "Diffractive-Refractive Optics: X-ray Crystal Monochromators with Profiled Diffracting Surfaces," Ch. 20 of "Modern Developments in X-Ray and Neutron Optics," A. Erko et al., eds. (Springer, Berlin Heidelberg New York, 2008).
Hwang et al, "New etching process for device fabrication using diamond," Diamond & Related Materials, vol. 13 (2004) pp. 2207-2210.
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Ihsan et al., "A microfocus X-ray tube based on a microstructured X-ray target", Nuclear Instruments and Methods in Physics Research B vol. 267 (2009) pp. 3566-3573.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Janssens et al, "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Jin et al., "Development of an X-ray tube with two selective targets modulated by a magnetic field," Rev. Sci. Inst. vol. 90, 083105 (2019).
Joy, "Astronomical X-ray Optics," Ch. 28 of "Handbook of Optics vol. III, 2nd Ed.," (McGraw Hill, New York, 2001).
Kalasová et al., "Characterization of a laboratory-based X-ray computed nonotomography system for propagation-based method of phase contrast imaging," IEEE Trans. On Instr. And Meas., DOI 10.1109/TIM.2019.2910338 (2019).
Keyrilainen et al., "Phase contrast X-ray imaging of breast," Acta Radiologica, vol. 51 (8), (2010), pp. 866-884. Jan. 18, 2010 pub Jun. 15, 2010.
Kidalov et al., "Thermal Conductivity of Diamond Composites," Materials, vol. 2 (2009) pp. 2467-2495.
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of he Pohang Light Source—II," J. Korean Phys. Soc., vol. 74, No. 10, pp. 935-940 (May 2019).
Kirkpatrick et al., "Formation of Optical Images by X-Rays", J. Opt. Soc. Am. vol. 38(9) (1948), pp. 766-774.
Kirz, "Phase zone plates for x rays and the extreme uv," J. Op. Soc. Am. vol. 64 (Mar. 1974), pp. 301-309.
Kirz et al., "The History and Future of X-ray Microscopy", J. Physics: Conden. Series vol. 186 (2009): 012001.
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906. Jul. 7, 2010 pub Dec. 7, 2010.
Kumakhov et al., "Multiple reflection from surface X-ray optics," Physics Reports, vol. 191(5), (1990), pp. 289-350.
Kumakhov, "X-ray Capillary Optics. History of Development and Present Status" in Kumakhov Optics and Application, Proc. SPIE 4155 (2000), pp. 2-12.

(56) References Cited

OTHER PUBLICATIONS

Kuwabara et al., "Hard-X-ray Phase-Difference Microscopy with a Low-Brilliance Laboratory X-ray Source", Appl. Phys. Express vol. 4 (2011) 062502.
Kuznetsov, "X-Ray Optics Calculator," Institute of Microelectronics Technology and High Purity Materials, Russian Academy of Sciences (IMT RAS), Chernogolovka, Russia (6 pages submitted); 2016.
Lagomarsino et al., "Reflective Optical Arrays," Ch. 19 of "Modern Developments in X-Ray and Neutron Optics," A. Erko et al. eds. (Springer, Berlin, Germany, 2008), pp. 307-317.
Lai, "X-Ray Microfocusing Optics," Slide Presentation from Argonne National Laboratory, 71 slides, Cheiron Summer School 2007.
Langhoff et al., "X-ray-Sources," Ch. 2 of "Handbook of Practical X-Ray Fluorescence Analysis," B. Beckhoff et al., eds. (Springer, Berlin Heidelberg New York, 2006), pp. 33-82.
Lechner et al., "Silicon drift detectors for high count rate X-ray spectroscopy at room temperature," Nuclear Instruments and Methods, vol. 458A (2001), pp. 281-287.
Leenaers et al., "Application of Glancing Incidence X-ray Analysis," 1997, X-ray Spectrometry, vol. 26, pp. 115-121.
Lengeler et al., "Refractive X-ray Optics," Ch. 20 of "Handbook of Optics vol. III, 2nd Ed." (McGraw Hill, New York, 2001.
Li et al., "Source-optic-crystal optimisation for compact monochromatic imaging," Proc. SPIE 5537 (2004), pp. 105-114.
Li et al., "X-ray phase-contrast imaging using cascade Talbot-Lau interferometers," Proc. SPIE 10964 (2018), pp. 1096469-1-1096469-6.
Li et al., "Study on High Thermal Conductivity of X-ray Anode with Composite Diamond Substrate," J. Phys.: Conf. Ser., vol. 1300, 012115 (2019).
Lohmann et al., "An interferometer based on the Talbot effect," Optics Communications vol. 2 (1971), pp. 413-415.
Lübcke et al., "Soft X-ray nanoscale imaging using a sub-pixel resolution charge coupled device (CCD) camera," Ref. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Macdonald et al., "An Introduction to X-ray and Neutron Optics," Ch. 19 of "Handbook of Optics vol. III, 2nd Ed." (McGraw Hill, New York, 2001).
Macdonald et al., "Polycapillary and Multichannel Plate X-Ray Optics," Ch. 30 of "Handbook of Optics vol. III, 2nd Ed.," (McGraw Hill, New York, 2001).
Macdonald et al., "Polycapillary X-ray Optics for Microdiffraction," J. Appl. Cryst., vol. 32 (1999) pp. 160-167.
Macdonald, "Focusing Polycapillary Optics and Their Applications," X-Ray Optics and Instrumentation, vol. 2010, (Oct. 2010): 867049.
Maj et al., "Etching methods for improving surface imperfections of diamonds used for x-ray monochromators," Adv. X-ray Anal., vol. 48 (2005), pp. 176-182.
Malgrange, "X-ray Optics for Synchrotron Radiation," ACTA Physica Polonica A, vol. 82(1) (1992) pp. 13-32.
Malzer et al., "A laboratory spectrometer for high throughput X-ray emission spectroscopy in catalysis research," Rev. Sci. Inst. 89, 113111 (2018).
Masuda et al., "Fabrication of Through-Hole Diamond Membranes by Plasma Etching Using Anodic Porous Alumina Mask," Electrochemical and Solid-State Letters, vol. 4(11) (2001) pp. G101-G103.
Matsushita, "Mirrors and Multilayers," Slide Presentation from Photon Factory, Tsukuba, Japan, 65 slides, (Cheiron School 2009, Sprint-8, Japan, Nov. 2009).
Matsushita, "X-ray monochromators," Slide Presentation from Photon Factory, Tsukuba, Japan, 70 slides, (Cheiron School 2009, Spring-8, Japan, Nov. 2009).

Matsuyama et al., "Wavefront measurement for a hard-X-ray nanobeam using single-grating interferometry", Opt Express vol. 20 (2012), pp. 24977-24986.
Miao et al., "Motionless phase stepping in X-ray phase contrast imaging with a compact source," Proceedings of the National Academy of Sciences, vol. 110(48), (2013), pp. 19268-19272.
Michette, "Zone and Phase Plates, Bragg-Fresnel Optics," Ch. 23 of "Handbook of Optics vol. III, 2nd Ed.," (McGraw Hill, New York, 2001).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Biomedical Imaging by Talbot-Type X-Ray Phase Tomography" in Developments in X-Ray Tomography V, Proc. SPIE vol. 6318 (2006) 63180T.
Momose et al., "Grating-Based X-ray Phase Imaging Using Multiline X-ray Source", Jpn. J. Appl. Phys. vol. 48 (2009), 076512.
Momose et al., "Phase Tomography by X-ray Talbot Interferometry for Biological Imaging" Jpn. J. Appl. Phys. vol. 45 2006 pp. 5254-5262.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Sensitivity of X-ray Phase Imaging Based on Talbot Interferometry", Jpn. J. Appl. Phys. vol. 47 (2008), pp. 8077-8080.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds, (Medical Physics Publishing, Madison, WI, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al.,"Demonstration of X-Ray Talbot Interferometry", Jpn. J. Appl. Phys. vol. 42 (2003), pp. L866-L868.
Momose et al.,"Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Montgomery, "Self Imaging Objects of Infinite Aperture," J. Opt. Soc. Am. vol. 57(6), (1967), pp. 772-778.
Morimoto et al., "Development of multiline embedded X-ray targets for X-ray phase contrast imaging," XTOP 2012 Book of Abstracts,

(56) References Cited

OTHER PUBLICATIONS (Ioffe Physical-Technical Institute of the Russian Academy of Sciences, St. Petersburg, Russia, 2012), pp. 74-75.
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Noda et al., "Fabrication of Diffraction Grating with High Aspect Ratio Using X-ray Lithography Technique for X-ray Phase Imaging," Jpn. J. Appl. Phys. vol. 46, (2007), pp. 849-851.
Noda et al., "Fabrication of High Aspect Ratio X-ray Grating Using X-ray Lithography" J. Solid Mech_ Mater. Eng. vol. 3 (2009), pp. 416-423.
Nojeh, "Carbon Nanotube Electron Sources: From Electron Beams to Energy Conversion and Optophononics", ISRN Nanomaterials vol. 2014 (2014): 879827.
Nuhn, "From storage rings to free electron lasers for hard x-rays", J.A37 Phys.: Condens. Matter vol. 16 (2004), pp. S3413-S34121.
Nykanen et al., "X-ray scattering in full-field digital mammography," Med. Phys. vol. 30(7), (2003), pp. 1864-1873.
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Otendal et al., A 9 keV electron-impact liquid-gallium-jet x-ray source, Rev. Sci. Instrum. vol. 79 (2008): 016102.
Oxford Instruments Inc., Series 5000 Model XTF5011 X-ray Tube information, Jun. 1998, 3 pages.
Parrill et al., "GISAXS—Glancing Incidence Small Angle X-ray Scattering," Journal de Physique IV, vol. 3 (Dec. 1993), pp. 411-417.
Paxscan Flat Panel X-ray Imaging, Varian Sales Brochure, (Varian Medical Systems, Palo Alto, CA, Nov. 11, 2004).
Pfeiffer et al., "Hard-X-ray dark-field imaging using a grating interferometer," Nature Materials vol. 7, (2008), pp. 134-137.
Pfeiffer et al., "Hard x-ray phase tomography with low brilliance x-ray sources," Phys. Rev. Lett. vol. 98, (2007), 108105.
Pfeiffer et al., "Phase retrieval and differential phase-contrast imaging with low-brilliance X-ray sources," Nature Physics vol. 2, (2006), pp. 258-261.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Pushie et al., "Elemental and Chemically Specific X-ray Fluorescence Imaging of Biological Systems," Chem. Rev. 114:17, 8499-8541 (2014).
Pushie et al., "Prion protein expression level alters regional copper, iron and zinc content in the mouse brain," Metallomics vol. 3, 206-214 (2011).
Qin et al., "Trace metal imaging with high spatial resolution: Applications in biomedicine," Metallomics, vol. 3 (Jan. 2011), pp. 28-37.
Rayleigh, "On copying diffraction gratings and some phenomena connected therewith," Philos. Mag. vol. 11 (1881), pp. 196-205.
Renaud et al., "Probing surface and interface morphology with Grazing Incidence Small Angle X-ray Scattering," Surface Science Reports, vol. 64:8 (2009), pp. 255-380.
Riege, "Electron Emission from Ferroelectrics—A Review", CERN Report CERN AT/93-18 (CERN, Geneva, Switzerland, Jul. 1993).
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Röntgen, Ueber eine neue Art von Strahlen (Wurzburg Verlag, Wurzburg, Germany, 1896) also, in English, "On a New Kind of Rays," Nature vol. 53 (Jan. 23, 1896). pp. 274-276.
Rovezzi, "Study of the local order around magnetic impurities in semiconductors for spintronics." PhD Dissertation, Condensed Matter, Universite Joseph-Fourier—Grenoble I, 2009, English <tel-00442852>.
Rutishauser, "X-ray grating interferometry for imaging and metrology," 2003, ETH Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS One, vol. 9, Issue 5 (May 2014) e93502.
Scholz, "X-ray Tubes and Monochromators," Technical Workshop EPIC, Universität Würzburg (2007); 41 slides, 2007.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Scordo et al., "Pyrolitic Graphite Mosaic Drystal Thickness and Mosaicity Optimization for an Extended Source Von Hamos X-ray Spectrometer," Condens. Matter Vo. 4, pp. 38-52 (2019).
Scott, "Hybrid Semiconductor Detectors for High Spatial Resolution Phase-contrast X-ray Imaging," Thesis, University of Waterloo, Department of Electrical and Computer Engineering, 2019.
Sebert, "Flat-panel detectors:how much better are they?" Pediatr. Radial. vol. 36 (Suppl 2), (2006), pp. 173-181.
Seifert et al., "Talbot-Lau x-ray phase-contrast setup for fast scanning of large samples," Sci. Rep. 9:4199, pp. 1-11 (2019).
Shen, "Polarizing Crystal Optics," Ch. 25 of "Handbook of Optics vol. III, 2nd Ed.," (McGraw Hill, New York, 2001).
Shields et al., "Overview of Polycapillary X-ray Optics," Powder Diffraction, vol. 17(2) (Jun. 2002), pp. 70-80.
Shimura et al., "Hard x-ray phase contrast imaging using a tabletop Talbot-Lau interferometer with multiline embedded x-ray targets", Opt. Lett. vol. 38(2) (2013), pp. 157-159.
Siddons, "Crystal Monochromators and Bent Crystals," Ch. 22 of "Handbook of Optics vol. III, 2nd Ed.," (McGraw Hill, New York, 2001).
Smith, "Fundamentals of Digital Mammography:Physics, Technology and Practical Considerations," Publication R-BI-016 (Hologic, Inc., Bedford, MA, Mar. 2005).

(56) References Cited

OTHER PUBLICATIONS

Snigirev et al., "Hard X-Ray Microoptics," Ch. 17 of "Modern Developments in X-Ray and Neutron Optics," A. Erko et al., eds (Springer, Berlin, Germany, 2008), pp. 255-285.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Spiller, "Multilayers," Ch. 24 of "Handbook of Optics vol. III, 2nd Ed.," (McGraw Hill, New York, 2001).
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Strüder et al., "Silicon Drift Detectors for X-ray Imaging," Presentation at Detector Workshop on Synchrotron Radiation Instrumentation, 54 slides, (Argonne Nat'l Lab, Argonne, IL Dec. 8, 2005), available at: <http://www.aps.anl.gov/News/Conferences/2005/Synchrotron_Radiation_Instrumentation/Presentations/Strueder.pdf>.
Strüder et al., "X-Ray Detectors," Ch. 4 of "X-ray Spectrometry: Recent Technological Advances," K. Tsuji et al. eds. (John Wiley & Sons, Ltd. Chichester, West Sussex, UK, 2004), pp. 63-131.
Stupple et al., "Modeling of Heat Transfer in an Aluminum X-Ray Anode Employing a Chemical Vapor Deposited Diamond Heat Spreader," J. Heat Transfer, Vo. 140, 124501-1-5 (Dec. 2018).
Sun et al., "Combined optic system based on polycapillary X-ray optics and single-bounce monocapillary optics for focusing X-rays from a conventional laboratory X-ray source," Nucl. Inst. and Methods in Phys. Res. A 802(2015) pp. 5-9.
Sun et al., "Numerical design of in-line X-ray phase-contrast imaging based on ellipsoidal single-bounce monocapillary," Nucl. Inst. and Methods in Phys. Res. A746 (2014) pp. 33-38.
Sunday et al., "X-ray Metrology for the Semiconductor Industry Tutorial," J. Res. Nat'l Inst. Stan. vol. 124: 124003 (2019); https://doi.org/10.6028/jres.124.003.
Suzuki et al., "Hard X-ray Imaging Microscopy using X-ray Guide Tube as Beam Condenser for Field Illumination," J. Phys.: Conf. Ser. vol. 463 (2013): 012028.
Suzuki, "Development of the DIGITEX Safire Cardiac System Equipped with Direct conversion Flat Panel Detector," Digital Angio Technical Report (Shimadzu Corp., Kyoto, Japan, no date, published—2004 with product release).
Takahama, "RADspeed safire Digital General Radiography System Equipped with New Direct-Conversion FPD," Medical Now, No. 62 (2007).
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Takeda et al., "In vivo physiological saline-infused hepatic vessel imaging using a two-crystal-interferometer-based phase-contrast X-ray technique", J. Synchrotron Radiation vol. 19 (2012), pp. 252-256.
Talbot, "Facts relating to optical science No IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tang et al., "Micro-computed tomography (Micro-CT): a novel approach for intraoperative breast cancer specimen imaging," Breast Cancer Res. Treat. vol. 139, pp. 311-316 (2013).
Taniguchi et al., "Diamond nanoimprint lithography," Nanotechnology, vol. 13 (2002) pp. 592-596.
Terzano et al., Recent advances in analysis of trace elements in environmental samples by X-ray based techniques (IUPAC Technical Report), Pure Appl. Chem. 2019.
Tkachuk et al., "High-resolution x-ray tomography using laboratory sources", in Developments in X-Ray Tomography V, Proc. SPIE 6318 (2006): 631810.

Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Touzelbaev et al., "Applications of micron-scale passive diamond layers for the integrated circuits and microelectromechanical systems industries," Diamond and Rel. Mat'ls, vol. 7 (1998) pp. 1-14.
Tsuji et al., "X-Ray Spectrometry: Recent Technological Advances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al.,"Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang et al., "Non-invasive classification of microcalcifications with phase-contrast X-ray mammography," Nature Comm. vol. 5:3797, pp. 1-9 (2014).
Wang, On the single-photon-counting (SPC) modes of imaging using an XFEL source, presented at IWORLD2015.
Wang et al., "Precise patterning of diamond films for MEMS application" Journal of Materials Processing Technology vol. 127 (2002), pp. 230-233.
Wang et al., "Measuring the average slope error of a single-bounce ellopsoidal glass monocapillary X-ray condenser based on an X-ray source with an adjustable source size," Nucl. Inst. and Meth. A934, 36-40 (2019).
Wang et al., "High beam-current density of a 10-keV nano-focus X-ray source," Nucl. Inst. and Meth. A940, 475-478 (2019).
Wansleben et al., "Photon flux determination of a liquid-metal jet x-ray source by means of photon scattering," arXiv:1903.06024v1, Mar. 14, 2019.
Weitkamp et al., "Design aspects of X-ray grating interferometry," in International Workshop on X-ray and Neutron Phase Imaging with Gratings AIP Conf. Proc. vol. 1466, (2012), pp. 84-89.
Weitkamp et al., "Hard X-ray phase imaging and tomography with a grating interferometer," Proc. SPIE vol. 5535, (2004), pp. 137-142.
Weitkamp et al., "X-ray wavefront diagnostics with Talbot interferometers," International Workshop on X-Ray Diagnostics and Scientific Application of the European XFEL, Ryn, Poland, (2010), 36 slides.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wittry et al., "Properties of fixed-position Bragg diffractors for parallel detection of x-ray spectra," Rev. Sci. Instr. vol. 64, pp. 2195-2200 (1993).
Wobrauschek et al., "Energy Dispersive, X-Ray Fluorescence Analysis," Encyclopedia of Analytical Chemistry, R.A. Meyers, Ed. (Wiley 2010).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.

(56) References Cited

OTHER PUBLICATIONS

Wolter, "Spiegelsysteme streifenden Einfalls als abbildende Optiken fur Rontgenstrahlen" [Grazing Incidence Reflector Systems as Imaging Optics for X-rays] Annalen der Physik vol. 445, Issue 1-2 (1952), pp. 94-114.
X-ray-Optics.de Website, http://www.x-ray-optics.de/, accessed Feb. 13, 2016.
Yakimchuk et al., "Ellipsoidal Concentrators for Laboratory X-ray Sources: Analytical approaches for optimization," Mar. 22, 2013, Crystallography Reports, vol. 58, No. 2, pp. 355-364.
Yamamoto, "Fundamental physics of vacuum electron sources", Reports on Progress in Physics vol. 69, (2006), pp. 181-232.
Yanagihara et al., "X-Ray Optics," Ch. 3 of "X-ray Spectrometry: Recent Technological Advances," K. Tsuji et al. eds. (John Wiley & Sons, Ltd. Chichester, West Sussex, UK, 2004), pp. 63-131.
Yang et al., "Analysis of Intrinsic Stress in Diamond Films by X-ray Diffraction," Advances in X-ray Analysis, vol. 43 (2000), pp. 151-156.
Yashiro et al., "Distribution of unresolvable anisotropic microstructures revealed in visibility-contrast images using x-ray Talbot interferometry", Phys. Rev. B vol. 84 (2011), 094106.
Yashiro et al., "Hard x-ray phase-imaging microscopy using the self-imaging phenomenon of a transmission grating", Phys. Rev. A vol. 82 (2010), 043822.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Efficiency of capturing a phase image using cone-beam x-ray Talbot interferometry", J. Opt. Soc. Am. A vol. 25 (2008), pp. 2025-2039.
Yashiro et al., "On the origin of visibility contrast in x-ray Talbot interferometry", Opt. Express (2010), pp. 16890-16901.
Yashiro et al., "Optimal Design of Transmission Grating for X-ray Talbot Interferometer", Advances in X-ray Analysis vol. 49(3) (2006), pp. 375-379.
Yashiro et al., "X-ray Phase Imaging Microscopy using a Fresnel Zone Plate and a Transmission Grating", in the 10th International Conference on Synchrotron Radiation Instrumentation, AIP Conf. Proc. vol. 1234 (2010), pp. 473-476.
Yashiro et. al., "Hard-X-Ray Phase-Difference Microscopy Using a Fresnel Zone Plate and a Transmission Grating", Phys. Rev. Lett. vol. 103 (2009), 180801.
Yu et al., "Morphology and Microstructure of Tungsten Films by Magnetron Sputtering," Mat. Sci. Forum, vol. 913, pp. 416-423 (2018).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Ellipsoidal and parabolic glass capillaries as condensers for x-ray microscopes," Appl. Opt. vol. 47 (May 2008), pp. 2376-2381.
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Fabrication of Diamond Microstructures by Using Dry and Wet Etching Methods", Plasma Science and Technology vol. 15(6) (Jun. 2013), pp. 552-554.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Behling, "Medical X-ray sources Now and for the Future," Nucl. Inst. and Methods in Physics Research A 873, pp. 43-50 (2017).
Chang et al., "Ultra-high aspect ratio high-resolution nanofabrication of hard X-ray diffractive optics," Nature Comm. 5:4243, doi: 10.1038/ncomms5243 (2014).
Dittler et al., "A mail-in and user facility for X-ray absorption near-edge structure: the CEI-XANES laboratory X-ray spectrometer at University of Washington," J. Synch. Rad. vol. 26, eight pages, (2019).
Huang et al., "Theoretical analysis and optimization of highly efficient multilayer-coated blazed gratings with high fix-focus constant for the tender X-ray region," Op. Express Vo. 28, No. 2, pp. 821-845 (2020).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kulow et al., "On the Way to Full-Field X-ray Fluorescence Spectroscopy Imaging with Coded Apertures," J. Anal. At. Spectrom. Doi: 10.1039/C9JA00232D (2019).
Li et al., "Production and Heat Properties of an X-ray Reflective Anode Based on a Diamond Heat Buffer Layer," Materials vol. 13, p. 241 (2020).
Weitkamp et al., Tomography with grating interferometers at low-brilliance sources, 2006, SPIE, vol. 6318, pp. 0S-1 to 0S-10.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Zhou et al., "Quasi-parallel X-ray microbeam obtained using a parabolic monocapillary X-ray lens with an embedded square-shaped lead occluder," arXiv:2001.04667 (2020).
Akan et al., "Metal-Assisted Chemical Etching and Electroless Deposition for Fabrication of Hard X-ray Pd/Si Zone Plates," Micromachines, vol. 11, 301; doi:10.3390/mi11030301 (2020).
Hashimoto et al., "Improved reconstruction method for phase stepping data with stepping errors and dose fluctuations," Optics Express, vol. 28, No. 11, pp. 16363-16384 (2020).
Momose et al., "Recent Progress in X-ray and Neutron Phase Imaging with Gratings," Quantum Beam Science, vol. 4, No. 9; doi:10.3390/qubs4010009 (2020).
Takeo et al., "Soft x-ray nanobeam formed by an ellipsoidal mirror," Appl. Phys. Lett., vol. 116, 121102 (2020).
Wang et al., "Double-spherically bent crystal high-resolution X-ray spectroscopy of spatially extended sources," Chinese Optics Lett., vol. 18(6), 061101 (2020).
Yamada et al., "Compact full-field hard x-ray microscope based on advanced Kirkpatrick-Baez mirrors," Optica, vol. 7, No. 4 pp. 367-370 (2020).
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
International Search Report and Written Opinion, Application No. PCT/US2019/049553, dated Mar. 4, 2020, in 16 pages.
Datta et al., "A new generation of direct X-ray detectors for medical and synchrotron imaging applications," Sci. Reports, vol. 10, p. 20097 (2020).
Graetz et al., "Lenseless C-ray Nano-Tomography down to 150 nm Resolution: on the Quantification of Modulation Transfer and Focal Spot of the Lab-based ntCT System," arXiv:2009.11749v1 [physics.ins-det] Sep. 24, 2020, 10 pages.
Mijovilovich et al., "Analysis of trace metal distribution in plants with lab-based microscopic X-ray fluorescence imaging," Plant Methods, vol. 16, No. 82, 21 pages (2020).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).

(56) References Cited

OTHER PUBLICATIONS

Paunesku et al., "X-Ray Fluorescence Microprobe Imaging in Biology and Medicine," J. Cell. Biochem. vol. 99, pp. 1489-1502 (2006).
Penkov et al., "X-Ray Calc: A software for the simulation of X-ray reflectivity," SoftwareX, vol. 12, p. 100528 (2020).
Redus et al., "Spectrometer configuration and measurement uncertainty in X-ray spectroscopy," X-Ray Spectrom., pp. 1-14 (2020).
Romano et al., "Microfabrication of X-ray Optics by Metal Assisted Chemical Etching: A Review," Micromachines, vol. 11, No. 589, 23 pages (2020).
Salditt, "Nanoscale Photonic Imaging," Topics in Applied Physics, vol. 134, T. Salditt et al., eds., Springer Open, 2020.
Schunck et al., "Soft x-ray imaging spectroscopy with micrometer resolution," Optica vol. 8, No. 2, pp. 156-160 (2021).
Senba et al., "Stable sub-micrometre high-flux probe for soft X-ray ARPES using a monolithic Wolter mirror," J. Synch. Rad., vol. 27, 5 pages, (2020).
Shi et al., "Towards the Fabrication of High-Aspect-Ratio Silicon Gratings by Deep Reactive Ion Etching," Micromachines, vol. 11, p. 864, 13 pages (2020).
Takeo et al., "A highly efficient nanofocusing system for soft x rays," Appl. Phys. Lett., vol. 117, 151104 (2020).
Taphorn et al., "Grating-based spectral X-ray dark-field imaging for correlation with structural size measures," Sci. Reports, vol. 10, 13195 (2020).
Tucker, "Design of X-Ray Source for Real-Time Computed Tomography," Dissertation, Missouri Univ. of Sci. And Tech., Scholars' Mine, 104 pages (2020).
Vila-Comamala et al., "High sensitivity X-ray phase contrast imaging by laboratory grating-based interferometry at high Talbot order geometry," Op. Express vol. 29, No. 2, pp. 2049-2064 (2021).
Wang et al., "Design and Fabrication of Soft X ray Supermirrors," https://doi.org/10.21203/rs.3.rs-139888/v1 (2021).
Wilde et al., "Modeling of an X-ray grating-based imaging interferometer using ray tracing," Op. Express vol. 28, No. 17, p. 24657 (2020).
Withers et al., "X-ray computed tomography," Nature Reviews | Methods Primers, vol. 1, No. 18, pp. 1-21 (2021).
Yang et al., "Comparative study of single-layer, bilayer, and trilayer mirrors with enhanced x-ray reflectance in 0.5- to 80keV energy region," J. Astron. Telesc. Instrum. Syst., vol. 6(4) 044001, 12 pages (2020).
Zhou et al., "A study of new type electric field modulation multi-target X-ray source," Nucl. Inst. and Methods in Physics Research A, https://doi.org/10.1016/j.nima.2020.164342 (2020).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Buchanan et al., "Effective modelling of high-energy laboratory-based x-ray phase contrast imaging utilising absorption masks or gratings," J. Appl. Physics (accepted) (2020).

\* cited by examiner

| | | | |
|---|---|---|---|
| Al K (1s) binding energy (keV) | 1.56 | | |
| Excitation x-ray energy (keV) | 1.74 (Si Kα₁) | 2.70 (Rh Lα) | 5.42 (Cr Kα₁) |
| Photoelectron kinetic energy (eV) | 180 | 1,137 | 3,855 |
| Photoelectron IMFP (nm) | 0.8 | 1.5 | 3.1 |
| 5% penetration depth (nm) | 2.4 | 4.5 | 9.3 |
| | | | |
| Al L (2p) binding energy (keV) | 0.118 | | |
| Excitation x-ray energy (keV) | 1.74 (Si Kα₁) | 2.70 (Rh Lα) | 5.42 (Cr Kα₁) |
| Photoelectron kinetic energy (eV) | 1,622 | 2,579 | 5,297 |
| Photoelectron IMFP (nm) | 2 | 2.8 | 3.7 |
| 5% penetration depth (nm) | 6 | 8.4 | 11.1 |

$$\lambda = \frac{143}{E^2} + 0.054 \cdot \sqrt{E}$$

| | | | |
|---|---|---|---|
| Ti K (1s) binding energy (keV) | 4.97 | | |
| Excitation x-ray energy (keV) | 1.74 (Si Kα₁) | 2.70 (Rh Lα) | 5.42 (Cr Kα₁) |
| Photoelectron kinetic energy (eV) | | | 449 |
| Photoelectron IMFP (nm) | | | 1 |
| 5% penetration depth (nm) | | | 3 |
| Ti L (2p) binding energy (keV) | 0.454 | | |
| Excitation x-ray energy (keV) | 1.74 (Si Kα₁) | 2.70 (Rh Lα) | 5.42 (Cr Kα₁) |
| Photoelectron kinetic energy (eV) | 1,286 | 2,243 | 4,961 |
| Photoelectron IMFP (nm) | 1.6 | 2.6 | 3.5 |
| 5% penetration depth (nm) | 4.8 | 7.8 | 10.5 |

$$\lambda = \frac{143}{E^2} + 0.054 \cdot \sqrt{E}$$

US 11,056,308 B2

SYSTEM AND METHOD FOR DEPTH-SELECTABLE X-RAY ANALYSIS

CLAIM OF PRIORITY

This application claims the benefit of priority to U.S. Provisional Appl. No. 62/728,574 filed on Sep. 7, 2018 and incorporated in its entirety by reference herein.

BACKGROUND

Field

This application relates generally to systems and methods for analyzing samples using x-rays, and more particularly, to x-ray sources configured to provide soft and/or tender x-rays selectable across an x-ray energy range.

Description of the Related Art

Conventional laboratory-based x-ray sources generate x-rays by bombarding a target material (e.g., solid anode; liquid metal jet) with an electron beam. The generated x-rays include emission (e.g., fluorescence) x-rays generated by the electron beam creating holes in the inner core electron orbitals of the target atoms, which are then filled by electrons of the target with binding energies that are lower than the inner core electron orbitals, with concomitant generation of emission x-rays. The emission x-rays have discrete energies that are characteristic of the target atoms and that are less than the kinetic energy of the electron beam. In addition, the generated x-rays include Bremsstrahlung x-rays generated by the deceleration of the electron beam within the target material, the Bremsstrahlung x-rays having a continuum of energies from zero to the kinetic energy of the electron beam. Generally, in x-ray analysis applications (e.g., x-ray photoelectron spectroscopy) in which x-rays having a predetermined energy irradiate the sample, the target material of the x-ray source is selected based on the characteristic discrete energies of the emission x-rays.

For example, FIG. 1 shows the x-ray photoelectron cross sections for the is, 2p, 3d, and 4s core levels of titanium and the is, 2s, and 2p core levels of oxygen. In addition, FIG. 1 shows the energy of the Al K$\alpha$ emission x-ray line (1.49 keV) (e.g., as can be obtained from conventional Al-based x-ray sources) and the energy of the Ga K$\alpha$ emission x-ray line (9.25 keV) (e.g., as can be obtained from conventional Ga-based liquid jet x-ray sources). In the range of x-ray photon energies between these two example conventional x-ray sources, the one-electron cross-sections of the Ti 2p, Ti 3d, O 1s, and O 2s core levels change by between 2 and 3 orders of magnitude, and the one-electron cross-sections of the Ti 4s and O 2p core levels change by about 4 orders of magnitude.

SUMMARY

In one aspect disclosed herein, a system for x-ray analysis comprises at least one x-ray source configured to emit x-rays. The at least one x-ray source comprises at least one silicon carbide sub-source on or embedded in at least one thermally conductive substrate and configured to generate the x-rays in response to electron bombardment of the at least one silicon carbide sub-source. At least some of the x-rays emitted from the at least one x-ray source comprises Si x-ray emission line x-rays. The system further comprises at least one x-ray optical train configured to receive the Si x-ray emission line x-rays and to irradiate a sample with at least some of the Si x-ray emission line x-rays.

In another aspect disclosed herein, an x-ray source comprises at least one electron source configured to generate at least one electron beam and at least one target. The at least one target comprises at least one thermally conductive substrate and a plurality of sub-sources on or embedded in at least a portion of the at least one thermally conductive substrate. The sub-sources are separate from one another and in thermal communication with the at least one thermally conductive substrate. At least one sub-source of the plurality of the sub-sources comprises silicon carbide and is configured to emit Si x-ray emission line x-rays in response to bombardment by the at least one electron beam.

In another aspect disclosed herein, a method of x-ray analysis comprises bombarding a target material comprising silicon carbide with electrons. The method further comprises emitting Si x-ray emission line x-rays from the target material. The method further comprises irradiating a sample with at least some of the Si x-ray emission line x-rays. The method further comprises detecting x-rays and/or electrons emitted from the sample.

In another aspect disclosed herein, an x-ray illumination system comprises at least one x-ray source comprising at least a first x-ray sub-source and a second x-ray sub-source. The first and second x-ray sub-sources are on or embedded in at least one thermally conductive substrate. The first x-ray sub-source comprises a first material configured to generate first x-rays in response to electron bombardment of the first x-ray sub-source. The second x-ray sub-source comprises a second material different from the first material, the second material configured to generate second x-rays in response to electron bombardment of the second x-ray sub-source. The system further comprises a plurality of x-ray optical trains comprising a first optical train and a second optical train. The first optical train comprises at least one first collimating x-ray mirror, at least one first energy-selective x-ray monochromator or multilayer, and at least one first focusing x-ray mirror. The first optical train is configured to be positioned to direct at least some of the first x-rays emitted from the first x-ray sub-source to irradiate a sample. The second optical train comprises at least one second collimating x-ray mirror, at least one second energy-selective x-ray monochromator or multilayer, and at least one second focusing x-ray mirror. The second optical train is configured to be positioned to direct at least some of the second x-rays emitted from the second x-ray sub-source to irradiate the sample.

In another aspect disclosed herein, an x-ray photoelectron spectroscopy system comprises at least one x-ray source comprising a plurality of x-ray sub-sources on or embedded in at least one thermally conductive substrate. The x-ray sub-sources comprise a plurality of materials configured to generate x-rays in response to electron bombardment. The system further comprises a plurality of x-ray optical trains, each optical train comprising at least one collimating x-ray optical element, at least one energy-selective optical element, and at least one focusing x-ray optical element. The plurality of x-ray optical trains is configured to be positioned to direct at least some of the x-rays emitted from a selected one of the plurality of x-ray sub-sources to irradiate a sample. The system further comprises a sample chamber configured to contain the sample at a sample pressure. The system further comprises a first chamber and a first electrostatic lens contained in the first chamber at a first pressure less than the sample pressure. The sample chamber and the first chamber are separated from one another by a first wall having a first aperture configured to allow at least some photoelectrons from the sample to propagate from the sample chamber to the first chamber. The system further comprises a second chamber and a second electrostatic lens contained in the second chamber at a second pressure less than the first pressure. The first chamber and the second chamber are separated from one another by a second wall having a second aperture configured to allow at least some of the photoelectrons in the first chamber to propagate to the second chamber.

DETAILED DESCRIPTION

Figure 1:
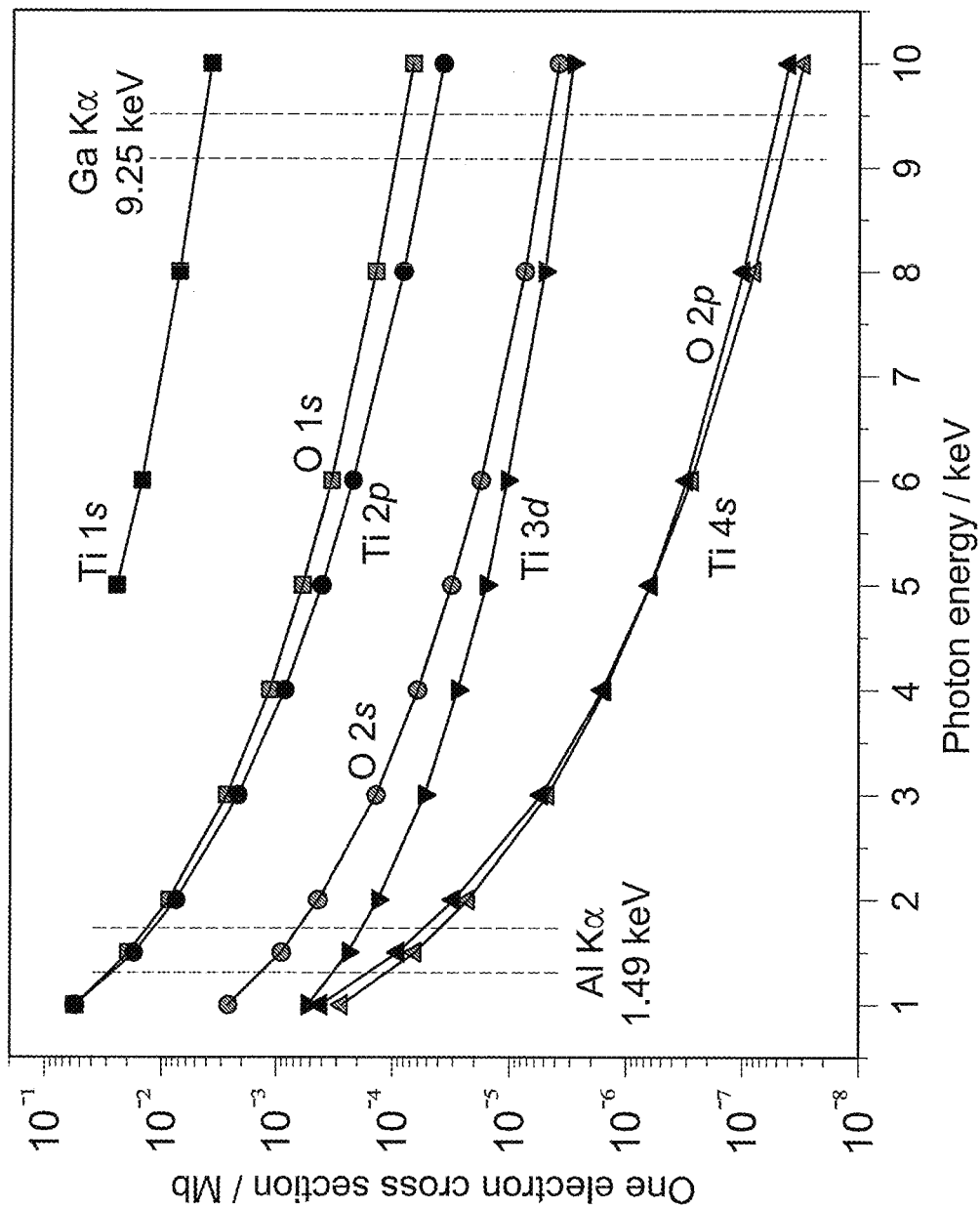
FIG. 1 shows the photoemission cross sections for the is, 2p, 3d, and 4s core levels of titanium and the is, 2s, and 2p core levels of oxygen with the energy of the Al Kα x-ray line (1.49 keV) and the energy of the Ga Kα x-ray line (9.25 keV).

Certain embodiments described herein advantageously provide emission x-rays with energies within the range between the Al Kα x-ray line (1.49 keV) and the Ga Kα x-ray line (9.25 keV). In certain embodiments, these emission x-rays are used to advantageously provide valuable information regarding samples under analysis (e.g., by selecting the emission x-ray energy to optimize the photoelectron cross sections).

Certain embodiments described herein provide a source of soft and/or tender x-rays (e.g., soft x-rays with energies in a range of 0.5 keV to about 1.8 keV; tender x-rays with energies in a range of about 1.8 keV to 6 keV) selectable across a broad energy range for tuning depth sensitivity as well as studying interfaces (e.g., gas/solid; gas/liquid; liquid/solid). The system in certain embodiments is optimized to provide a high flux of monochromatic and focused x-rays. The x-ray source of certain embodiments described herein is mountable on a 4.5" ConFlat® flange, includes a replaceable window (e.g., Be), and includes a mechanism with sufficient travel (e.g., 50 mm) to move and position the x-ray source relative to the x-ray optical elements without breaking vacuum and without requiring re-alignment.

Certain embodiments described herein provide selectable (e.g., tunable) x-ray energies (e.g., selectable among 1.74 keV, 2.7 keV, and 5.4 keV), thereby advantageously providing selectable probing depths (e.g., from 1 nm to 15 nm) for surface, interface, and bulk analysis, and with optimized sensitivity to selected elements (e.g., Hf; Al; Ti). Certain embodiments described herein provide high x-ray energy resolution (e.g., better than 0.7 eV for all energies), small x-ray focus spot sizes (e.g., in a range from 10 μm to 200 μm; 15 μm or less; 20 μm or less; 100 μm or less) for small spot analysis and imaging, and high flux of monochromatic x-rays (e.g., greater than $2 \times 10^9$ photons/second at 100 μm spot size and 200 W or 300 W electron beam power; up to $5 \times 10^9$ photons/second) for high-speed analysis). Certain embodiments described herein provide in situ, in vitro, and/or in operando analysis in combination with small focus spot sizes and high excitation energies, thereby advantageously enabling near-ambient pressure operation. For example, by using an x-ray spot size of 100 μm, certain embodiments described herein can include electron energy analyzer slit sizes of 100 μm, thereby allowing a pressure in the sample region of about 20 mbar, which is comparable to the vapor pressure of water (e.g., about 17 mbar at 15 degrees Celsius). For another example, by using an x-ray spot size of 10 μm, certain embodiments described herein can include electron energy analyzer slit sizes of 10 μm, thereby allowing a pressure in the sample region of about 100 mbar or even higher (e.g., 1 bar), with concomitant reduced signal strength, which can be advantageously used for the study of catalysis. Certain embodiments described herein provide fully automated selection of excitation energy and/or focus spot size, with no cross-contamination of different x-rays.

Figure 2A:
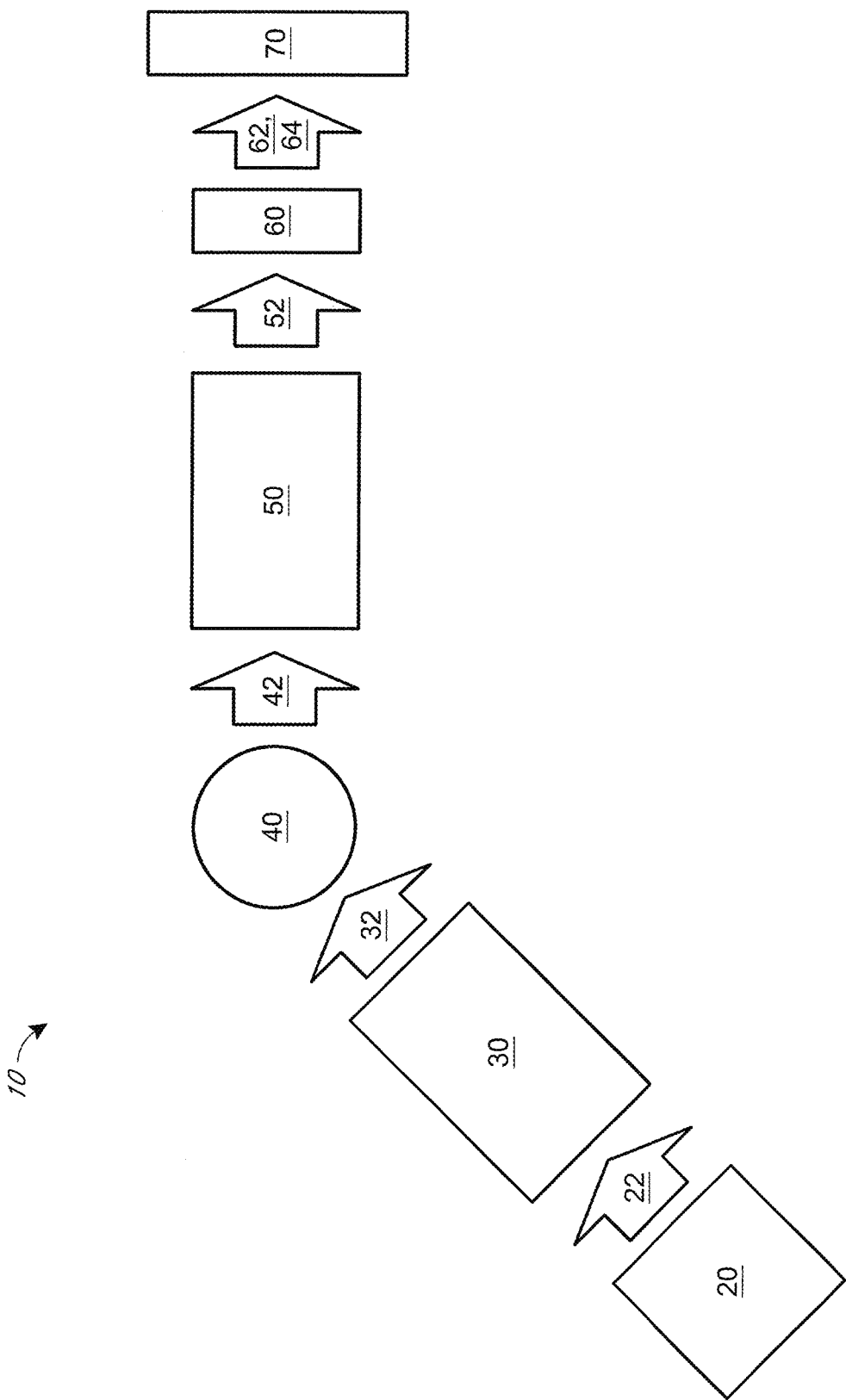
FIGS. 2A-2C schematically illustrate various examples of a system for x-ray analysis in accordance with certain embodiments described herein.
Figure 2B:
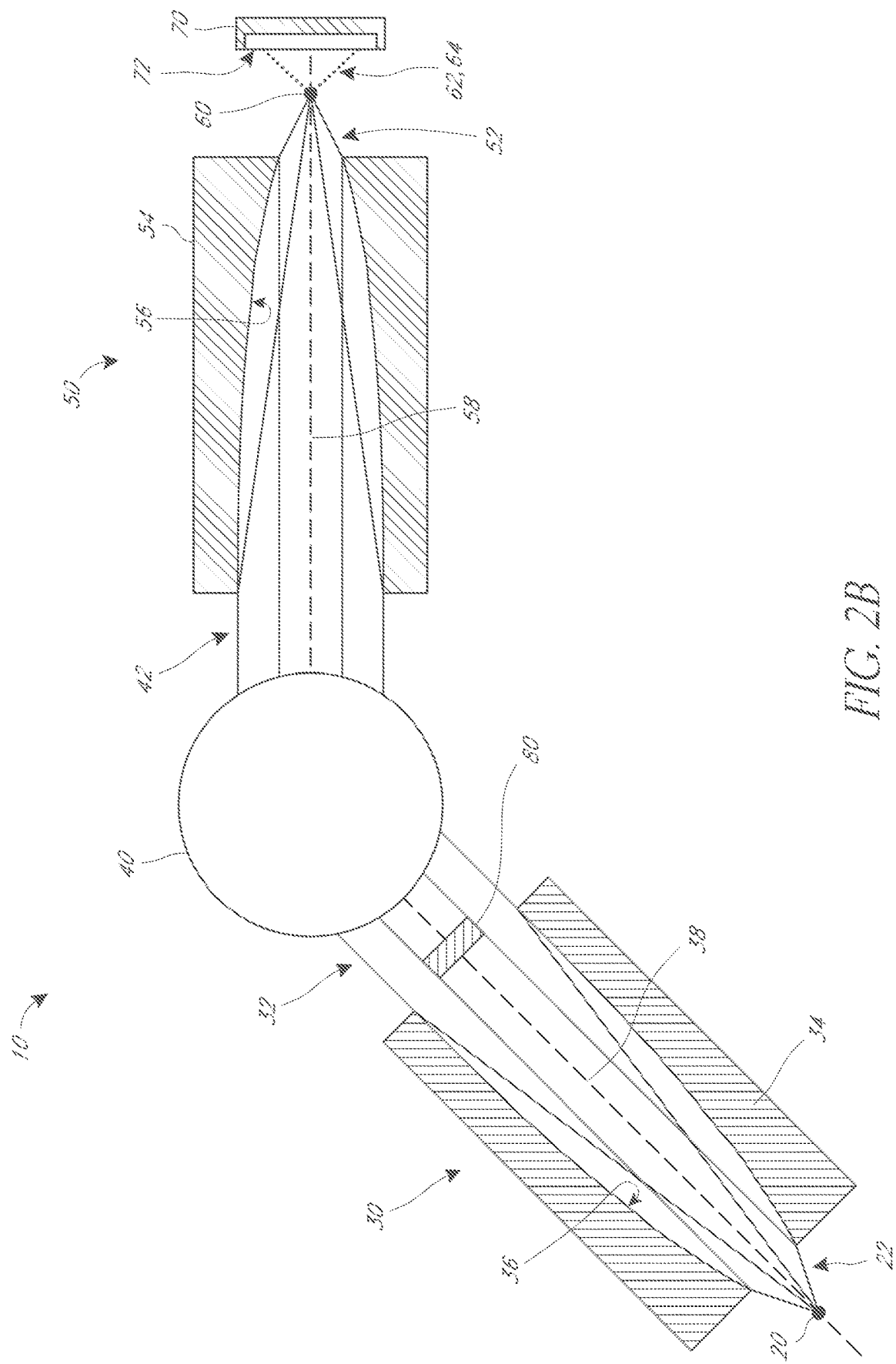
Figure 2C:
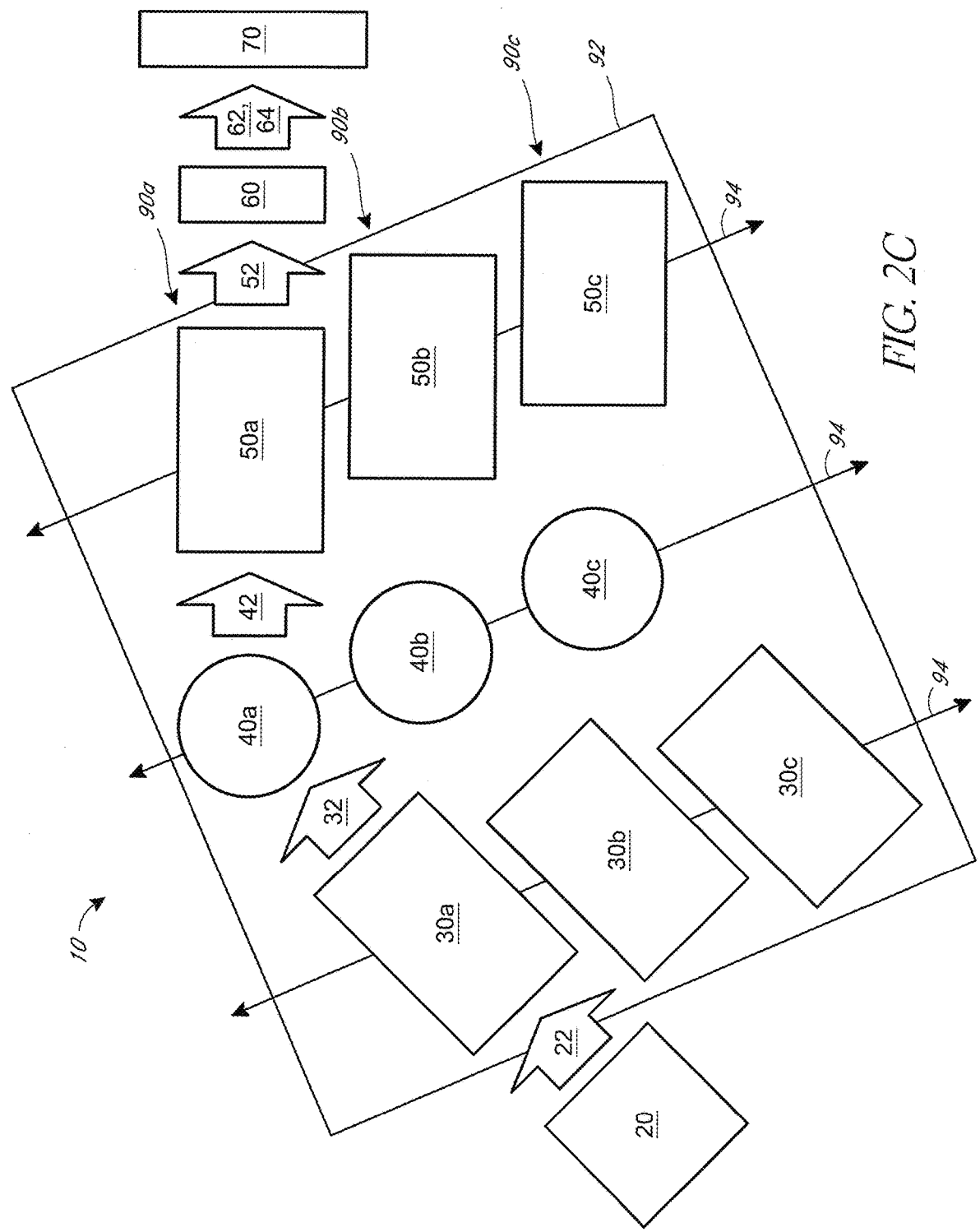

FIGS. 2A-2C schematically illustrate various examples of a system 10 for x-ray analysis in accordance with certain embodiments described herein. The system 10 comprises at least one x-ray source 20 configured to emit x-rays 22. In certain embodiments, the at least one x-ray source 20 comprises at least one silicon carbide sub-source on (e.g., adhered to; affixed to; sputtered onto) or embedded in at least one thermally conductive substrate (e.g., diamond) and configured to generate the x-rays 22 in response to electron bombardment of the at least one silicon carbide sub-source. For example, the at least one silicon carbide sub-source can be in thermal communication with the at least one thermally conductive substrate, thereby providing a heat flow path away from the at least one silicon carbide sub-source. At least some of the x-rays 22 emitted from the at least one silicon carbide sub-source of the at least one x-ray source 20 comprise Si characteristic x-rays (e.g., Si x-ray emission line x-rays; Si K$\alpha_1$ x-ray emission line x-rays; Si x-ray emission line x-rays that have an energy approximately equal to 1.74 keV).

While prior systems have included x-ray sources with anodes having a heat dissipation layer comprising silicon carbide, these the x-ray sources have not been configured to emit Si characteristic x-rays (e.g., the Si K$\alpha_1$ line) generated in the silicon carbide (see, e.g., U.S. Pat. Appl. Publ. No. 2014/0185778). The x-ray source 20 of certain embodiments described herein is optimized to emit the Si characteristic x-rays (e.g., the Si K$\alpha_1$ line) generated in the silicon carbide sub-source (e.g., to provide the Si characteristic x-rays for use by the system 10).

Figure 3:
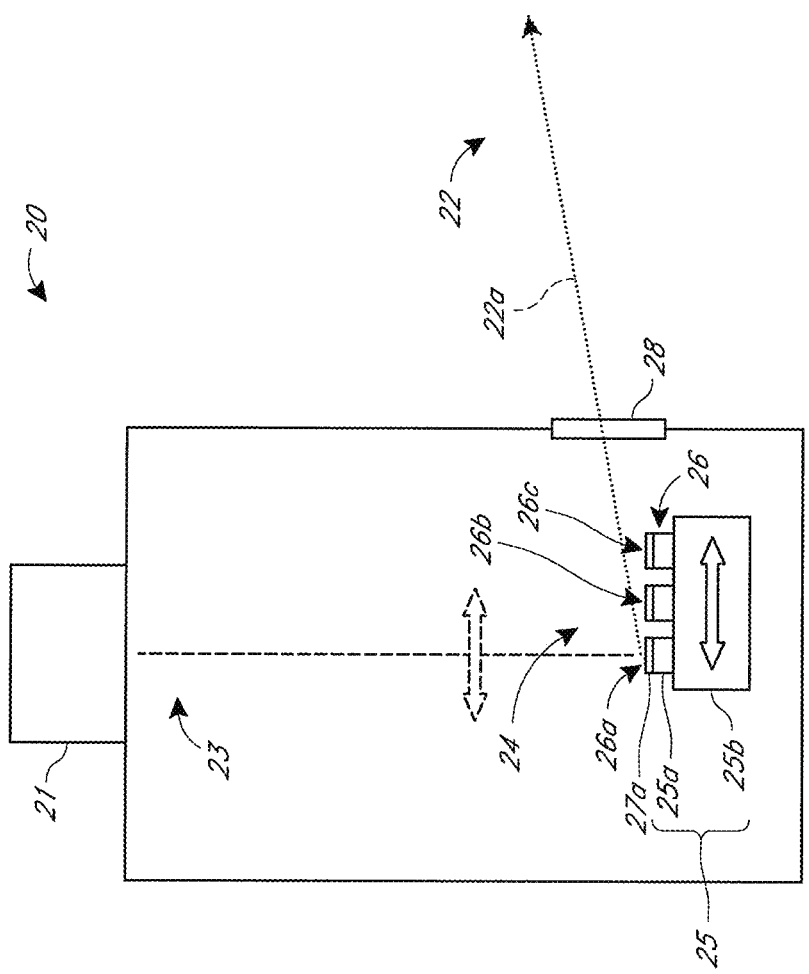
FIG. 3 schematically illustrates an example x-ray source configured to emit x-rays in accordance with certain embodiments described herein.

FIG. 3 schematically illustrates an example x-ray source 20 configured to emit x-rays 22 in accordance with certain embodiments described herein. The x-ray source 20 comprises at least one electron source 21 (e.g., at least one electron gun column having an electron emitter cathode and associated grids, lenses, and power supplies) configured to generate at least one electron beam 23. The x-ray source 20 further comprises at least one target 24 comprising at least one thermally conductive substrate 25 and a plurality of sub-sources 26 on (e.g., adhered to; affixed to; sputtered onto) or embedded in at least a portion of the at least one thermally conductive substrate 25 (e.g., diamond). The sub-sources 26 (e.g., microstructured, sub-micron-sized, or micron-sized) are separate from one another and in thermal communication with the at least one thermally conductive substrate 25. In certain embodiments, at least one sub-source 26a of the plurality of the sub-sources 26 comprises silicon carbide (SiC) and is configured to emit Si x-ray emission line x-rays 22a in response to bombardment by the at least one electron beam 23. For example, the x-rays 22a emitted from the at least one SiC sub-source 26a have energies corresponding to the Si K$_c$L line (1.74 keV). SiC is electrically conductive and has a high melting point, and certain embodiments described herein advantageously use SiC as a target material to generate the x-rays 22a with energies and high fluxes that have previously been unavailable from laboratory-based x-ray sources.

In certain embodiments, the at least one x-ray source 20 is configured to bombard a selected sub-source 26 with the at least one electron beam 23 (e.g., by moving, relative to one another, one or both of the at least one electron beam 23 and the at least one target 24). For example, the at least one electron source 21 of certain embodiments can be configured to direct the at least one electron beam 23 (e.g., via electric and/or magnetic fields) to bombard at least one selected sub-source 26 of the plurality of sub-sources 26 (e.g., as denoted in FIG. 3 by the dashed double-headed arrow). For another example, the at least one target 24 can be mounted on a stage (not shown) to move the at least one target 24 laterally relative to the electron beam 23 (e.g., as denoted in FIG. 3 by the solid double-headed arrow).

As schematically illustrated by FIG. 3, the at least one silicon carbide sub-source 26a of certain embodiments comprises a substrate portion 25a (e.g., diamond) on or embedded in another substrate portion 25b and at least one layer 27a on the substrate portion 25a, the at least one layer 27a comprising silicon carbide. In certain embodiments, the at least one layer 27a comprising silicon carbide is formed (e.g., via chemical vapor deposition, sputtering, sol-gel coating, plasma spraying, and/or reactant spraying) onto the thermally conductive substrate portion 25a. For example, RF or DC magnetron sputtering can be used with a silicon carbide sputtering target (e.g., available from Saint-Gobain Ceramic Material of Courbevoie France or American Elements of Los Angeles Calif.) to form a silicon carbide film (see, e.g., U.S. Pat. No. 5,944,963) on a thermally conductive substrate (e.g., diamond). In certain embodiments, the at least one layer 27a comprising silicon carbide comprises single-crystal silicon carbide (e.g., 4H A-grade, N-type silicon carbide crystal available from MSE Supplies of Tucson Ariz.). In certain embodiments, the silicon carbide is doped to be electrically conductive (e.g., with an electrical conductivity sufficient to prevent charging of the silicon carbide film due to the electron bombardment), while in certain other embodiments, the silicon carbide has an electrically-conductive surface coating (e.g., with nanometer-scale thickness).

In certain embodiments, the at least one layer 27a comprises at least one intermediate layer (e.g., W) between the substrate portion 25a and the silicon carbide, the at least one intermediate layer configured to facilitate adhesion of the silicon carbide to the substrate portion 25a and/or to provide a diffusion barrier between the silicon carbide and the substrate portion 25a. While pure, stoichiometric silicon carbide is a semiconductor, in certain embodiments, the silicon carbide can be non-stoichiometric (e.g., containing excess carbon; a molar ratio of carbon to silicon in a range between 1 and 1.45), can be doped, and/or can be coated with a thin metal layer to provide a predetermined electrical conductivity so that the sub-source 26a is configured to be used in the anode of the x-ray source 20.

In certain embodiments, the plurality of sub-sources 26 comprises at least one first sub-source 26a comprising SiC and at least one second sub-source 26b comprising at least one target material different from SiC (e.g., Al, Ag, Rh, Cr, Au, Ti, Fe, and/or Mo). In certain other embodiments, the plurality of sub-sources 26 comprises a plurality of target materials (e.g., 3, 4, or more) selected from the group consisting of: Al, Ag, Rh, Cr, Au, Ti, Fe, and Mo. The at least one target material can be on (e.g., adhered to; affixed to; sputtered onto) or embedded in a single thermally conductive substrate (e.g., diamond) or a plurality of thermally conductive substrates. For example, the at least one target material can be in thermal communication with the at least one thermally conductive substrate 26, thereby providing a heat flow path away from the at least one target material. The emitted x-rays 22 have energies corresponding to one or more characteristic x-ray lines (e.g., x-ray emission lines) of the at least one target material and ultrahigh source brightness. For example, the emitted x-rays 22 can comprise at least one of: Al Kα x-ray emission line x-rays (about 1.49 keV); Ag Lα x-ray emission line x-rays (about 2.98 keV); Rh Lα x-ray emission line x-rays (about 2.70 keV); Cr Kα$_1$ x-ray emission line x-rays (about 5.42 keV); Au Lα x-ray emission line x-rays (about 9.70 keV); Ti Kα x-ray emission line x-rays (about 4.51 keV); Fe Kα x-ray emission line x-rays (about 6.40 keV); Mo Lα x-ray emission line x-rays (about 2.29 keV); Mo Lβ$_1$ and Mo Lβ$_2$ x-ray emission line x-rays (about 2.39 keV and 2.52 keV, respectively).

In certain embodiments, the at least one x-ray source 20 further comprises an x-ray window 28 (e.g., Be) configured to allow at least some of the Si x-ray emission line x-rays 22a to propagate from a first region within the x-ray source 20 and containing the at least one sub-source 27a, through the x-ray window 28, to a second region outside the x-ray source 20.

In certain embodiments, the at least one target 24 comprises an anode disk configured to be rapidly rotated while under vacuum with different regions of the anode disk along a circular track being sequentially irradiated by the electron beam 23, thereby distributing the heat load from the electron beam 23 over the circular track of the anode disk. In certain such embodiments, the anode disk is cooled by coolant (e.g., water) flowing through cooling channels within the anode disk. In certain other embodiments, the at least one target 24 is radiatively cooled. For example, a rotating anode disk of the at least one target 24 can comprise silicon carbide (which can withstand operating temperatures of about 2000 degrees Celsius), and at least one heat sink can be positioned in close proximity to a surface portion of the rotating anode disk in a region of the rotating anode disk that is separate from the region of the rotating anode disk being irradiated by the electron beam 23. While conventional rotating source anodes with cooling channels can be operated with an electron beam 23 having a power of 1000 W in a spot size of about 80 μm×80 μm, certain embodiments described herein (utilizing a rotating anode disk comprising silicon carbide) can be operated with an electron beam 23 having a power of 200 W or 300 W in a spot size of about 5 μm×5 μm, resulting in at least about a 50× improvement in x-ray brightness (80 μm/5 μm×80 μm/5 μm×200 W/1000 W).

Example parameters of the at least one x-ray source 20 include, but are not limited to: variable anode voltage in a range of 5 keV to 30 keV; electron power of up to 300 W, an electron beam footprint on at least one selected sub-source having a user-selectable size (e.g., full-width-at-half-maximum) with a first lateral dimension within a range of 5 μm to 50 μm (e.g., 5 μm to 25 μm; 10 μm to 50 μm; 10 μm to 25 μm; 25 μm to 50 μm) and a second lateral dimension perpendicular to the first lateral dimension, the second lateral dimension within a range of 30 μm to 200 μm (e.g., 30 μm to 150 μm, 30 μm to 100 μm). Examples of the at least one x-ray source 20 comprising a plurality of sub-sources 26 compatible with certain embodiments described herein are disclosed by U.S. Pat. Nos. 9,874,531, 9,823,203, 9,719, 947, 9,594,036, 9,570,265, 9,543,109, 9,449,781, 9,448,190, and 9,390,881, each of which is incorporated in its entirety by reference herein.

In certain embodiments, the system 10 comprises one or more of: an x-ray photoelectron spectroscopy (XPS) system, a photoemission electron microscopy (PEEM) system, an angle-resolved photoemission spectroscopy (ARPES) system, an ambient-pressure x-ray photoelectron spectroscopy (APXPS) system, an x-ray fluorescence (XRF) system, an x-ray emission (XES) system, an x-ray phase contrast imaging system, and a computed tomography imaging system. Other types of systems and/or applications of the system are also compatible with certain embodiments described herein. The samples under analysis can comprise one or more biological samples (e.g., tissue samples), one or more semiconductor samples, one or more geological samples, and/or other types of samples.

For trace element analysis of semiconductor and geological samples, the use of the Si Kα$_1$ x-ray emission line x-rays can advantageously reduce the background contribution from the silicon in the samples. Since the energy of the Si Kα$_1$ x-ray emission line x-rays (about 1.74 keV) is lower than the Si K absorption edge energy, the Si Kα$_1$ x-ray emission line x-rays do not generate the background photoelectron and/or fluorescence contributions from Si that would be seen if x-rays above the Si K absorption edge energy were used.

In certain embodiments, as schematically illustrated by FIGS. 2A-2C, the system 10 further comprises at least one first x-ray optical element 30 configured to receive at least some of the x-rays 22 emitted from the at least one x-ray source 20 and to generate a collimated first x-ray beam 32. The system 10 further comprises at least one second x-ray optical element 40 configured to receive at least a portion of the collimated first x-ray beam 32 and to emit a monochromatic second x-ray beam 42. The system 10 further comprises at least one third x-ray optical element 50 configured to receive at least a portion of the monochromatic second x-ray beam 42 and to focus a third x-ray beam 52 at a sample 60 to be analyzed.

FIG. 2B schematically illustrates an example system 10 comprising in accordance with certain embodiments described herein. The at least one first x-ray optical element 30 of FIG. 2B comprises at least one x-ray collimating optical element 34 (e.g., mirror; mirror lens) configured to receive at least some of the x-rays 22 emitted from the at least one x-ray source 20 (e.g., including at least some of the Si x-ray emission line x-rays) and to generate the collimated first x-ray beam 32. The surface 36 can be concave and curved in at least one cross-sectional plane parallel to a longitudinal axis 38 of the at least one x-ray collimating optical element 34 (e.g., in a cross-sectional plane that includes the longitudinal axis 38). The at least one x-ray collimating optical element 34 can comprise an axially symmetric x-ray collimating optic (e.g., a paraboloidal mirror lens; a Wolter optic) having a surface 36 configured to collect and to efficiently direct (e.g., reflect; diffract) at least some x-rays 22 from the at least one x-ray source 20 into the collimated first x-ray beam 32. For example, the at least one x-ray sub-source being bombarded by the at least one electron beam can be positioned at or near a focus of the at least one x-ray collimating optical element 30 such that at least some of the emitted x-rays 22 impinge the surface 36 at an incident grazing angle that is smaller than the critical angle and are reflected into the collimated first x-ray beam 32. In certain embodiments, the at least one collimating optical element 34 comprises at least one layer (e.g., a depth-graded multilayer coating; a mosaic crystal layer) at the surface 36, the at least one layer configured to efficiently collect and direct (e.g., reflect; diffract) the x-rays 22 with specific x-ray energies. Examples of x-ray collimating optical elements 34 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

In certain embodiments, the at least one x-ray collimating optical element 34 comprises at least one substrate (e.g., comprising glass or silicon oxide). For example, the at least one substrate can be a single, unitary, hollow, axially symmetric structure (e.g., an axially symmetric tube) comprising an inner surface 36 that extends fully around the longitudinal axis 38 (e.g., encircles the longitudinal axis 38; extends 360 degrees around the longitudinal axis 38). In certain other embodiments, the at least one substrate can comprise a portion of a hollow, axially symmetric structure (e.g., a portion of an axially symmetric tube) extending along the longitudinal axis 38 with a surface 36 that extends only partially around the longitudinal axis 38 (e.g., less than 360 degrees; in a range of 45 degrees to 315 degrees; in a range of 45 degrees to 360 degrees; in a range of 180 degrees to 360 degrees; in a range of 90 degrees to 270 degrees). In certain other embodiments, the at least one substrate comprises multiple portions (e.g., 2, 3, 4, 5, 6, or more) separate from one another (e.g., with spaces between the portions) and distributed around the longitudinal axis 38, with the surface 36 of each portion extending at least partially around and along the longitudinal axis 38. For example, the surfaces 36 of the multiple portions can each extend around the longitudinal axis 38 by an angle in a range of 15 degrees to 175 degrees, in a range of 30 degrees to 115 degrees, and/or in a range of 45 degrees to 85 degrees.

In certain embodiments, at least a portion of the surface 36 has a profile that comprises a portion of a quadric profile in a cross-sectional plane that comprises the longitudinal axis 38. In certain embodiments, the surface 36 comprises multiple portions having cross-sectional profiles (e.g., in a cross-sectional plane that comprises the longitudinal axis 38) comprising corresponding quadric profiles. Examples of quadric profiles compatible with certain embodiments described herein include, but are not limited to: at least one ellipsoid; at least one paraboloid; at least one hyperboloid; or a combination of two or more thereof. In certain embodiments, the surface 36 has a first linear dimension (e.g., length) parallel to the longitudinal axis 38 in a range of 3 mm to 150 mm, a second linear dimension (e.g., width) perpendicular to the first linear dimension in a range of 1 mm to 50 mm, and a maximum linear dimension (e.g., an inner diameter; a maximum length of a straight line segment joining two points on the surface 36) in a range of 1 mm to 50 mm in a plane perpendicular to the longitudinal axis 38, a surface roughness in a range of 0.1 nm to 1 nm, and/or a plurality of surface tangent planes having a range of angles relative to the longitudinal axis 38 in a range of 0.002 radian to 0.5 radian (e.g., in a range of 0.002 radian to 0.4 radian; in a range of 0.002 radian to 0.3 radian; in a range of 0.002 radian to 0.2 radian).

The at least one second x-ray optical element 40 of FIG. 2B comprises at least one energy-selective component (e.g., x-ray monochromator; multilayer; multilayer-coated optical substrate) configured to receive at least a portion of the collimated first x-ray beam 32 and to emit the monochromatic second x-ray beam 42 (e.g., including at least some of the Si x-ray emission line x-rays). In certain embodiments, the at least one second x-ray optical element 40 has an energy resolution better than 2 eV. For example, the at least one second x-ray optical element 40 can comprise at least one x-ray crystal monochromator (e.g., a single-crystal monochromator; a double-crystal monochromator; a quartz monochromator; an InSb(111) monochromator; a Ge(111) monochromator; a Ge(220) monochromator; a Si(111) monochromator) having a resolution of at least $1\times10^{-4}$. For another example, the at least one second x-ray optical element 40 can comprise at least one multilayer-coated optical substrate having a resolution of at least $1\times10^{-3}$. While FIG. 2B schematically illustrate the at least one second x-ray optical element 40 as being separate from the at least one first x-ray optical element 30 and from the at least one third x-ray optical element 50, in certain other embodiments, the at least one second x-ray optical element 40 comprises an energy-selective coating (e.g., a multilayer coating configured to substantially reflect x-rays within a predetermined energy range) at a reflecting surface of the at least one first x-ray optical element 30 and/or at a reflecting surface of the at least one third x-ray optical element 50. Examples of an energy-selective component compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

The at least one third x-ray optical element 50 of FIG. 2B comprises at least one x-ray focusing optical element 54 (e.g., mirror; mirror lens) configured to receive at least a portion of the monochromatic second x-ray beam 42 and to focus the third x-ray beam 52 (e.g., including at least some of the Si x-ray emission line x-rays) at the sample 60 (e.g., focused at a surface region of the sample 60). The surface 56 can be concave and curved in at least one cross-sectional plane parallel to a longitudinal axis 58 of the at least one x-ray focusing optical element 54 (e.g., in a cross-sectional plane that includes the longitudinal axis 58). The at least one x-ray focusing optical element 54 can comprise an axially symmetric x-ray focusing optic (e.g., a paraboloidal mirror lens; a Wolter optic) having a surface 56 configured to collect and to efficiently direct (e.g., reflect; diffract) and focus at least some of the monochromatic second x-ray beam 42 at the sample 60 to be analyzed. For example, the at least one x-ray focusing optical element 50 can be positioned relative to the at least one second x-ray optical element 40 such that the monochromatic second x-ray beam 42 impinges the surface 56 at an incident grazing angle that is smaller than the critical angle and focused by the at least one x-ray focusing optical element 50 into the third x-ray beam 52 with a focus at the sample 60 to be analyzed. In certain embodiments, the at least one x-ray focusing optical element 54 comprises at least one layer (e.g., a depth-graded multilayer coating; a mosaic crystal layer) at the surface 56, the at least one layer configured to efficiently collect the second x-ray beam 42 and to focus the third x-ray beam 52 at the sample 60. Examples of x-ray focusing optical elements 54 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

In certain embodiments, the at least one x-ray focusing optical element 54 comprises at least one substrate (e.g., comprising glass or silicon oxide). For example, the at least one substrate can be a single, unitary, hollow, axially symmetric structure (e.g., an axially symmetric tube) comprising an inner surface 56 that extends fully around the longitudinal axis 58 (e.g., encircles the longitudinal axis 58; extends 360 degrees around the longitudinal axis 58). In certain other embodiments, the at least one substrate can comprise a portion of a hollow, axially symmetric structure (e.g., a portion of an axially symmetric tube) extending along the longitudinal axis 58 with a surface 56 that extends only partially around the longitudinal axis 58 (e.g., less than 360 degrees; in a range of 45 degrees to 315 degrees; in a range of 45 degrees to 360 degrees; in a range of 180 degrees to 360 degrees; in a range of 90 degrees to 270 degrees). In certain other embodiments, the at least one substrate comprises multiple portions (e.g., 2, 3, 4, 5, 6, or more) separate from one another (e.g., with spaces between the portions) and distributed around the longitudinal axis 58, with the surface 56 of each portion extending at least partially around and along the longitudinal axis 58. For example, the surfaces 56 of the multiple portions can each extend around the longitudinal axis 58 by an angle in a range of 15 degrees to 175 degrees, in a range of 30 degrees to 115 degrees, and/or in a range of 45 degrees to 85 degrees.

In certain embodiments, at least a portion of the surface 56 has a profile that comprises a portion of a quadric profile in a cross-sectional plane that comprises the longitudinal axis 58. In certain embodiments, the surface 56 comprises multiple portions having cross-sectional profiles (e.g., in a cross-sectional plane that comprises the longitudinal axis 58) comprising corresponding quadric profiles. Examples of quadric profiles compatible with certain embodiments described herein include, but are not limited to: at least one ellipsoid; at least one paraboloid; at least one hyperboloid; or a combination of two or more thereof. In certain embodiments, the surface 56 has a first linear dimension (e.g., length) parallel to the longitudinal axis 58 in a range of 3 mm to 150 mm, a second linear dimension (e.g., width) perpendicular to the first linear dimension in a range of 1 mm to 50 mm, and a maximum linear dimension (e.g., an inner diameter; a maximum length of a straight line segment joining two points on the surface 56) in a range of 1 mm to 50 mm in a plane perpendicular to the longitudinal axis 58, a surface roughness in a range of 0.1 nm to 1 nm, and/or a plurality of surface tangent planes having a range of angles relative to the longitudinal axis 58 in a range of 0.002 radian to 0.5 radian (e.g., in a range of 0.002 radian to 0.4 radian; in a range of 0.002 radian to 0.3 radian; in a range of 0.002 radian to 0.2 radian).

In certain embodiments, the system 10 further comprises at least one beam stop 80 configured to prevent a non-reflected portion of the x-rays 22 from impinging the at least one second x-ray optical element 40. As schematically illustrated by FIG. 2B, the at least one beam stop 80 can be positioned on a longitudinal axis 38 of the at least one first x-ray optical element 30 (e.g., at or near an upstream end of the at least one first x-ray optical element 30; at or near a downstream end of the at least one first x-ray optical element 30; upstream from the at least one first x-ray optical element 30; downstream from the at least one first x-ray optical element 30). Example beam stops 80 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

In certain embodiments, the system 10 further comprises at least one detector subsystem 70 (e.g., comprising an energy dispersive x-ray energy analyzer and/or an energy dispersive electron energy analyzer) configured to detect x-rays 62 and/or electrons 64 emitted from the sample 60 (e.g., in response to the sample 60 being irradiated by the third x-ray beam 52). For example, for a system 10 selected from the group consisting of an x-ray photoelectron spectroscopy (XPS) system, a photoemission electron microscopy (PEEM) system, and an ambient-pressure x-ray photoelectron spectroscopy (APXPS) system, the at least one detector subsystem 70 can be configured to detect photoelectrons 62 (e.g., with electron energy resolution) emitted from the sample 60 in response to at least a portion of the third x-ray beam 52. For another example, for a system 10 selected from the group consisting of an x-ray fluorescence (XRF) system, an x-ray emission (XES) system, the at least one detector subsystem 70 can be configured to detect emission (e.g., fluorescence) x-rays 64 (e.g., with x-ray energy resolution) emitted from the sample 60 in response to at least a portion of the third x-ray beam 52. In certain embodiments, the at least one detector subsystem 70 comprises a pixel array 72 configured to generate images indicative of a spatial distribution of the elemental distribution of portions of the sample 60 from which the detected electrons 62 and/or detected x-rays 64 are emitted. In certain embodiments, the focused third x-ray beam 52 irradiates a portion of a first surface of the sample 60, and the at least one detector subsystem 70 can be positioned to detect x-rays 62 and/or electrons 64 emitted from at least one of: the same portion of the first surface, a different portion of the first surface, and a second surface of the sample 60 different from the first surface (e.g., the second surface opposite to the first surface). Example detector subsystems 70 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

FIG. 2C schematically illustrates an example system 10 comprising a plurality of x-ray optical trains 90 (e.g., beamlines) in accordance with certain embodiments described herein. The plurality of x-ray optical trains 90 of FIG. 2C are configured to be moved relative to the at least one x-ray source 20, the sample 60, and/or the at least one detector subsystem 70 such that a selected x-ray optical train 90 is positioned to receive x-rays 22 from the at least one x-ray source 20 and to irradiate the sample 60 with the third x-ray beam 52. Example x-ray optical trains compatible with certain embodiments described herein are disclosed by U.S. Pat. Nos. 9,823,203 and 9,594,036, each of which is incorporated in its entirety by reference herein.

In certain embodiments, each of the x-ray optical trains 90 is mounted to a controllably movable stage 92 (e.g., motorized translation and/or rotation stage) configured to controllably position and select an x-ray optical train 90 for use. For example, as schematically illustrated by FIG. 2C, the system 10 comprises first, second, and third x-ray optical trains 90a-90c each comprising a corresponding first x-ray optical element 30a-30c (e.g., an x-ray collimating optical element), a corresponding second x-ray optical element 40a-40c (e.g., an x-ray monochromator; multilayer; multilayer-coated optical substrate), and a corresponding third x-ray optical element 50a-50c (e.g., an x-ray focusing optical element). Each of the x-ray optical trains 90a-90c is configured for conversion (e.g., optimized for efficient conversion) of x-rays 22a-22c from a corresponding target sub-source material of the x-ray source 20 into a third x-ray beam 52a-52c having a corresponding energy for irradiating the sample 60. While FIG. 2C schematically illustrates an example system 10 in which the multiple components of the plurality of x-ray optical trains 90 are fixed relative to one another on a single controllably movable stage 92 and are moved together (indicated in FIG. 2C by arrows 94), in certain other embodiments, the plurality of first x-ray optical elements 30 are fixed relative to one another on a first controllably movable stage, the plurality of second x-ray optical elements 40 are fixed relative to one another on a second controllably movable stage, and the plurality of third x-ray optical elements 50 are fixed relative to one another on a third controllably movable stage, such that the first, second, and third stages can be controllably moved independently from one another to form an x-ray optical train comprising selected combinations of one x-ray optical element from each of the first, second, and third pluralities of x-ray optical elements 30, 40, 50.

In certain embodiments, a first x-ray optical train 90a is configured to be positioned to receive the x-rays 22 from the x-ray source 20 while a first target material of the x-ray source 20 comprising SiC is emitting x-rays 22a (e.g., including at least some of the Si x-ray emission line x-rays) and a second x-ray optical train 90b is configured to be positioned to receive the x-rays 22 from the x-ray source 20 while a second target material (e.g., Cr) of the x-ray source 20 is emitting x-rays 22b (e.g., including at least some of the x-ray emission line x-rays of the second target material). In certain embodiments further comprising a third x-ray optical train 90c, the third x-ray optical train 90c is configured to be positioned to receive the x-rays 22 from the x-ray source 20 while a third target material (e.g., Rh) of the x-ray source 20 is emitting x-rays 22c (e.g., including at least some of the x-ray emission line x-rays of the third target material).

In certain embodiments, the system 10 is configured to generate a Si Kα (1.74 keV) monochromatic focused third x-ray beam 52 and comprises (i) an x-ray source 20 comprising an anode comprising microstructured SiC; (ii) a first x-ray optical element 30 comprising a collimating parabolic mirror having a silver coating; (iii) a second x-ray optical element 40 comprising a channel-cut quartz or InSb (111) double-crystal monochromator, and (iv) a third x-ray optical element 50 comprising a focusing parabolic mirror having a silver coating. The monochromatic third x-ray beam 52 can have a line width with a full-width-at-half-maximum in a range of 0.5 eV to 0.7 eV, a focused x-ray spot size selectable in a range of 10 μm to 200 μm (e.g., by selecting an electron spot size on the anode; fully automated), and can be optimized for high flux (e.g., at least $2 \times 10^9$ photons/second for a 100 μm spot size at 200 W or 300 W of electron beam power).

In certain embodiments, in addition to being configured to generate a Si Kα (1.74 keV) monochromatic focused third x-ray beam 52 as described above, the system 10 is further configured to generate a Cr Kα (5.42 keV) monochromatic focused third x-ray beam 52 and comprises (i) an x-ray source 20 comprising an anode comprising microstructured chromium imbedded in diamond; (ii) a first x-ray optical element 30 comprising a collimating parabolic mirror having a platinum coating; (iii) a second x-ray optical element 40 comprising a channel-cut Ge (111) or Ge (220) double-crystal monochromator, and (iv) a third x-ray optical element 50 comprising a focusing parabolic mirror having a platinum coating. The monochromatic third x-ray beam 52 can have a line width with a full-width-at-half-maximum of 0.5 eV, a focused x-ray spot size selectable in a range of 10 μm to 200 μm (e.g., by selecting an electron spot size on the anode; fully automated), and can be optimized for high flux (e.g., at least $2 \times 10^9$ photons/second for a 100 μm spot size at 200 W or 300 W of electron beam power).

In certain embodiments, in addition to being configured to generate a Si Kα (1.74 keV) monochromatic focused third x-ray beam 52 as described above, the system 10 is further configured to generate a Rh Lα (2.70 keV) monochromatic focused third x-ray beam 52 and comprises (i) an x-ray source 20 comprising an anode comprising microstructured rhodium imbedded in diamond; (ii) a first x-ray optical element 30 comprising a collimating parabolic mirror having a silver coating; (iii) a second x-ray optical element 40 comprising a channel-cut Ge (111) or Si (111) double-crystal monochromator, and (iv) a third x-ray optical element 50 comprising a focusing parabolic mirror having a silver coating. The monochromatic third x-ray beam 52 can have a line width with a full-width-at-half-maximum of 0.5 eV, a focused x-ray spot size selectable in a range of 10 μm to 200 μm (e.g., by selecting an electron spot size on the anode; fully automated), and can be optimized for high flux (e.g., at least $2 \times 10^9$ photons/second for a 100 μm spot size at 200 W or 300 W of electron beam power).

Depth Selectivity

In certain embodiments, the system 10 is configured to provide depth selectivity by virtue of one or more of the following: the attenuation length within the sample 60 of the excitation third x-ray beam 52 (e.g., the distance that the third x-ray beam 52 propagates within the sample 60 where the intensity of the third x-ray beam 52 has dropped by a factor of 1/e; $I_{attenuation\ length}/I_{incident}=1/e$); the attenuation length within the sample 60 of the emission (e.g., fluorescence) x-rays 62 (e.g., the distance that the emission x-rays 62 propagate within the sample 60 where the intensity of the emission x-rays 62 has dropped by a factor of 1/e), and/or the inelastic mean free path within the sample 60 of the photoelectrons 64 (e.g., the distance, on average, that the photoelectrons 64 propagate, without loss of kinetic energy, within the sample 60 where the intensity of the photoelectrons 64 has dropped by a factor of 1/e). These attenuation lengths of the x-rays 52, 62 and the inelastic mean free path of the photoelectrons 64 are dependent on the material of the sample 60 and the energies of the excitation x-rays 52, 62 and the kinetic energies of the photoelectrons 64, respectively.

Figure 4A:
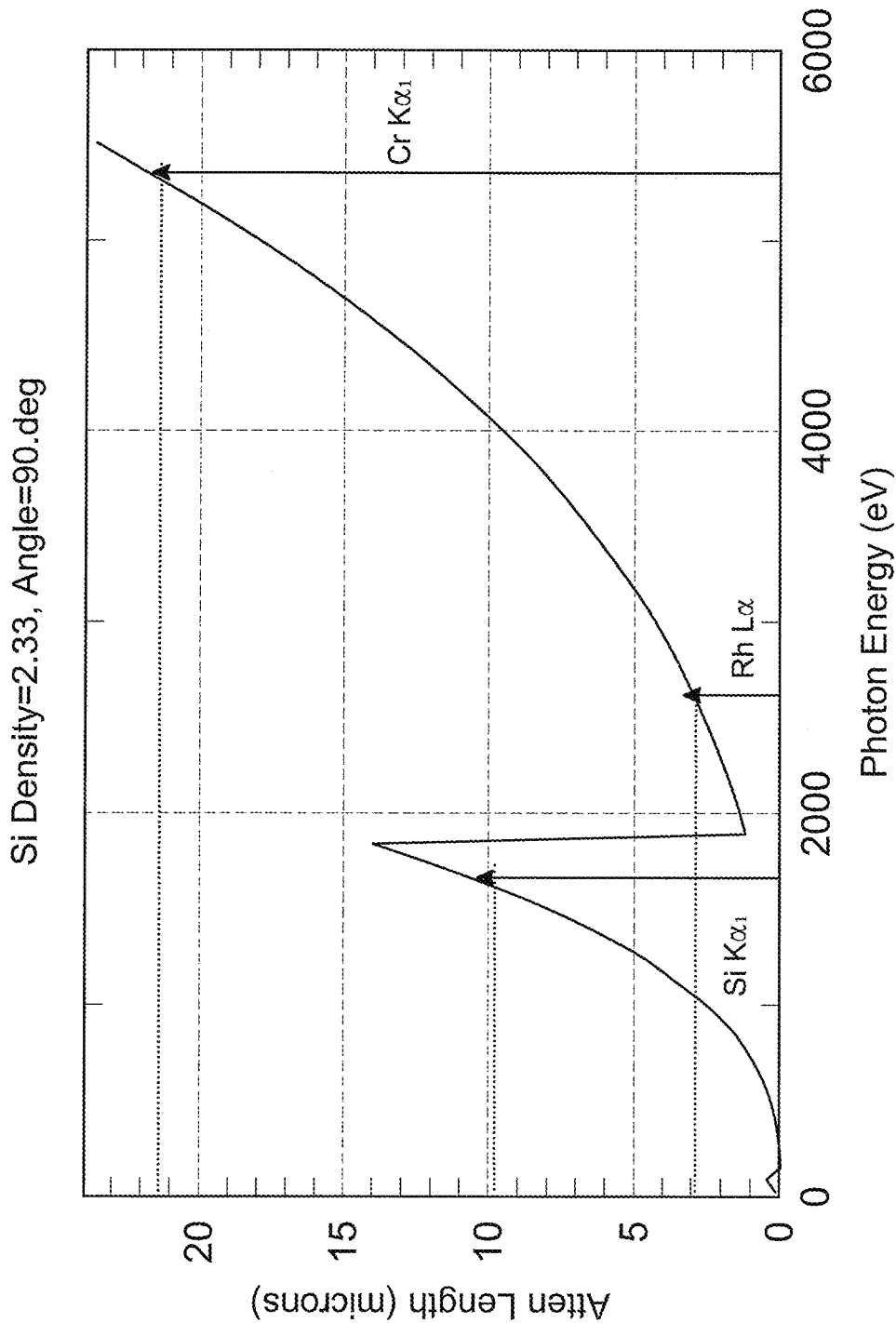
FIG. 4A shows the attenuation length of photons incident on a silicon surface as a function of photon energy in accordance with certain embodiments described herein.
Figure 4B:
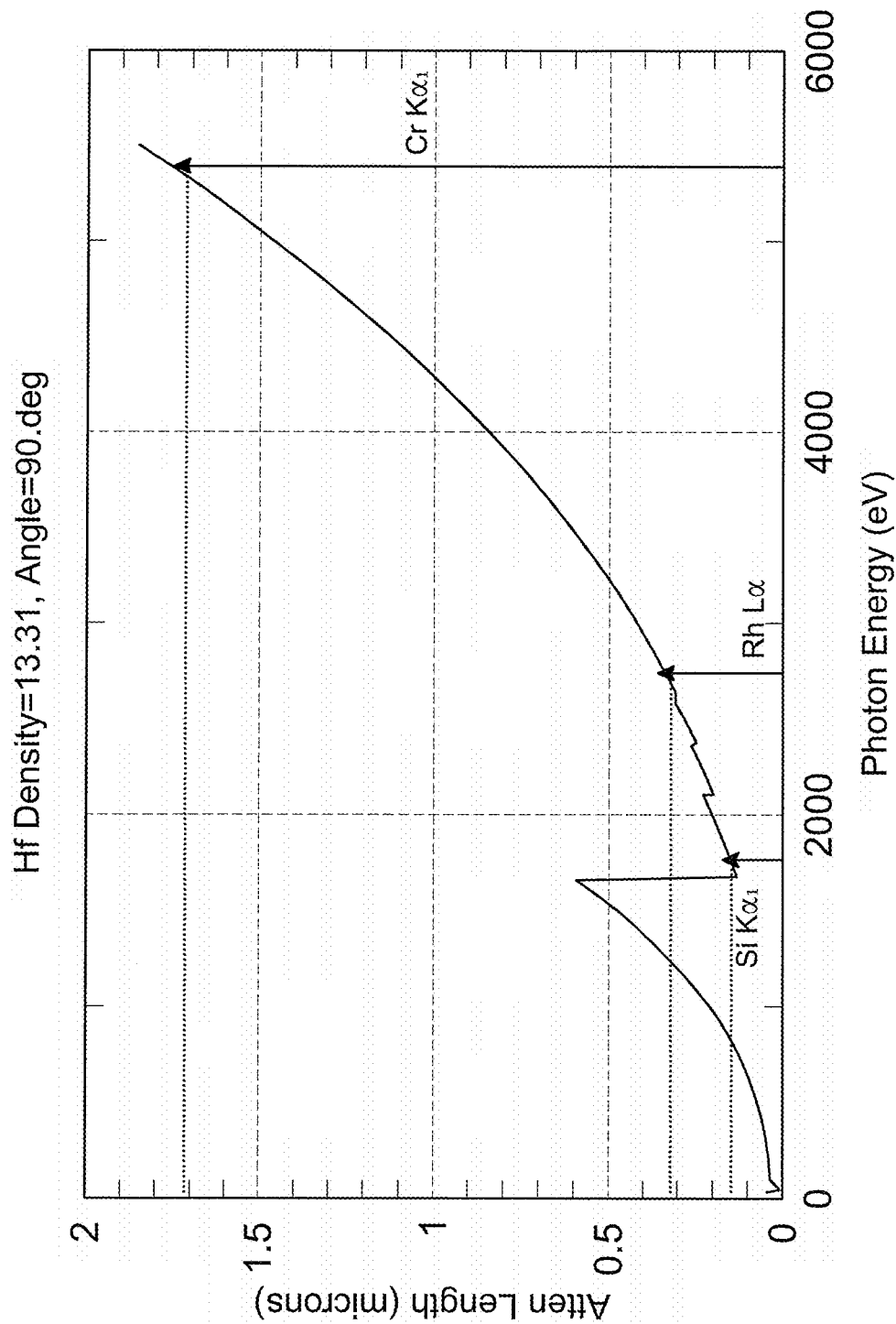
FIG. 4B shows the attenuation length of photons incident on a hafnium surface as a function of photon energy in accordance with certain embodiments described herein.

For example, FIGS. 4A and 4B show the attenuation lengths for photons within silicon and hafnium, respectively, in accordance with certain embodiments described herein. FIG. 4A shows the attenuation length of photons incident on a silicon surface as a function of photon energy in accordance with certain embodiments described herein. The arrows indicate that Si Kα$_1$ (1.74 keV) x-rays (which are above the L edge of Si and below the K edge of Si) have an attenuation length in Si of about 10 μm, Rh Lα (2.70 keV) x-rays (which are above the K edge of Si) have an attenuation length in Si of about 3 μm, and Cr Kα$_1$ (5.42 keV) x-rays (which are above the K edge of Si) have an attenuation length in Si of about 21 μm. Therefore, x-rays with these three photon energies can be used in certain embodiments described herein to analyze different depths of a Si sample.

FIG. 4B shows the attenuation length of photons incident on a hafnium surface as a function of photon energy in accordance with certain embodiments described herein. The arrows indicate that Si Kα$_1$ (1.74 keV) x-rays (which are above the Mα edge of Hf) have an attenuation length in Hf of about 0.15 μm, Rh Lα (2.70 keV) x-rays (which are above the Mα edge of Hf) have an attenuation length in Hf of about 0.3 μm, and Cr Kα$_1$ (5.42 keV) x-rays (which are above the Mα edge of Hf) have an attenuation length in Hf of about 1.7 μm. Therefore, x-rays with these three photon energies can be used in certain embodiments described herein to analyze different depths of a Hf sample.

FIGS. 5A-5D, 6, 7, 8A, and 8B relate to selecting probe depth by selecting at least one optimal x-ray energy in accordance with certain embodiments described herein.

Figure 5A:
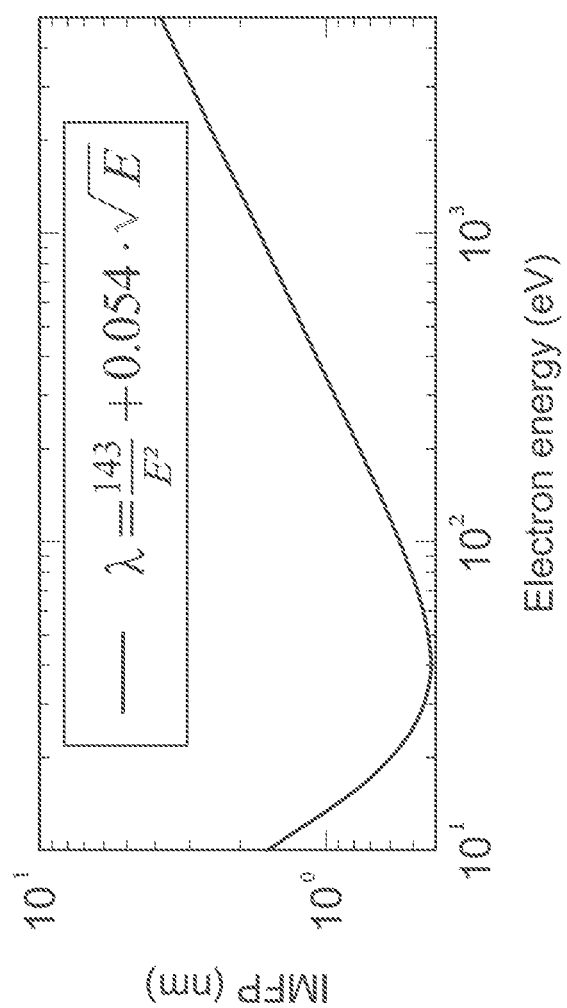
FIG. 5A shows a plot of the parametric inelastic mean free path of electrons as a function of electron kinetic energy in accordance with certain embodiments described herein.

FIG. 5A shows a plot of a parametric (and conservative) estimate of the inelastic mean free path (IMFP) of electrons as a function of electron kinetic energy in accordance with certain embodiments described herein. The curve and parametric equation of FIG. 5A has been referred to as a "universal curve" since it generally applies to electrons propagating many materials. This same parametric estimate of the inelastic mean free path of electrons as a function of electron kinetic energy is also included in FIGS. 5B-5D with regard to various photoelectrons.

Figure 5B:
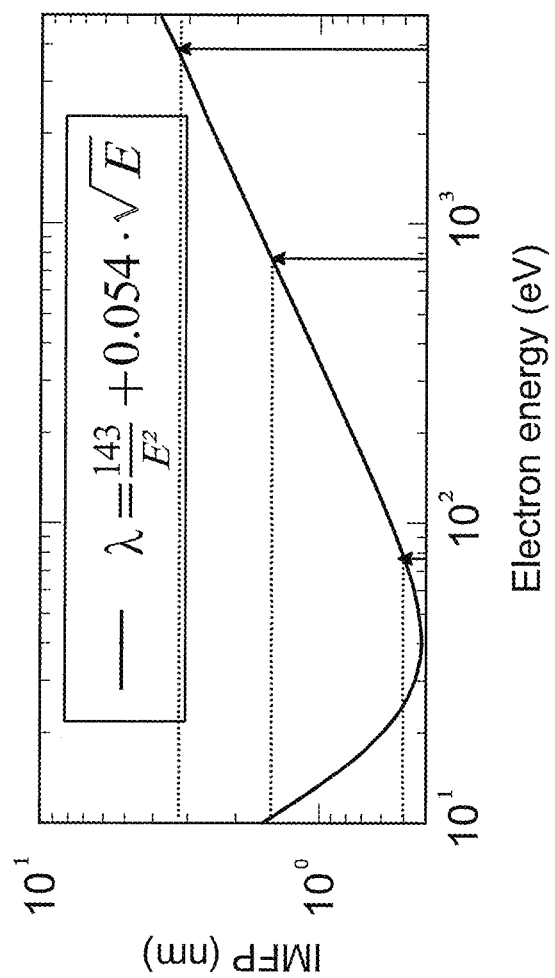
FIG. 5B shows the plot of the parametric inelastic mean free path of electrons as a function of electron kinetic energy with arrows denoting the energies of the Hf $M_5$ ($3d_{5/2}$) photoelectrons generated by three x-ray lines (Si $K\alpha_1$; Rh Kα; Cr $K\alpha_1$) and a corresponding table of values in accordance with certain embodiments described herein.

FIG. 5B illustrates the selectable probing depth from Hf of certain embodiments described herein by showing the parametric inelastic mean free path (IMFP) of electrons as a function of electron kinetic energy with arrows denoting the energies of the Hf $M_5$ ($3d_{5/2}$) photoelectrons generated by three x-ray lines (Si $K\alpha_1$; Rh $K\alpha$; Cr $K\alpha_1$) and a corresponding table of values. As seen in FIG. 4B, Si $K\alpha_1$ (1.74 keV) x-rays generate 78 eV photoelectrons which have an IMFP of about 0.5 nm and a "5% penetration depth" (e.g., depth at which only 5% of the photoelectrons escape from the sample surface without an inelastic loss of energy) of 1.5 nm. FIG. 5B also shows that Rh $L\alpha$ (2.67 keV) x-rays generate 1035 eV photoelectrons which have an IMFP of about 1.5 nm and a "5% penetration depth" of 4.5 nm. FIG. 5B also shows that Cr $K\alpha_1$ (5.42 keV) x-rays generate 3753 eV photoelectrons which have an IMFP of about 3.1 nm and a "5% penetration depth" of 9.3 nm. Therefore, x-rays with these three photon energies can be used in certain embodiments described herein to analyze different depths of a Hf sample.

Figure 5C:
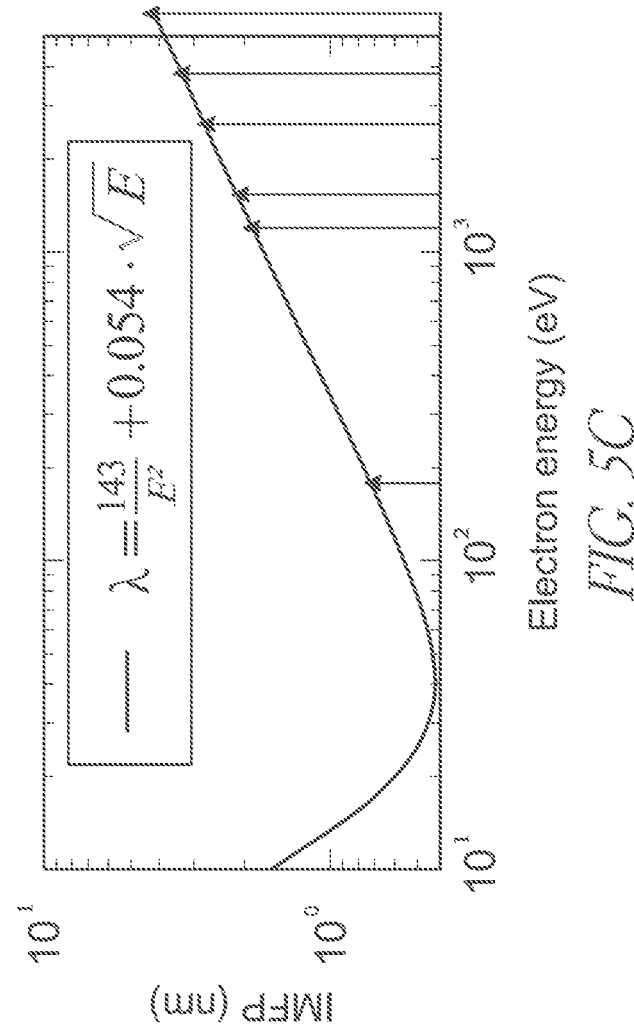
FIG. 5C shows the plot of the parametric inelastic mean free path of electrons as a function of electron kinetic energy with arrows denoting the energies of the Al K (is) photoelectrons and the Al L (2p) photoelectrons generated by three x-ray lines (Si $K\alpha_1$; Rh Kα; Cr $K\alpha_1$) and a corresponding table of values in accordance with certain embodiments described herein.

FIG. 5C illustrates the selectable probing depth from Al of certain embodiments described herein by showing the parametric inelastic mean free path of electrons as a function of electron kinetic energy with arrows denoting the energies of the Al K (1s) photoelectrons and the Al L (2p) photoelectrons generated by three x-ray lines (Si $K\alpha_1$; Rh $K\alpha$; Cr $K\alpha_1$) and a corresponding table of values. As seen in FIG. 5C, Si $K\alpha_1$ (1.74 keV) x-rays generate 180 eV photoelectrons which have an IMFP of about 0.8 nm and a "5% penetration depth" of 2.4 nm and generate 1622 eV photoelectrons which have an IMFP of about 2 nm and a "5% penetration depth" of 6 nm. FIG. 5C also shows that Rh $L\alpha$ (2.70 keV) x-rays generate 1137 eV photoelectrons which have an IMFP of about 1.5 nm and a "5% penetration depth" of 4.5 nm, and generate 2579 eV photoelectrons which have an IMFP of about 2.8 nm and a "5% penetration depth" of 8.4 nm. FIG. 5C also shows that Cr $K\alpha_1$ (5.42 keV) x-rays generate 3855 eV photoelectrons which have an IMFP of about 3.1 nm and a "5% penetration depth" of 9.3 nm, and generate 5297 eV photoelectrons which have an IMFP of about 3.7 nm and a "5% penetration depth" of 11.1 nm. Therefore, x-rays with these three photon energies can be used in certain embodiments described herein to analyze different depths of an Al sample.

Figure 5D:
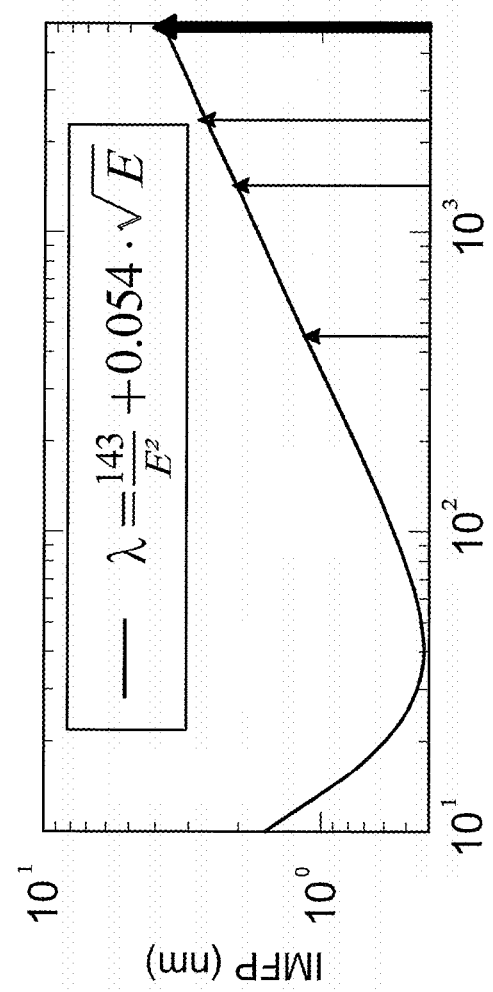
FIG. 5D shows the plot of the parametric inelastic mean free path of electrons as a function of electron kinetic energy with arrows denoting the energies of the Ti K (is) photoelectrons and the Ti L (2p) photoelectrons generated by three x-ray lines (Si $K\alpha_1$; Rh Kα; Cr $K\alpha_1$) and a corresponding table of values in accordance with certain embodiments described herein.

FIG. 5D illustrates the selectable probing depth from Ti of certain embodiments described herein by showing the parametric inelastic mean free path of electrons as a function of electron kinetic energy with arrows denoting the energies of the Ti K (1s) photoelectrons and the Ti L (2p) photoelectrons generated by three x-ray lines (Si $K\alpha_1$; Rh $K\alpha$; Cr $K\alpha_1$) and a corresponding table of values. As seen in FIG. 5D, Si $K\alpha_1$ (1.74 keV) x-rays and Rh $L\alpha$ (2.70 keV) x-rays do not generate photoelectrons since its energy (4.97 keV) is higher than that of the Si $K\alpha_1$ and Rh $L\alpha$ x-rays. FIG. 5D also shows that Si $K\alpha_1$ (1.74 keV) x-rays generate 1286 eV photoelectrons which have an IMFP of about 1.6 nm and a "5% penetration depth" of 4.8 nm. FIG. 5D also shows that Rh $L\alpha$ (2.70 keV) x-rays generate 2243 eV photoelectrons which have an IMFP of about 2.6 nm and a "5% penetration depth" of 7.8 nm. FIG. 5D also shows that Cr $K\alpha_1$ (5.42 keV) x-rays generate 449 eV photoelectrons which have an IMFP of about 1 nm and a "5% penetration depth" of 3 nm, and generate 4961 eV photoelectrons which have an IMFP of about 3.5 nm and a "5% penetration depth" of 10.5 nm. Therefore, x-rays with these three photon energies can be used in certain embodiments described herein to analyze different depths of a Ti sample.

Figure 6:
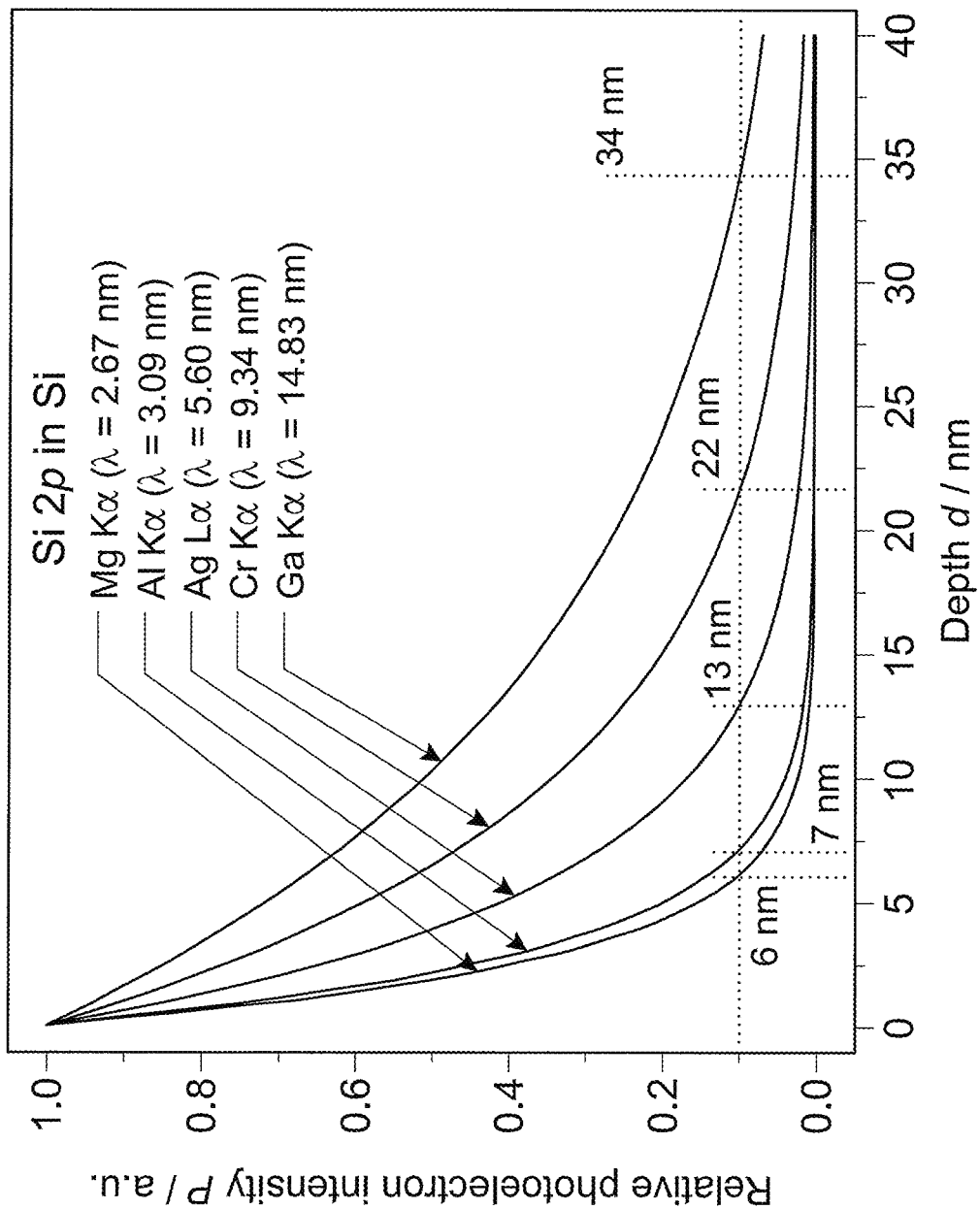
FIG. 6 shows a plot of the relative photoelectron intensity as a function of depth for Si 2p photoelectrons generated using various x-ray energies in accordance with certain embodiments described herein.

FIG. 6 shows a plot of the relative photoelectron intensity as a function of depth for Si 2p photoelectrons generated using various x-ray energies in accordance with certain embodiments described herein. For example, Si 2p photoelectrons excited by Mg $K\alpha$ x-rays have a penetration depth (e.g., depth at which the x-rays have an intensity that equals 1/10 the incident intensity; denoted by the horizontal dotted line of FIG. 6) of 6 nm, Si 2p photoelectrons excited by Al $K\alpha$ x-rays have a penetration depth of 7 nm, Si 2p photoelectrons excited by Ag $L\alpha$ x-rays have a penetration depth of 13 nm, Si 2p photoelectrons excited by Cr $K\alpha$ x-rays have a penetration depth of 22 nm, and Si 2p photoelectrons excited by Ga $K\alpha$ x-rays have a penetration depth of 34 nm. While FIG. 6 shows that the photoelectrons have differing penetration depths depending on their energy, the probing depth shown in FIG. 6 is at least two times larger than the calculated values from the parametric inelastic mean free path of electrons as a function of electron energy shown in FIGS. 5A-5D.

Figure 7:
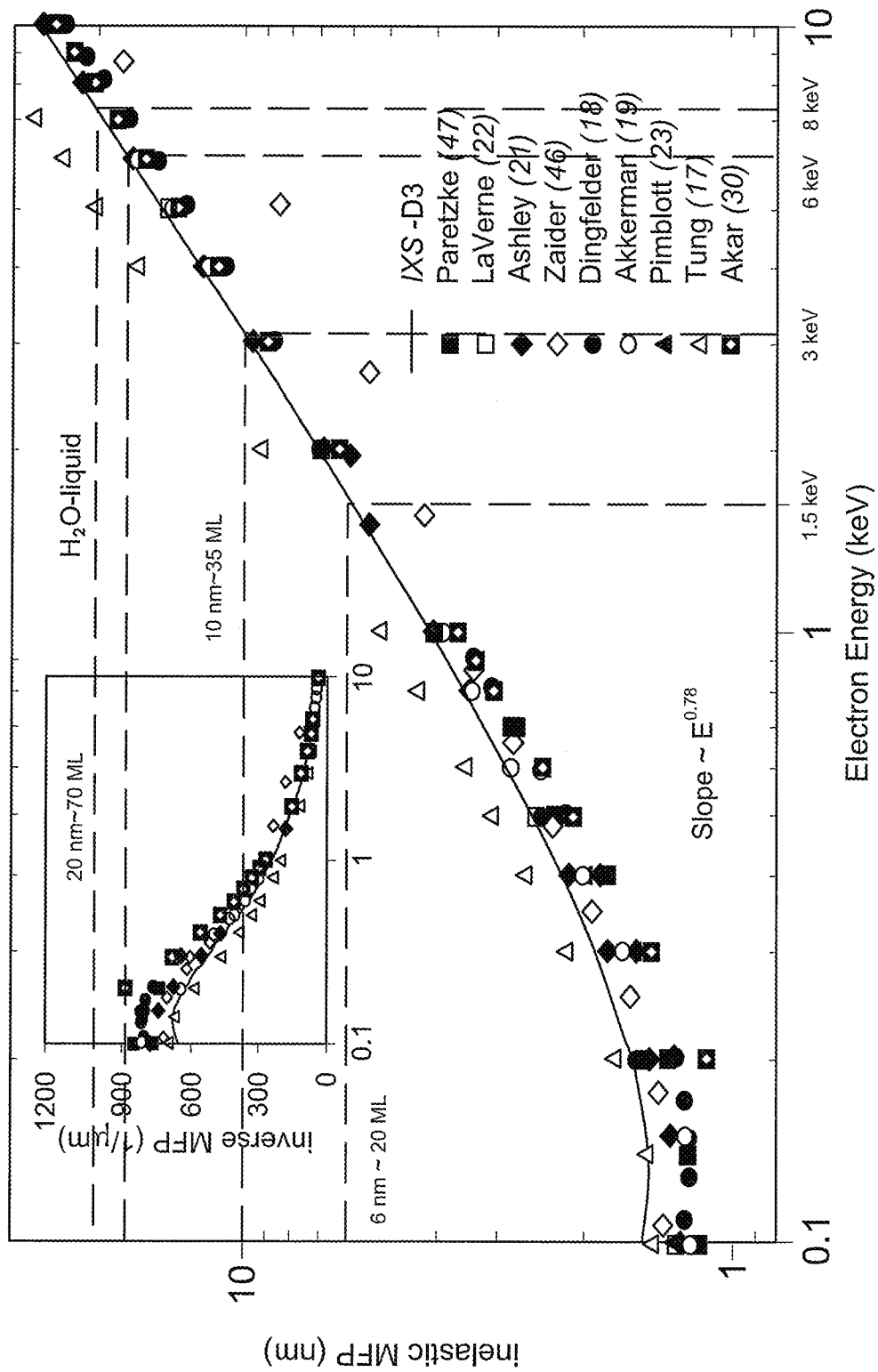
FIG. 7 shows a plot of the inelastic mean free path of electrons in liquid water as a function of electron kinetic energy in accordance with certain embodiments described herein.

FIG. 7 shows a plot of the inelastic mean free path of electrons in liquid water as a function of electron kinetic energy (from Emfietzoglou & Nikjoo, Rad. Res. 2007) in accordance with certain embodiments described herein. As seen in FIG. 7, in certain embodiments described herein, photoelectrons having various energies can provide depth-sensitive information from an interface comprising water.

Figure 8A:
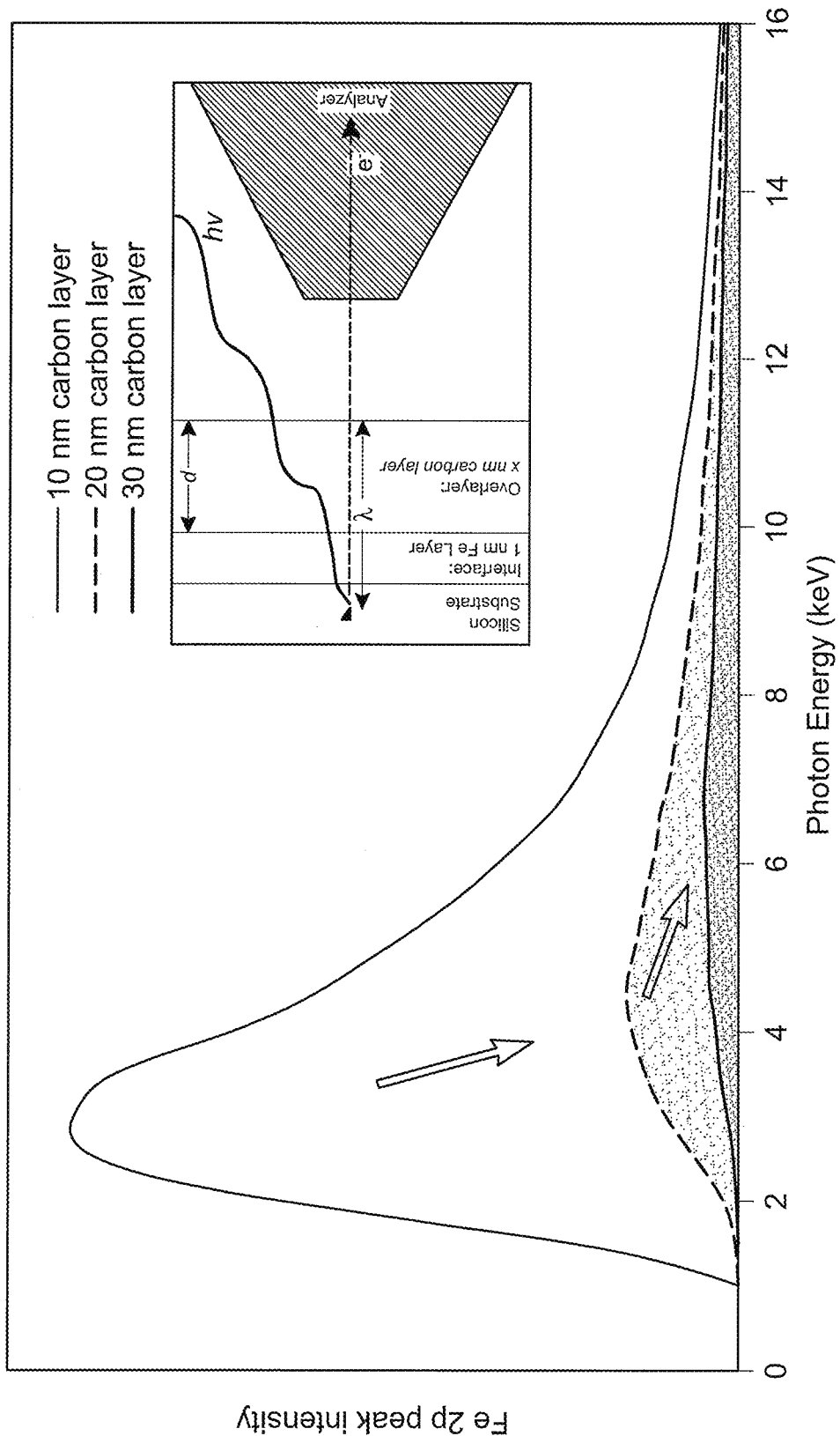
FIG. 8A schematically illustrate the Fe 2p photoemission peak intensity as a function of x-ray energy from a silicon substrate with a 1-nm-thick Fe layer and a carbon overlayer having three thicknesses of 10 nm, 20 nm, and 30 nm in accordance with certain embodiments described herein.
Figure 8B:
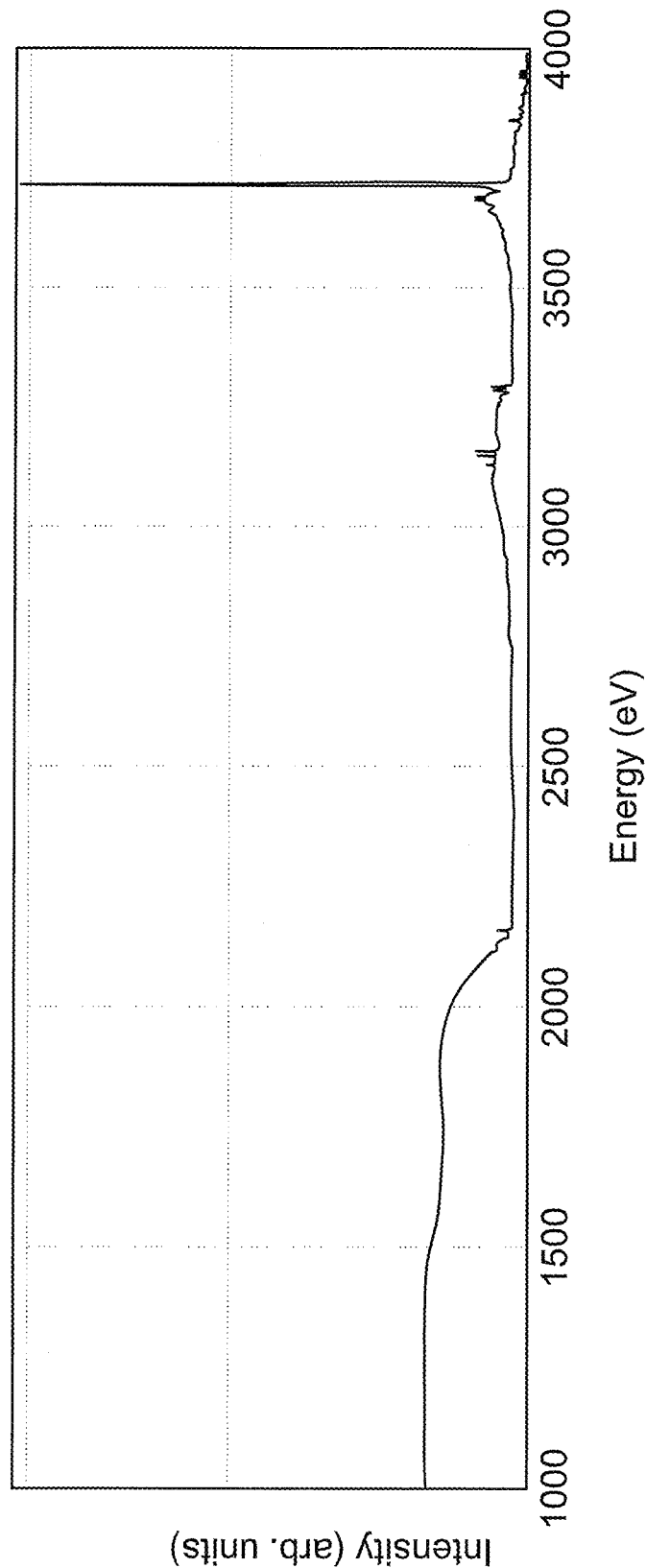
FIG. 8B shows a simulation from the "NIST Database for the Simulation of Electron Spectra for Surface Analysis (SESSA)."

FIG. 8A schematically illustrate the Fe 2p photoemission peak intensity as a function of x-ray energy from a silicon substrate with a 1-nm-thick Fe layer and a carbon overlayer having three thicknesses of 10 nm, 20 nm, and 30 nm (from Stafanos et al., Nature Scientific Report, 2013). The Fe 2p photoemission peak intensity is reduced for larger thicknesses of the carbon overlayer. FIG. 8B shows a simulation from the "NIST Database for the Simulation of Electron Spectra for Surface Analysis (SESSA)." The electron inelastic mean free path is proportional to $E^{0.8}$, and the proportionality of the photoelectron cross section as a function of the photon energy hv is in a range of about $(hv)^{-2}$ to $(hv)^{-3}$.

Example Configurations

Figure 9A:
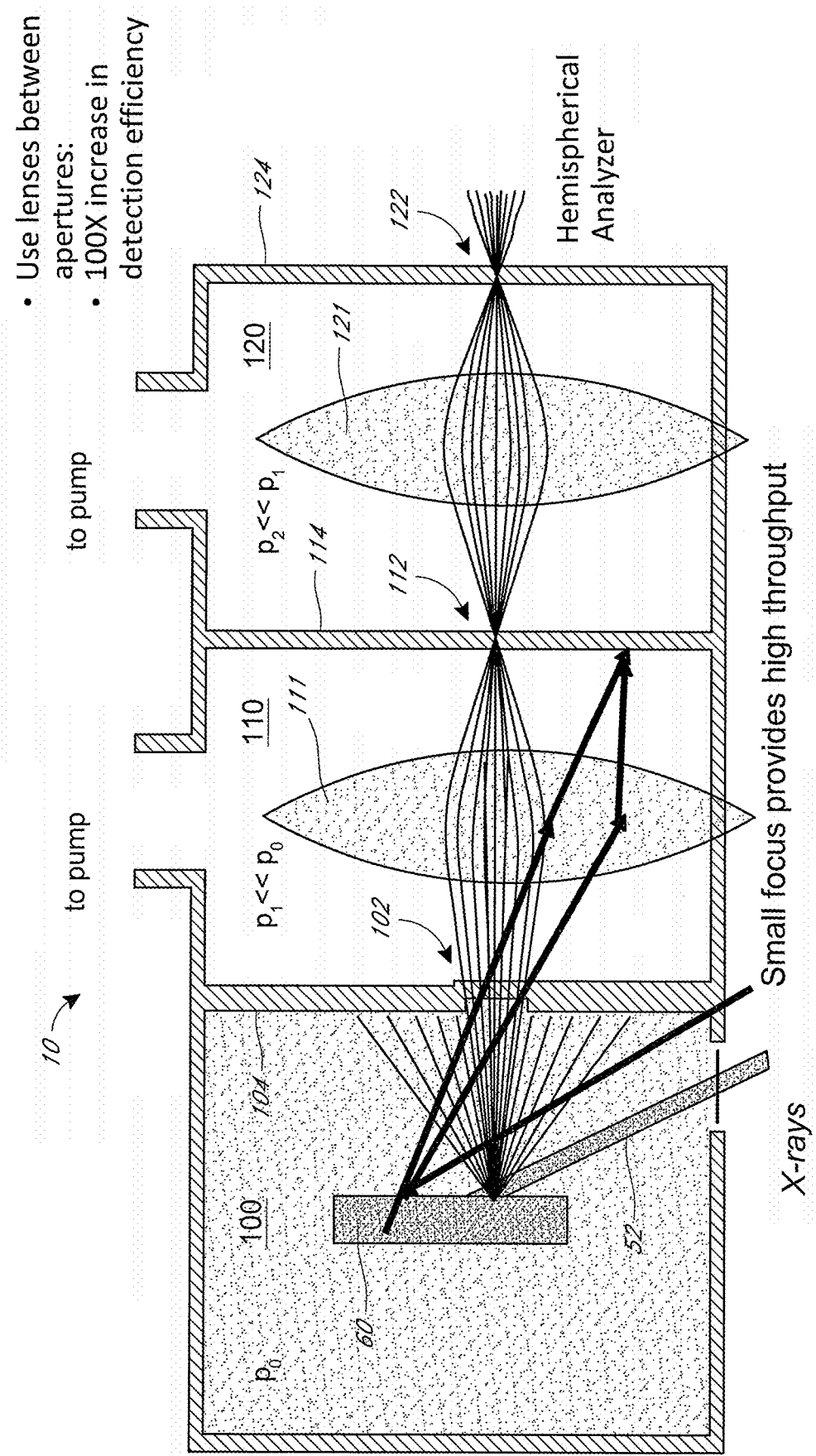
FIG. 9A schematically illustrates a portion of an example system utilizing small focus enabling atmospheric pressure XPS in accordance with certain embodiments described herein.
Figure 9B:
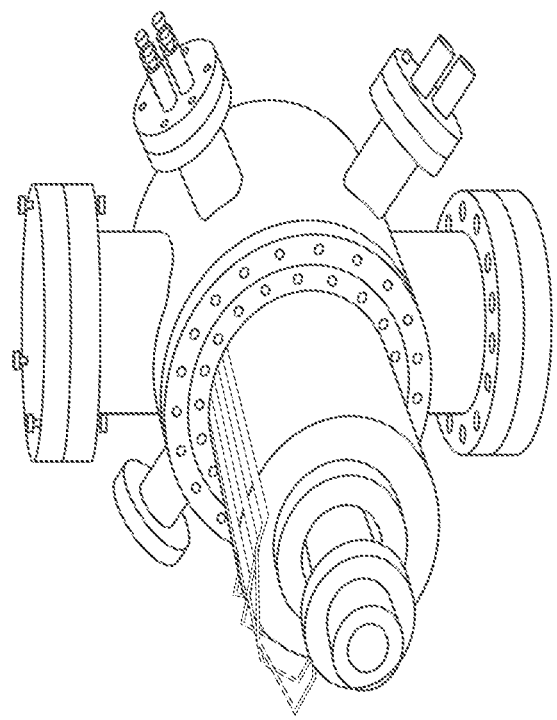
FIGS. 9B and 9C show an example electrostatic lens assembly and an example APXPS system (located at the Advanced Light Source), respectively, in accordance with certain embodiments described herein.
Figure 9C:
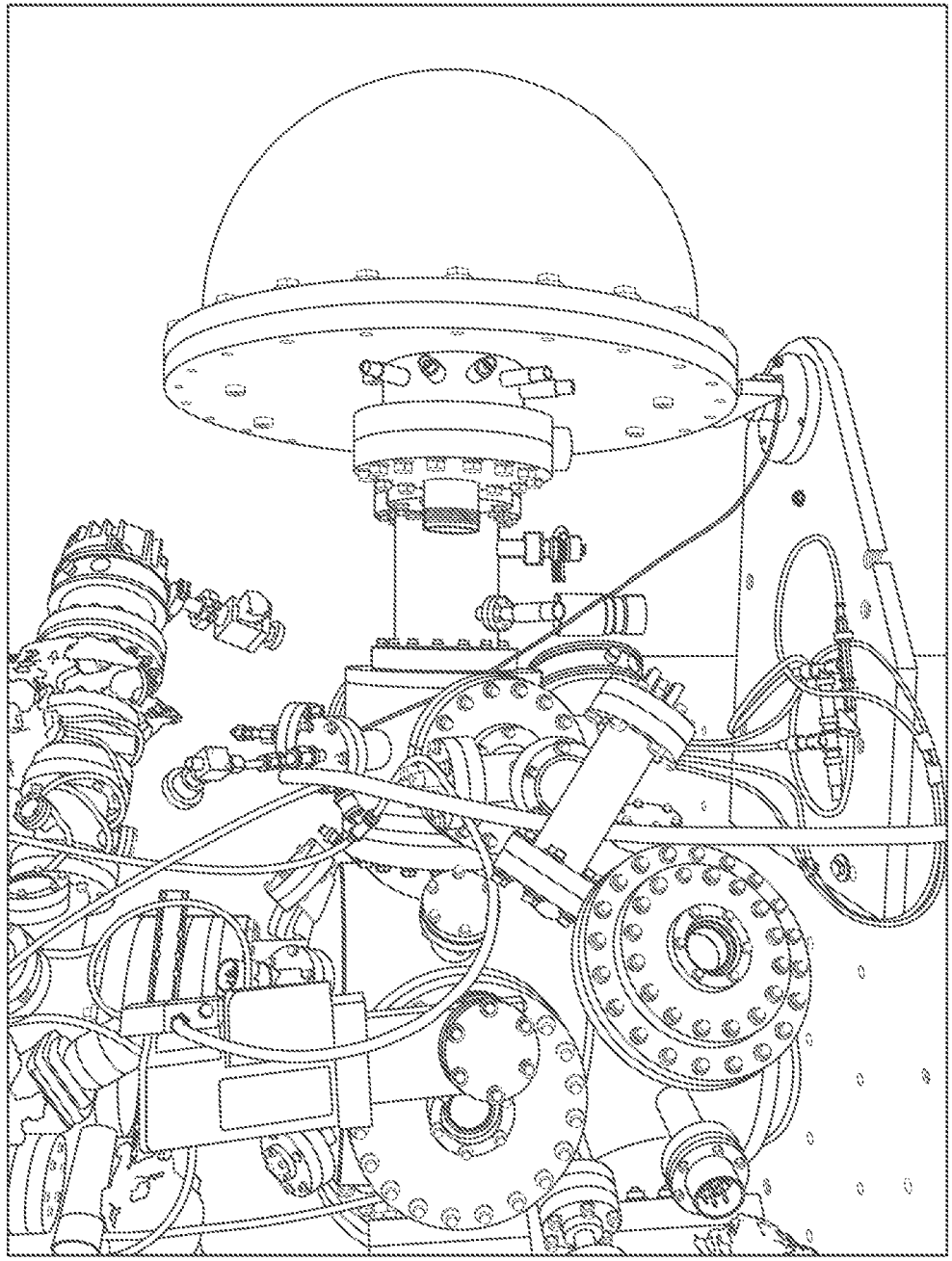
Figure 10:
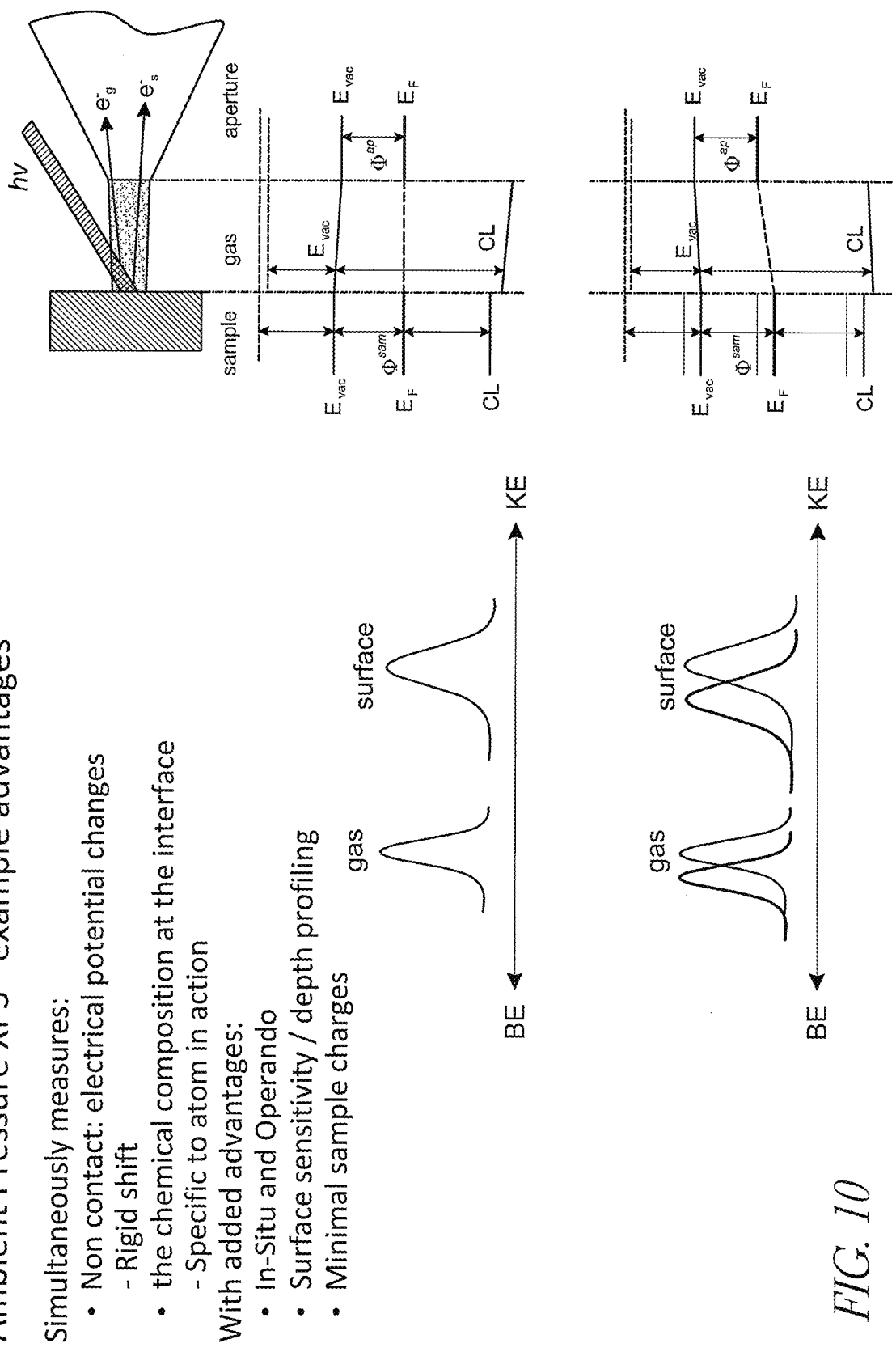
FIG. 10 shows example advantages of ambient pressure XPS in accordance with certain embodiments described herein.
Figure 11:
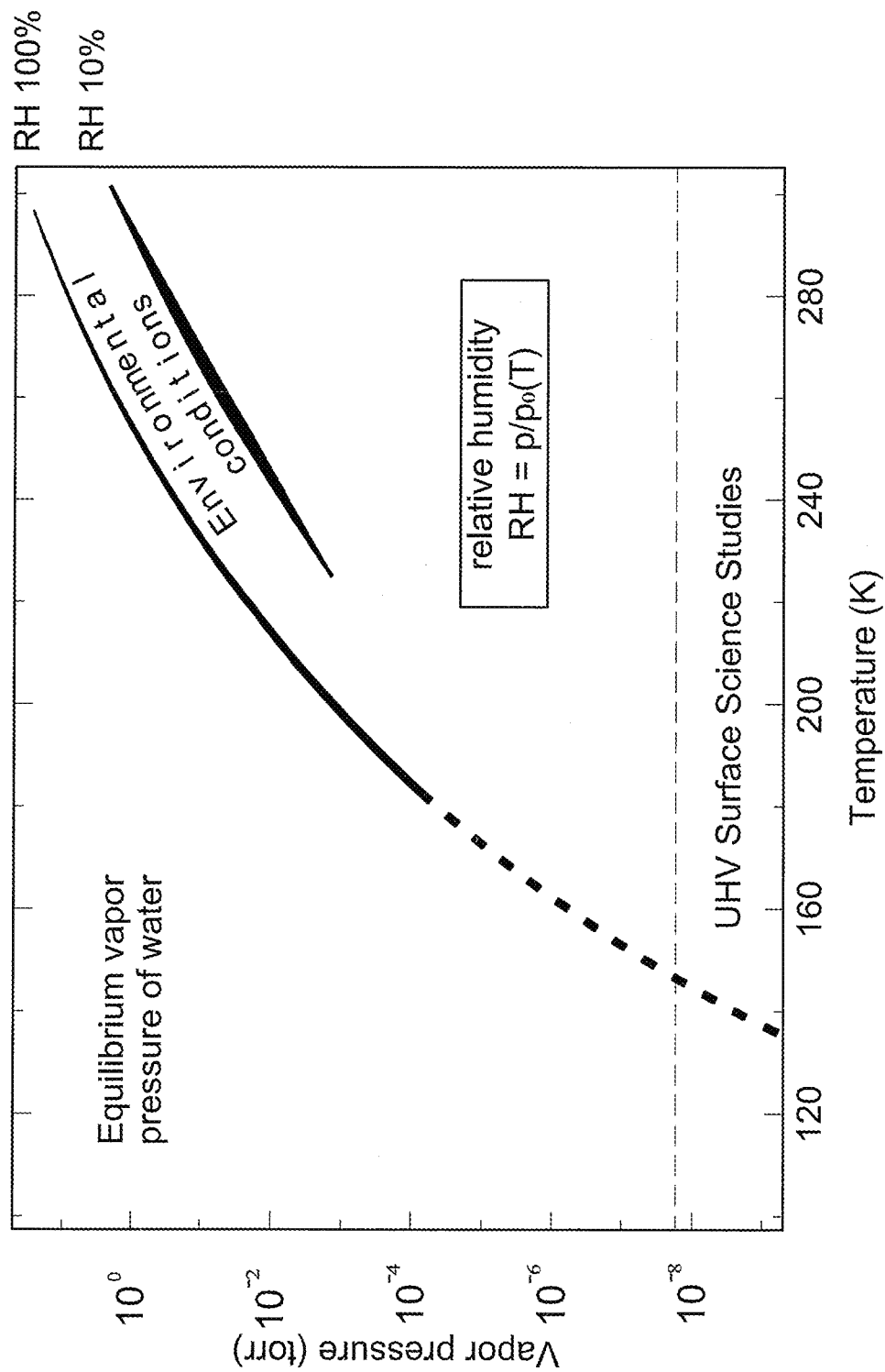
FIG. 11 shows the equilibrium vapor pressure of water as a function of temperature.

FIGS. 9-11 relate to advantages of small focus spot sizes in accordance with certain embodiments described herein. Certain embodiments described herein provide small focus spot sizes which can provide one or more of the following advantages: small spot analysis with simple sample preparation; imaging/mapping; atmospheric pressure XPS; in situ, in vitro, and/or in operando analysis.

FIG. 9A schematically illustrates a portion of an example system 10 utilizing small focus enabling atmospheric pressure XPS in accordance with certain embodiments described herein. For example, the system 10 of FIG. 9A can be used to perform XPS at 20 Torr water vapor pressure (e.g., about equilibrium water vapor pressure at 20 degrees Celsius). In certain embodiments, the example system 10 comprises at least one x-ray source 20 comprising a plurality of x-ray sub-sources 26 on or embedded in at least one thermally conductive substrate 25, the x-ray sub-sources comprising a plurality of materials configured to generate x-rays in response to electron bombardment. The example system 10 further comprises a plurality of x-ray optical trains 90, each optical train 90 comprising at least one collimating x-ray optical element 30 (e.g., mirror; mirror lens), at least one energy-selective optical element 40 (e.g., x-ray monochromator; multilayer; multilayer-coated optical substrate), and at least one focusing x-ray optical element 50 (e.g., mirror; mirror lens). As described herein, the plurality of x-ray optical trains 90 is configured to be positioned to direct at least some of the x-rays emitted from a selected one of the plurality of x-ray sub-sources 26 to irradiate a sample 60.

As schematically illustrated by FIG. 9A, the example system 10 further comprises a sample chamber 100 configured to contain a sample 60 at a sample pressure, a first chamber 110 and a first electrostatic lens 111 contained in the first chamber 110 at a first pressure, and a second chamber 120 and a second electrostatic lens 121 contained in the second chamber 120 at a second pressure. The sample chamber 100 and the first chamber 110 are separated from one another by a first wall 104 having a first aperture 102 configured to allow at least some photoelectrons from the sample 60 to propagate from the sample chamber 100 to the first chamber 110. The first chamber 110 and the second chamber 120 are separated from one another by a second wall 114 having a second aperture 112 configured to allow at least some of the photoelectrons in the first chamber to propagate to the second chamber 120. The second chamber 120 is separated from an energy dispersive electron energy analyzer (e.g., a hemispherical analyzer; not shown) by a third wall 124 having a third aperture 122 configured to allow at least some of the photoelectrons in the second chamber to propagate to the energy dispersive electron energy analyzer.

As schematically illustrated by FIG. 9A, the at least one x-ray source 20 and the plurality of x-ray optical trains 90 are configured to irradiate the sample 60 with a small focus x-ray spot impinging the sample 60 (e.g., a third x-ray beam 52 having a spot size or largest dimension in a surface plane of the sample 60 in a range from 10 μm to 200 μm; 15 μm or less; 20 μm or less; 100 μm or less). The sample pressure $P_0$ within the sample chamber 100 can be in a range of 20 mbar to 1 bar (e.g., in a range of 100 mbar to 1 bar). The first chamber 110 containing the first electrostatic lens 111 can be pumped (e.g., differentially pumped) to a pressure $P_1$ less than $P_0$, and the second chamber 120 containing the second electrostatic lens 121 can be pumped (e.g., differentially pumped) to a pressure $P_2$ less than $P_1$. In certain embodiments, each of the first aperture 102, the second aperture 112, and the third aperture 122 has a size (e.g., a largest lateral dimension parallel to the respective wall 104, 114, 124) configured to allow at least some of the photoelectrons to propagate therethrough while preventing unwanted pressure increases in the first and second chambers 110, 120 due to gas from the sample chamber 100 entering the first chamber 110 and gas from the first chamber 110 entering the second chamber 120 (e.g., sizes in a range from m to 200 μm; 15 μm or less; 20 μm or less; 100 μm or less). The first electrostatic lens 111 is configured to receive photoelectrons from the first aperture 102 and to focus at least some of the photoelectrons through the second aperture 112, and the second electrostatic lens 121 is configured to receive photoelectrons from the second aperture 112 and to focus at least some of the photoelectrons through the third aperture 122. In this way, certain embodiments described herein can provide a 1000X increase in detection efficiency. FIGS. 9B and 9C show an example electrostatic lens assembly and an example APXPS system (located at the Advanced Light Source), respectively, which can be configured to be used by the system 10 of certain embodiments described herein.

FIG. 10 shows example advantages of ambient pressure XPS in accordance with certain embodiments described herein. FIG. 11 shows the equilibrium vapor pressure of water as a function of temperature. The inelastic mean free path of electrons with 100 eV kinetic energy in 1 Torr water vapor is about 1 mm, so ambient pressure XPS can be performed in accordance with certain embodiments described herein.

Example Configuration

Table 1 lists various components of an example configuration of an APXPS system in accordance with certain embodiments described herein. The example configuration can be used in studying various processes and/or phenomena at liquid-solid interfaces (e.g., corrosion of metallic biomaterials, such as medical implants and medical devices; surface chemistry under realistic, ambient pressure environments).

TABLE 1

| | |
|---|---|
| X-ray source | Target (sub-sources): X-ray target comprising a plurality of x-ray sub-sources (e.g., micro-sized) comprising (i) at least one Rh sub-source embedded in a diamond substrate, (ii) at least one Cr sub-source embedded in the diamond substrate, and (iii) single crystal SiC sub-source in thermal contact with the diamond substrate (e.g., positioned next to the other sub-sources. |
| | Source size: 10 microns in the dispersive direction of the x-ray crystal monochromator achieved with 6-degree take-off angle of an electron beam footprint of 100 microns and 300 microns in the orthogonal direction (e.g., corresponding to the nondispersive direction of the x-ray crystal monochromator). |
| | X-ray source power and electron acceleration voltage: 300 W and 10-20 kVp. |
| | X-ray spectral change: software control of motorized translation of the target. |
| Paraboloidal Mirror Lenses | Surface figure: Three sets of two each axially symmetric paraboloidal surfaces with parameters optimized for the three x-ray energies from the Rh, Cr, and SiC sub-sources. |
| | Surface figure error: better than 20 μrad. |
| | Mirror surface coating: Pt for Cr K$\alpha_1$ and for Si K$\alpha_1$; Pd for Rh L$\alpha_1$. |
| Resolution (X-ray line width) | Less than 0.7 eV, which is comparable to natural line widths (e.g., life time broadening) of core levels. |
| Photon flux | 4 × 10$^9$ photons/second for a spot of 100 micron diameter. |
| Focus spot size at sample | 20 microns to 200 microns. |
| Detector | HIPPIII electron energy analyzer available from Scienta-Omicron GmbH of Taunusstein Germany. |

TABLE 1-continued

Kinetic energies of up to 6 keV; Analyzer allows ambient pressure up to 100 mbar with 100 micron diameter entrance aperture.

The example configuration compatible with certain embodiments described herein can be characterized by a figure of merit (e.g., for comparison to other APXPS systems. For example, the figure of merit for comparing different APXPS systems for studying solid-liquid interfaces of biomaterials with depth profiling can be expressed as the intensity of the photoelectron peak (Ii) for an element of interest i at a depth (z) from the surface from where photoelectrons are emitted. The intensity Ii is dependent on the photon flux (F) incident on the interface, the average atomic concentration of element i (Ni), the photoelectron cross-section of element i related to the mentioned peak ($\sigma i$), the inelastic mean free path ($\Lambda_i$) of photoelectrons from element i related to the mentioned peak, and the solid angle of the acceptance ($\Omega(h\nu)$) of the analyzer (approximately inversely proportional to hv). In the simplest form, $Ii=F*Ni*\sigma i*exp(-z/\Lambda_i)*\Omega(h\nu) K_{h\nu}$, where $K_{h\nu}$ corresponds to all other factors (which can be assumed to remain constant for a specific photon energy during the measurement).

In certain embodiments described herein, the example configuration provides five times more flux at the sample than currently marketed APXPS systems. For example, a laboratory-based APXPS system marketed by SPECS Surface Nano Analysis GMBH of Berlin Germany uses Al Kα x-rays at 1.487 keV, which are not suitable for studying solid-liquid interfaces of in-vitro biomaterials (e.g., medical implants) due to the limited IMFP of the photoelectrons. For another example, a Ga Kα (9.3 keV) x-ray source using a Ga liquid jet anode, marketed by Scienta-Omicron GmbH of Taunusstein Germany), suffers from lower cross sections and thus lower detection efficiencies (e.g., by a factor of 6, as compared to using Cr Kα x-rays). In addition, the accepted solid angle of the analyzer for 9.3 keV photoelectrons, as compared to 5.4 keV photoelectrons is about 60% less due to larger retardation used by the analyzer which reduces the solid angle. For still another example, a dual Al Kα and Cr Kα x-ray source marketed as "Phi Quantes" by Ulvac-Phi, Inc. of Kanagawa Japan, utilizes Rowland circle geometry Bragg crystals for monochromatization, which provides high resolution at the expense of lower flux and larger divergence angle.

In certain embodiments described herein, the example configuration provide three different x-ray energies, thereby allowing systematic study of depth profiling and optimizing the performance for signal strength, with a figure of merit about 50 times larger than currently marketed APXPS systems (e.g., equal to about 5 (flux)×6 (cross-section)×1.6 (acceptance solid angle)). As a result, the example configuration can provide higher flux (e.g., by a factor of five) with significantly higher cross sections and the ability for optimization depending on the element of interest and various thicknesses of the liquid and passivation layer of the sample.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain embodiments require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various embodiments and examples discussed above may be combined with one another to produce alternative configurations compatible with embodiments disclosed herein. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A system for x-ray analysis, the system comprising:
at least one x-ray source configured to emit x-rays, the at least one x-ray source comprising at least one silicon carbide sub-source on or embedded in at least one thermally conductive substrate and configured to generate the x-rays in response to electron bombardment of the at least one silicon carbide sub-source, at least some of the x-rays emitted from the at least one x-ray source comprising Si x-ray emission line x-rays;
an electron beam source configured to bombard the at least one silicon carbide sub-source with an electron beam having an electron energy in a range of 5 keV to 30 keV; and at least one x-ray optical train configured to receive the Si x-ray emission line x-rays and to irradiate a sample with at least some of the Si x-ray emission line x-rays.

2. The system of claim 1, wherein the Si x-ray emission line x-rays comprise Si Kαi x-ray emission line x-rays.

3. The system of claim 1, wherein the at least one x-ray source further comprises at least one second sub-source on or embedded in the at least one thermally conductive substrate, the at least one second sub-source configured to generate x-rays in response to electron bombardment of the at least one second sub-source, the at least one second sub-source comprising at least one material different from silicon carbide, at least some of the x-rays emitted from the at least one x-ray source comprising x-ray emission line x-rays of the at least one material.

4. The system of claim 3, wherein the at least one material is selected from the group consisting of: Al, Ag, Rh, Cr, Au, Ti, Fe, and Mo and the x-ray emission line x-rays of the at least one material comprise at least one of: Al Kα x-ray emission line x-rays; Ag Lα x-ray emission line x-rays; Rh Lα x-ray emission line x-rays; Cr Kα$_1$ x-ray emission line x-rays; Au Lα x-ray emission line x-rays; Ti Kα x-ray emission line x-rays; Fe Kα x-ray emission line x-rays; Mo Lα x-ray emission line x-rays; Mo Lβ$_1$ x-ray emission line x-rays, and Mo Lβ$_2$ x-ray emission line x-rays.

5. The system of claim 3, wherein the at least one x-ray optical train comprises a plurality of x-ray optical trains configured to be moved relative to the at least one x-ray source and/or the sample such that a selected x-ray optical train of the plurality of x-ray optical trains is positioned to receive the x-rays emitted from the at least one x-ray source and to irradiate the sample with an x-ray beam comprising at least some of the received x-rays emitted from the at least one x-ray source.

6. The system of claim 5, wherein a first x-ray optical train of the plurality of x-ray optical trains is configured for conversion of the Si x-ray emission line x-rays into the x-ray beam and a second x-ray optical train of the plurality of x-ray optical trains is configured for conversion of the x-ray emission line x-rays of the at least one material into the x-ray beam.

7. The system of claim 1, wherein the at least one optical train is configured to focus at least some of the Si x-ray emission line x-rays at the sample.

8. The system of claim 7, wherein the at least one optical train comprises:
at least one first x-ray optical element configured to receive at least some of the x-rays emitted from the at least one x-ray source and to generate a collimated first x-ray beam;
at least one second x-ray optical element configured to receive at least a portion of the collimated first x-ray beam and to emit a monochromatic second x-ray beam comprising the Si x-ray emission line x-rays; and
at least one third x-ray optical element configured to receive at least a portion of the monochromatic second x-ray beam and to focus a third x-ray beam at the sample.

9. The system of claim 8, wherein the at least one first x-ray optical element comprises at least one axially symmetric x-ray collimating optic.

10. The system of claim 8, wherein the at least one second x-ray optical element comprises at least one x-ray crystal monochromator.

11. The system of claim 8, wherein the at least one third x-ray optical element comprises at least one axially symmetric x-ray focusing optic.

12. The system of claim 8, wherein the system further comprises at least one detector subsystem configured to detect x-rays and/or electrons emitted from the sample in response to the sample being irradiated by the third x-ray beam.

13. The system of claim 1, wherein the system comprises one or more of: an x-ray photoelectron spectroscopy (XPS) system, a photoemission electron microscopy (PEEM) system, an angle-resolved photoemission spectroscopy (ARPES) system, an ambient-pressure x-ray photoelectron spectroscopy (APXPS) system, an x-ray fluorescence (XRF) system, an x-ray emission (XES) system, an x-ray phase contrast imaging system, and a computed tomography imaging system.

14. An x-ray source comprising:
at least one electron source configured to generate at least one electron beam having an electron energy in a range of 5 keV to 30 keV; and
at least one target comprising:
at least one thermally conductive substrate; and
a plurality of sub-sources on or embedded in at least a portion of the at least one thermally conductive substrate, the sub-sources separate from one another and in thermal communication with the at least one thermally conductive substrate, at least one sub-source of the plurality of the sub-sources comprising silicon carbide and configured to emit Si x-ray emission line x-rays in response to bombardment by the at least one electron beam.

15. The x-ray source of claim 14, further comprising an x-ray window configured to allow at least some of the Si x-ray emission line x-rays to propagate from a first region within the x-ray source and containing the at least one target, through the x-ray window, to a second region outside the x-ray source.

16. The x-ray source of claim 14, wherein the at least one electron source comprises at least one electron gun column configured to generate and direct the at least one electron beam to bombard at least one selected sub-source of the plurality of sub-sources.

17. The x-ray source of claim 14, wherein the at least one thermally conductive substrate comprises diamond and the at least last one sub-source comprises a silicon carbide layer sputtered onto the at least one thermally conductive substrate.

18. The x-ray source of claim 14, wherein the plurality of sub-sources further comprises at least one second sub-source comprising at least one target material different from silicon carbide and configured to emit x-ray emission line x-rays of the at least one target material in response to bombardment by the at least one electron beam.

19. The x-ray source of claim 18, wherein the at least one target material is selected from the group consisting of: Al, Ag, Rh, Cr, Au, Ti, Fe, and Mo.

20. A method of x-ray analysis, the method comprising:
bombarding a target material comprising silicon carbide with electrons with kinetic energy in a range of 5 keV to 30 keV;
emitting Si x-ray emission line x-rays from the target material;
irradiating a sample with at least some of the Si x-ray emission line x-rays; and
detecting x-rays and/or electrons emitted from the sample.

21. The method of claim 20, wherein irradiating the sample with at least some of the Si x-ray emission line x-rays comprises using at least one x-ray optical train to receive the Si x-ray emission line x-rays and to direct the at least some of the Si x-ray emission line x-rays to irradiate the sample.

22. The method of claim 20, further comprising:
bombarding at least one second target material different from silicon carbide with electrons;
emitting x-ray emission line x-rays from the at least one second target material; and
irradiating the sample with at least some of the x-ray emission line x-rays from the at least one second target material.

23. The method of claim 22, wherein irradiating the sample with at least some of the x-ray emission line x-rays from the at least one second target material comprises using at least one x-ray optical train to receive the x-ray emission line x-rays from the at least one second target material and to direct the at least some of the x-ray emission line x-rays from the at least one second target material to irradiate the sample.

24. An x-ray illumination system comprising:
at least one x-ray source comprising at least a first x-ray sub-source and a second x-ray sub-source, the first and second x-ray sub-sources on or embedded in at least one thermally conductive substrate, the first x-ray sub-source comprising a first material configured to generate first x-rays in response to electron bombardment of the first x-ray sub-source, the second x-ray sub-source comprising a second material different from the first material, the second material configured to generate second x-rays in response to electron bombardment of the second x-ray sub-source; and
a plurality of x-ray optical trains comprising:
a first optical train comprising at least one first collimating x-ray mirror, at least one first energy-selective x-ray monochromator or multilayer, and at least one first focusing x-ray mirror, the first optical train configured to be positioned to direct at least some of the first x-rays emitted from the first x-ray sub-source to irradiate a sample; and
a second optical train comprising at least one second collimating x-ray mirror, at least one second energy-selective x-ray monochromator or multilayer, and at least one second focusing x-ray mirror, the second optical train configured to be positioned to direct at least some of the second x-rays emitted from the second x-ray sub-source to irradiate the sample.

25. The system of claim 24, wherein the at least one x-ray source is configured to bombard a selected sub-source of the first and second x-ray sub-sources with at least one electron beam by moving, relative to one another, one or both of the at least one electron beam and the at least one substrate.

26. The system of claim 24, wherein the at least one x-ray sub-source comprises a third x-ray sub-source on or embedded in the at least one thermally conductive substrate, the third x-ray sub-source comprising a third material different from the first material and the second material, the third material configured to generate third x-rays in response to electron bombardment of the third x-ray sub-source, the plurality of x-ray optical trains further comprising a third optical train comprising at least one third collimating x-ray mirror, at least one third energy-selective x-ray monochromator or multilayer, and at least one third focusing x-ray mirror, the third optical train configured to be positioned to direct at least some of the third x-rays emitted from the third x-ray sub-source to irradiate the sample.

27. The system of claim 24, further comprising at least one controllably movable stage mechanically coupled to the plurality of x-ray optical trains, the at least one stage configured to controllably position the plurality of x-ray optical trains such that a selected one x-ray optical train of the plurality of x-ray optical trains is positioned to receive x-rays from the at least one x-ray source and to direct at least some of the received x-rays to irradiate the sample.

28. The system of claim 27, wherein the at least one controllably movable stage consists essentially of a single controllably movable stage.

29. The system of claim 27, wherein the at least one controllably movable stage comprises a first stage, a second stage, and a third stage, the first stage mechanically coupled to the first and second collimating x-ray mirrors, the second stage mechanically coupled to the first and second energy-selective x-ray monochromators or multilayers, and the third stage mechanically coupled to the first and second focusing x-ray mirrors, the first, second, and third stages configured to be controlled independently from one another.

30. An x-ray photoelectron spectroscopy system comprising:
at least one x-ray source comprising a plurality of x-ray sub-sources on or embedded in at least one thermally conductive substrate, the x-ray sub-sources comprising a plurality of materials configured to generate x-rays in response to electron bombardment;
a plurality of x-ray optical trains, each optical train comprising at least one collimating x-ray optical element, at least one energy-selective optical element, and at least one focusing x-ray optical element, the plurality of x-ray optical trains configured to be positioned to direct at least some of the x-rays emitted from a selected one of the plurality of x-ray sub-sources to irradiate a sample;
a sample chamber configured to contain the sample at a sample pressure;
a first chamber and a first electrostatic lens contained in the first chamber at a first pressure less than the sample pressure, the sample chamber and the first chamber separated from one another by a first wall having a first aperture configured to allow at least some photoelectrons from the sample to propagate from the sample chamber to the first chamber; and
a second chamber and a second electrostatic lens contained in the second chamber at a second pressure less than the first pressure, the first chamber and the second chamber separated from one another by a second wall having a second aperture configured to allow at least some of the photoelectrons in the first chamber to propagate to the second chamber.

31. The system of claim 30, wherein the sample pressure is in a range of 20 mbar to 1 bar.

32. The system of claim 30, wherein the first electrostatic lens is configured to receive photoelectrons from the first aperture and to focus at least some of the photoelectrons from the first aperture through the second aperture.

33. The system of claim 30, further comprising an energy dispersive electron energy analyzer separated from the second chamber by a third wall having a third aperture configured to allow at least some of the photoelectrons in the second chamber to propagate to the energy dispersive electron energy analyzer.

34. The system of claim 33, wherein the second electrostatic lens is configured to receive photoelectrons from the second aperture and to focus at least some of the photoelectrons from the second aperture through the third aperture.

* * * * *

UNITED STATES PATENT AND TRADEMARK OFFICE
CERTIFICATE OF CORRECTION

PATENT NO. : 11,056,308 B2
APPLICATION NO. : 16/560287
DATED : July 6, 2021
INVENTOR(S) : Wenbing Yun It is certified that error appears in the above-identified patent and that said Letters Patent is hereby corrected as shown below:

In the Specification

In Column 1, Line 42, delete "is," and insert --1s,--.

In Column 1, Line 43, delete "is," and insert --1s,--.

In Column 3, Line 14 (Approx.), delete "is," and insert --1s,--.

In Column 3, Line 15 (Approx.), delete "is," and insert --1s,--.

In Column 3, Line 43, delete "(is)" and insert --(1s)--.

In Column 3, Line 50, delete "(is)" and insert --(1s)--.

In Column 5, Line 59, delete "KcL" and insert --K$\alpha_1$--.

In Column 15, Line 31, delete "(is)" and insert --(1s)--.

In Column 15, Line 55, delete "(is)" and insert --(1s)--.

In Column 18, Line 11 (Approx.), delete "m" and insert --10 µm--.

In the Claims

In Column 21, Claim 2, Line 5, delete "Kai" and insert --K$\alpha_1$--.

In Column 22, Claim 17, Line 44, delete "least last" and insert --least--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*